(12) United States Patent
Nagata et al.

(10) Patent No.: US 8,279,289 B2
(45) Date of Patent: Oct. 2, 2012

(54) OPTICAL UNIT WITH SHAKE CORRECTING FUNCTION

(75) Inventors: Akihiro Nagata, Nagano (JP);
Toshiyuki Karasawa, Nagano (JP);
Yuichi Takei, Nagano (JP); Tadashi Takeda, Nagano (JP); Hisahiro Ishihara, Nagano (JP); Shinji Minamisawa, Nagano (JP); Katsushige Yanagisawa, Nagano (JP); Kiyoshi Miyazaki, Nagano (JP)

(73) Assignee: Nidec Sankyo Corporation (JP)

( * ) Notice: Subject to any disclaimer, the term of this patent is extended or adjusted under 35 U.S.C. 154(b) by 455 days.

(21) Appl. No.: 12/579,136

(22) Filed: Oct. 14, 2009

(65) Prior Publication Data
US 2010/0091120 A1   Apr. 15, 2010

(30) Foreign Application Priority Data

Oct. 14, 2008 (JP) ................................. 2008-264891
Oct. 14, 2008 (JP) ................................. 2008-264894
Oct. 14, 2008 (JP) ................................. 2008-265681
Sep. 11, 2009 (JP) ................................. 2009-209994

(51) Int. Cl.
*H04N 5/228* (2006.01)
*G02B 27/64* (2006.01)

(52) U.S. Cl. ............. 348/208.11; 348/208.7; 348/208.4; 348/208.99; 359/557; 359/554

(58) Field of Classification Search ........................ None
See application file for complete search history.

(56) References Cited

U.S. PATENT DOCUMENTS

| 2009/0052037 | A1* | 2/2009 | Wernersson | 359/554 |
| 2009/0303594 | A1* | 12/2009 | Lim et al. | 359/554 |
| 2010/0080545 | A1* | 4/2010 | Fan et al. | 396/55 |

FOREIGN PATENT DOCUMENTS

| JP | 2007-129295 A | 5/2007 |
| JP | 2007-310084 A | 11/2007 |

* cited by examiner

*Primary Examiner* — Justin P Misleh
(74) *Attorney, Agent, or Firm* — Cantor Colburn LLP

(57) ABSTRACT

An optical unit with shake correcting function may include a movable module having a lens, a fixed body supporting the movable module, a shake detection sensor for detecting shake of the movable module, and at least one pair of magnetic drive mechanism for shake correction which is structured on both sides of the movable module so that the movable module is swung with respect to the fixed body on the basis of detection result of the shake detection sensor to correct the shake of the movable module. The magnetic drive mechanism for shake correction is disposed so that a shake correction magnet is held by the fixed body and a shake correction coil is held by the movable module. Further, a shake correction coil may be disposed in a first region, where magnetic lines of force generated by a shake correction magnet are directed in directions generally going away from a supporting point part and/or a second region where magnetic lines of force generated by the shake correction magnet are directed in directions generally going toward the supporting point part.

20 Claims, 29 Drawing Sheets

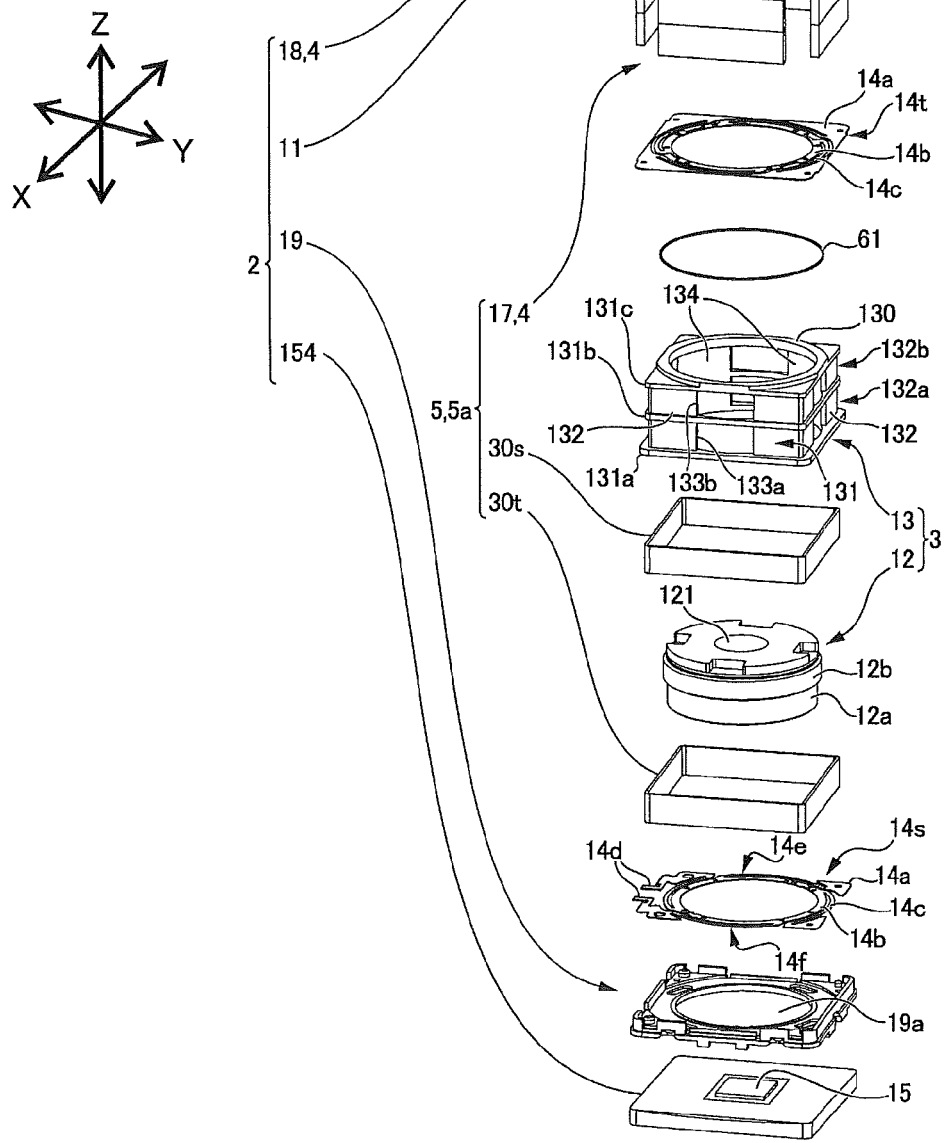

Fig. 28
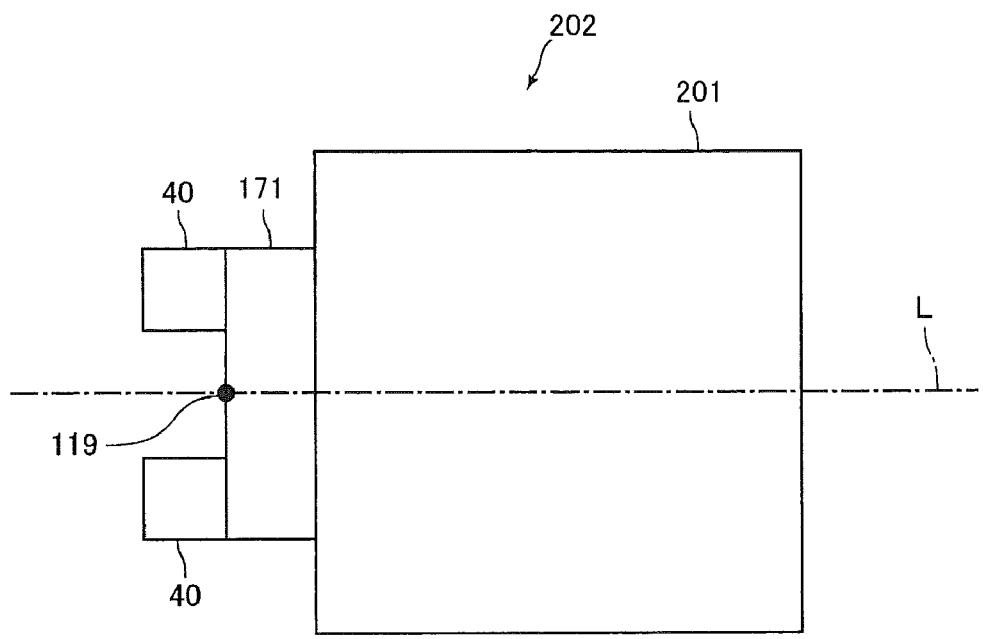
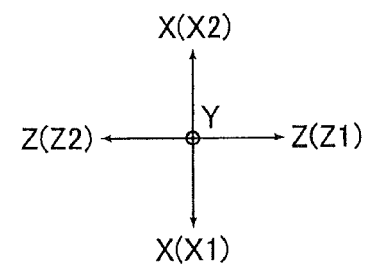

OPTICAL UNIT WITH SHAKE CORRECTING FUNCTION

CROSS REFERENCE TO RELATED APPLICATION

The present invention claims priority under 35 U.S.C. §119 to Japanese Application No. 2008-264891 filed Oct. 14, 2008, Japanese Application No. 2008-264894 filed Oct. 14, 2008, Japanese Application No. 2008-265681 filed Oct. 14, 2008, and Japanese Application No. 2009-209994 filed Sep. 11, 2009, the entire contents of which are incorporated herein by reference.

FIELD OF THE INVENTION

An embodiment of the present invention may relate to an optical unit with shake correcting function in which a module provided with a lens is swung to correct shake such as a shake of hand.

BACKGROUND OF THE INVENTION

In a photographic optical device which is mounted on a cell phone or a digital camera, a laser beam pointer, or an optical instrument such as a portable projection display device or a projection display device for car, shake is easily occurred in its optical axis when shake or external vibration is transmitted.

In order to prevent this problem, a photographic optical unit which is used, for example, in a portable photographic optical device has been proposed in which a movable module is supported by a fixed body through an elastic member, an actuator utilizing a piezo-electric element is structured on each of side faces of the movable module, and the movable module is swung around an X-axis and a Y-axis which are perpendicular to an optical axis direction (Z-axis direction) of the actuator on the basis of detection result of a shake detection sensor to correct the shake (see Japanese Patent Laid-Open No. 2007-129295).

Further, as a photographic optical unit capable of correcting shake at the time of photographing, another optical unit has been proposed which includes a movable part on which a lens and an imaging element are mounted, a pivot part which is fixed to a base and abutted with a bottom face of the movable part, a flat spring which is fixed to the base and swingably supports the movable part, and a swing mechanism for swinging the movable part (see, for example, Japanese Patent Laid-Open No. 2007-310084). In this optical unit, the swing mechanism is structured of a drive coil and a drive magnet, and the movable part is swung by a drive force of the swing mechanism with the pivot part as a supporting point to correct the shake.

Further, in this optical unit, the flat spring is provided with a fixed piece which is fixed to the base, an outer frame piece which is connected with the fixed piece through an X-axis deformable part, and a support piece for the movable part which is connected with the outer frame piece through a Y-axis deformable part. The X-axis deformable part and the Y-axis deformable part are twisted when the movable part is swung. In this optical device, the flat spring is fixed to the base in a resiliently bent state so that pressurization is generated for surely abutting a tip end of the pivot part with the bottom face of the movable part.

However, in the case that the actuator utilizing a piezo-electric element is used like the structure disclosed in the above-mentioned former Patent Reference, the fixed body and the movable module are mechanically connected with each other through the actuator and thus much labor is required for assembling and vibration resistance may be low. Further, even in a case that the swing mechanism is structured of a drive coil and a drive magnet, it is insufficient to correct shake with a small torque and a quick response.

Further, in a market of a portable apparatus such as a cellular phone, the size of a portable apparatus has been remarkably required to be made smaller and thinner and, as a result, a photographic optical unit which is mounted on the portable apparatus has been also required to make smaller and thinner. However, when the size of the photographic optical unit is reduced, an arrangement space of the drive coil and the drive magnet for swinging the movable part which is provided with a lens and an imaging element is restricted and, therefore, it is difficult to obtain a sufficient drive force for swinging the movable part.

SUMMARY OF THE INVENTION

In view of the problems described above, at least an embodiment of the first present invention may advantageously provide an optical unit with shake correcting function in which shake of a movable module is corrected with a small torque and a quick response without mechanically connecting the fixed body and the movable module through a drive mechanism.

Further, in view of the problems described above, at least an embodiment of the second present invention may advantageously provide an optical unit with shake correcting function in which a sufficient drive force for swinging a lens drive module on which a lens and an imaging element are mounted is capable of obtaining even when the optical unit is made smaller and thinner.

According to at least an embodiment of the first present invention, there may be provided an optical unit with shake correcting function including a movable module on which at least a lens is mounted, a fixed body which supports the movable module, a shake detection sensor which detects shake of the movable module, and one or plural pairs of magnetic drive mechanism for shake correction which is structured on both sides of the movable module so that the movable module is swung with respect to the fixed body on the basis of detection result of the shake detection sensor to correct the shake of the movable module. At least one pair of the magnetic drive mechanism for shake correction is disposed so that a shake correction magnet is held by the fixed body and a shake correction coil is held by the movable module.

In accordance with an embodiment of the present invention, since a magnetic drive mechanism is utilized for correcting shake such as shake by hand of a movable module, shake of the movable module is corrected without mechanically connecting the fixed body with the movable module through a drive mechanism. Therefore, its assembling is easy and a high degree of vibration resistance is attained. Further, a coil which is lighter than a magnet is disposed on the movable module side and a magnet which is heavier than a coil is disposed on the fixed body side. Therefore, the movable module is driven with a small torque and a quick response for correction.

In accordance with an embodiment of the present invention, when three directions perpendicular to each other are respectively set to be an X-axis, a Y-axis and a Z-axis in the fixed body and an optical axis direction of the lens is set to be the Z-axis, the magnetic drive mechanism for shake correction includes one pair of first magnetic drive mechanisms for shake correction which generate magnetic-drive forces for swinging the movable module around the X-axis, and one pair of second magnetic drive mechanisms for shake correction which generate magnetic-drive forces for swinging the movable module around the Y-axis. In addition, all of the shake correction magnets of the first magnetic drive mechanisms and the second magnetic drive mechanisms are held by the fixed body and all of the shake correction coils of the first magnetic drive mechanisms and the second magnetic drive mechanisms are held by the movable module.

In accordance with an embodiment of the present invention, the shake detection sensor is mounted on the movable module. Specifically, the movable module includes a lens drive module having a movable body which holds the lens in an inside of the movable body, a lens drive mechanism for moving the movable body along the optical axis direction of the lens, and a support body on which the lens drive mechanism and the movable body are mounted. The support body includes a module cover and an imaging element holder which holds the imaging element at an opposite side position to an object to be photographed side, and the shake detection sensor is mounted on the movable module in an integral manner with the imaging element holder. In this case, it is preferable that the movable module is disposed in an inside of a fixed cover as a housing structuring the fixed body so as to be capable of swinging through a spring member, and the shake correction coil is held on an outer face of the module cover and the shake correction magnet is held on an inner face of the fixed cover so as to face the shake correction coil. According to this structure, shake of the optical axis is directly detected by the shake detection sensor and thus shake is corrected with a high degree of accuracy.

In this case, it is preferable that power supplied to the shake correction coil is performed through a common flexible circuit board which electrically connects the shake detection sensor with the outside. When this structure is adopted, electric connections to the shake detection sensor and the shake correction coil are required between the movable module and the outside. However, according to the embodiment of the present invention, since the flexible circuit board is commonly used, the structure is simplified and its cost is reduced.

In accordance with an embodiment of the present invention, the movable module is mounted with the imaging element on a rear side of the lens and the shake detection sensor detects shake by hand at the time of being photographed. According to this structure, shake when a shutter is pressed is prevented.

In this case, power supplied to the shake correction coil is performed through a flexible circuit board which electrically connects the imaging element with the outside. When this structure is adopted, electric connections to the imaging element and the shake correction coil are required between the movable module and the outside. However, according to the embodiment of the present invention, since the flexible circuit board is commonly used, the structure is simplified and its cost is reduced.

In accordance with an embodiment of the present invention, the movable module is mounted with a lens drive mechanism for magnetically driving the lens in an optical axis direction. According to this structure, a focusing operation can be performed in the optical unit with shake correcting function.

In this case, it is preferable that power supplied to the shake correction coil is performed through a common flexible circuit board which electrically connects the lens drive mechanism with the outside. When this structure is adopted, electric connections to the lens drive mechanism and the shake correction coil are required between the movable module and the outside. However, according to the embodiment of the present invention, since the flexible circuit board is commonly used, the structure is simplified and its cost is reduced.

According to at least an embodiment of the second present invention, there may be provided an optical unit with shake correcting function including a lens drive module which is mounted with a lens, an imaging element and a lens drive mechanism for driving the lens, a sensor for detecting a variation of inclination of the lens drive module, and a shake correction mechanism which swings the lens drive module on the basis of detection result by the sensor to correct shake. The shake correction mechanism includes a swing drive mechanism which swings the lens drive module and a supporting point part which serves as a swing center of the lens drive module. The swing drive mechanism includes a shake correction coil and a shake correction magnet which are disposed to face each other, and the shake correction coil is disposed in at least one of a first region, where magnetic lines of force generated by the shake correction magnet are directed in directions generally going away from the supporting point part, and a second region where magnetic lines of force generated by the shake correction magnet are directed in directions generally going toward the supporting point part.

In the optical unit with shake correcting function in accordance with an embodiment of the present invention, the shake correction coil is disposed in a first region, where magnetic lines of force generated by the shake correction magnet are directed in directions generally going away from the supporting point part and/or in a second region where magnetic lines of force generated by the shake correction magnet are directed in directions generally going toward the supporting point part. Therefore, it can be structured that directions of electro-magnetic forces generated when an electric current is supplied to the shake correction coil are generally coincided with a tangential direction of a circle whose center is the supporting point part and which passes through the shake correction coil. In other words, directions of electro-magnetic forces generated when an electric current is supplied to the shake correction coil are generally directed in directions which generate a swing force for swinging the lens drive module with the supporting point part as a center. Therefore, according to the embodiment of the present invention, magnetic flux generated from the shake correction magnet is effectively utilized to enhance a drive force of the swing drive mechanism. As a result, in accordance with an embodiment of the present invention, even when the optical unit with shake correcting function is made smaller or thinner, a sufficient drive force for swinging the lens drive module can be obtained.

In accordance with an embodiment of the present invention, a case body which is formed in a substantially rectangular tube shape is provided for supporting the lens drive module and the lens drive module is disposed within a cover member which is formed in a substantially rectangular tube shape, and the shake correction magnet is fixed to an outer side face of the cover member and the shake correction coil is fixed to an inner side face of the case body. As described above, when the lens drive module is disposed within a cover member formed in a substantially rectangular tube shape and the lens drive module is supported by a case body formed in a substantially rectangular tube shape, the shake correction magnet and the shake correction coil are respectively fixed to flat side faces and thus the shake correction magnet and the shake correction coil are easily disposed so as to face each other. In this case, it may be structured that a base body is provided which is fixed to the case body on a lower end side of the optical unit to structure a support body for supporting the lens drive module, the sensor is disposed on a lower end part of the lens drive module and the supporting point part is formed between the lower end part of the lens drive module and the base body, and the shake correction coil is disposed so that a center of the shake correction coil in the optical axis direction is located on an upper side in the optical axis direction relative to magnetic center of the shake correction magnet in the optical axis direction. According to this structure, a length from the swing center to the shake correction coil is set to be longer and thus a torque for swinging the lens drive module with the swing center as a center is increased.

Further, according to at least an embodiment of the second present invention, there may be provided an optical unit with shake correcting function including a lens drive module which is mounted with a lens, an imaging element and a lens drive mechanism for driving the lens, a sensor for detecting a variation of inclination of the lens drive module, and a shake correction mechanism which swings the lens drive module on the basis of detection result by the sensor to correct shake. The shake correction mechanism includes a swing drive mechanism for swinging the lens drive module, and the swing drive mechanism includes a shake correction coil and a shake correction magnet which are disposed to face each other, and the shake correction coil is disposed in at least one of a first region, where magnetic lines of force generated by the shake correction magnet are directed in directions generally going away from a swing center of the lens drive module, and a second region where magnetic lines of force generated by the shake correction magnet are directed in directions generally going toward the swing center.

In the optical unit with shake correcting function in accordance with an embodiment of the present invention, the shake correction coil is disposed in a first region, where magnetic lines of force generated by the shake correction magnet are directed in directions generally going away from the swing center and/or in a second region where magnetic lines of force generated by the shake correction magnet are directed in directions generally going toward the swing center. Therefore, it can be structured so that directions of electro-magnetic forces generated when an electric current is supplied to the shake correction coil are generally coincided with a tangential direction of the circle whose center is located at the swing center and which passes through the shake correction coil. In other words, directions of electro-magnetic forces generated when an electric current is supplied to the shake correction coil are generally directed in directions which generate a swing force for swinging the lens drive module with the swing center as a center. Therefore, according to the embodiment of the present invention, magnetic flux generated from the shake correction magnet is effectively utilized and a drive force of the swing drive mechanism can be enhanced. As a result, in accordance with an embodiment of the present invention, even when the optical unit with shake correcting function is made smaller or thinner, a sufficient drive force for swinging the lens drive module can be obtained.

In accordance with an embodiment of the present invention, a case body which is formed in a substantially rectangular tube shape is provided for supporting the lens drive module, and the lens drive module is disposed within a cover member which is formed in a substantially rectangular tube shape, and the shake correction magnet is fixed to an outer side face of the cover member on both sides in an optical axis direction of the lens with respect to the swing center, and the shake correction coil facing the shake correction magnet is fixed to an inner side face of the case body on both sides in the optical axis direction with respect to the swing center. As described above, when the lens drive module is disposed within a cover member formed in a substantially rectangular tube shape and the lens drive module is supported by a case body formed in a substantially rectangular tube shape, the shake correction magnet and the shake correction coil are respectively fixed to flat side faces and thus the swing center is set at a center part of the lens drive module and the shake correction magnet and the shake correction coil are easily disposed so as to face each other on both sides in the optical axis direction. In this case, when the flat spring is connected between a portion between two shake correction magnets fixed to the outer side face of the cover member and a portion between two shake correction coils fixed to the inner side face of the case body, the lens drive module is easily supported by the case body in a swingable manner through the flat spring.

In accordance with an embodiment of the present invention, the shake correction coil is formed in a substantially rectangular wound shape, the shake correction coil is provided with a first side part and a second side part which are parallel to each other, an opposite face of the shake correction magnet to the shake correction coil is formed with two magnetic poles which are superposed on each other in a direction substantially perpendicular to a longitudinal direction of the first side part and a longitudinal direction of the second side part and, when the first side part is set to be a far side part from the supporting point part, the first side part is disposed in the first region and the second side part is disposed in the second region. According to this structure, electro-magnetic forces whose directions are generally coincided with directions generating swing forces for the lens drive module with the supporting point part or the swing center as a center are generated both in the first side part and the second side part. Therefore, a drive force of the swing drive mechanism is enhanced effectively.

In addition, according to at least an embodiment of the second present invention, there may be provided an optical unit with shake correcting function including a lens drive module which is mounted with a lens, an imaging element and a lens drive mechanism for driving the lens, a support body which supports the lens drive module, a sensor for detecting a variation of inclination of the lens drive module, and a shake correction mechanism which swings the lens drive module on the basis of detection result by the sensor to correct shake. The shake correction mechanism includes a swing drive mechanism for swinging the lens drive module and a supporting point part which serves as a swing center of the lens drive module, and the swing drive mechanism includes a shake correction coil and a shake correction magnet which are oppositely disposed to each other. The supporting point part is disposed at a position shifted from a facing position of the shake correction coil to the shake correction magnet in an optical axis direction of the lens drive module, and the shake correction coil and the shake correction magnet are disposed so that a center in the optical axis direction of the shake correction coil and a magnetic center in the optical axis direction of the shake correction magnet are shifted from each other in the optical axis direction.

In an optical unit with shake correcting function in accordance with an embodiment of the present invention, the supporting point part is disposed at a position shifted from a facing position of the shake correction coil to the shake correction magnet in an optical axis direction of the lens drive module. Further, the shake correction coil and the shake correction magnet are disposed so that a center in the optical axis direction of the shake correction coil and a magnetic center in the optical axis direction of the shake correction magnet are shifted from each other in the optical axis direction. Therefore, the shake correction coil is disposed in a first region, where magnetic lines of force generated by the shake correction magnet are directed in directions generally going away from the support point part and/or in a second region where magnetic lines of force generated by the shake correction magnet are directed in directions generally going toward the support point part. Therefore, it can be structured so that directions of electro-magnetic forces generated when an electric current is supplied to the shake correction coil are generally coincided with a tangential direction of the circle whose center is located at the support point part and which passes through the shake correction coil. In other words, directions of electro-magnetic forces generated when an electric current is supplied to the shake correction coil are generally directed in directions which generate a swing force for swinging the lens drive module with the support point part as a center. Therefore, according to the embodiment of the present invention, magnetic flux generated from the shake correction magnet is effectively utilized and a drive force of the swing drive mechanism can be enhanced. As a result, in accordance with an embodiment of the present invention, even when the optical unit with shake correcting function is made smaller or thinner, a sufficient drive force for swinging the lens drive module can be obtained.

In addition, according to at least an embodiment of the second present invention, there may be provided an optical unit with shake correcting function including a lens drive module which is mounted with a lens, an imaging element and a lens drive mechanism for driving the lens, a support body which supports the lens drive module, a sensor for detecting a variation of inclination of the lens drive module, and a shake correction mechanism which swings the lens drive module on the basis of detection result by the sensor to correct shake. The shake correction mechanism includes a swing drive mechanism for swinging the lens drive module and the swing drive mechanism includes a shake correction coil and a shake correction magnet which are oppositely disposed to each other. In addition, a swing center of the lens drive module is disposed at a position shifted from a facing position of the shake correction coil to the shake correction magnet in an optical axis direction of the lens drive module, and the shake correction coil and the shake correction magnet are disposed so that a center in the optical axis direction of the shake correction coil and a magnetic center in the optical axis direction of the shake correction magnet are shifted from each other in the optical axis direction.

In the optical unit with shake correcting function in accordance with an embodiment of the present invention, a swing center of the lens drive module is disposed at a position shifted from a facing position of the shake correction coil to the shake correction magnet in an optical axis direction of the lens drive module. Further, the shake correction coil and the shake correction magnet are disposed so that a center in the optical axis direction of the shake correction coil and a magnetic center in the optical axis direction of the shake correction magnet are shifted from each other in the optical axis direction. Therefore, the shake correction coil is disposed in a first region, where magnetic lines of force generated by the shake correction magnet are directed in directions generally going away from the swing center and/or in a second region where magnetic lines of force generated by the shake correction magnet are directed in directions generally going toward the swing center. Therefore, it can be structured so that directions of electro-magnetic forces generated when an electric current is supplied to the shake correction coil are generally coincided with a tangential direction of the circle whose center is located at the swing center and which passes through the shake correction coil. In other words, directions of electro-magnetic forces generated when an electric current is supplied to the shake correction coil are generally directed in directions which generate a swing force for swinging the lens drive module with the swing center as a center. Therefore, according to the embodiment of the present invention, magnetic flux generated from the shake correction magnet is effectively utilized and a drive force of the swing drive mechanism can be enhanced. As a result, in accordance with an embodiment of the present invention, even when the optical unit with shake correcting function is made smaller or thinner, a sufficient drive force for swinging the lens drive module can be obtained.

In accordance with an embodiment of the present invention, the shake correction magnet is fixed to a magnet holding member which is swung together with the lens drive module and the shake correction coil is fixed to the support body, and the center in the optical axis direction of the shake correction coil is disposed at a position far away from the swing center in the optical axis direction relative to the magnetic center in the optical axis direction of the shake correction magnet. According to this structure, a length from the swing center to the shake correction coil is set to be longer and thus a torque for swinging the lens drive module with the swing center as a center is increased. In other words, a drive force of the swing drive mechanism is enhanced.

In accordance with an embodiment of the present invention, the shake correction coil is formed in a substantially rectangular wound shape and the shake correction coil is provided with a first side part and a second side part which are parallel to each other, an opposite face of the shake correction magnet to the shake correction coil is formed with two magnetic poles which are superposed on each other in the optical direction, and a center in the optical axis direction of the first side part is disposed at a position far away from the swing center in the optical axis direction relative to one of magnetic centers of the two magnetic poles. Further, in this case, it is preferable that a center in the optical axis direction of the second side part is located at a position nearer to the swing center in the optical axis direction relative to a boundary of two magnetic poles which is a magnetic center in the optical axis direction of the shake correction magnet, and the center in the optical axis direction of the second side part is located at a position far away from the swing center in the optical axis direction relative to the other of the magnetic centers of the two magnetic poles. According to this structure, electro-magnetic forces whose directions are generally coincided with directions generating swing forces for the lens drive module with the swing center as a center are generated both in the first side part and the second side part. Therefore, a drive force of the swing drive mechanism is enhanced effectively.

In accordance with an embodiment of the present invention, the shake correction coil is formed in a substantially rectangular shape which is provided with two long side parts parallel to each other and two short side parts parallel to each other which are formed shorter than the long side part, and the first side part and the second side part are the long side part. According to this structure, a drive force of the swing drive mechanism is enhanced in comparison with a case that a first side part and a second side part are a short side part. Further, in a comparison with a case that the shake correction coil is formed in a substantially square shape, the size of the optical unit with shake correcting function is reduced in the direction where the long side parts are faced each other and a drive force of the swing drive mechanism is improved. In addition, since the short side parts which hardly contribute to a drive force of the swing drive mechanism are shortened, a resistance value of the shake correction coil can be reduced and thus power consumption of the shake correction coil is reduced.

Further, according to at least an embodiment of the second present invention, there may be provided an optical unit with shake correcting function including a lens drive module on which a lens, an imaging element and a lens drive mechanism for driving the lens are mounted, a sensor for detecting shake of the lens drive module, and a shake correction mechanism for swinging the lens drive module on the basis of detection result with the sensor to correct the shake. The shake correction mechanism includes a swing drive mechanism for swinging the lens drive module, and the swing drive mechanism includes a shake correction coil and a shake correction magnet which are oppositely disposed to each other, and an opposite face of the shake correction magnet to the shake correction coil is formed with two or more magnetic poles.

In the optical unit with shake correcting function in accordance with an embodiment of the present invention, two or more magnetic poles are formed on an opposite face of the shake correction magnet to the shake correction coil. Therefore, in comparison with a case that one magnetic pole is formed on an opposite face of the shake correction magnet to the shake correction coil, the shake correction coil which is formed in a wound shape can be utilized effectively. In other words, an effective portion of the shake correction coil which generates a drive force can be increased. As a result, in accordance with an embodiment of the present invention, even when the optical unit with shake correcting function is made smaller or thinner, a sufficient drive force for swinging the lens drive module can be obtained.

In accordance with an embodiment of the present invention, the opposite face of the shake correction magnet to the shake correction coil is formed with two magnetic poles. According to this structure, one piece of the shake correction coil is oppositely faced to one piece of the shake correction magnet and thus a drive force of the swing drive mechanism can be increased while utilizing the shake correction coil effectively. Therefore, the structure of the optical unit with shake correcting function can be simplified.

In accordance with an embodiment of the present invention, a magnet holding member is provided which is formed in a substantially multi-angular tube shape for holding the shake correction magnet, two magnetic poles are formed on the opposite face of the shake correction magnet to the shake correction coil so as to be superposed on each other in an axial direction of the magnet holding member, and the shake correction magnet is fixed to each of side faces of the magnet holding member so that magnetic poles of the shake correction magnets adjacent to each other in the circumferential direction of the magnet holding member are different from each other. According to this structure, magnetic path is easily formed between the shake correction magnets adjacent to each other in the circumferential direction. Therefore, a drive force of the swing drive mechanism can be improved effectively. Specifically, it may be structured that a case body is provided which is formed in a substantially rectangular tube shape for supporting the lens drive module, the magnet holding member is formed in a substantially rectangular tube shape, and the shake correction magnet is fixed to an outer side face of the magnet holding member and the shake correction coil is fixed to an inner side face of the case body.

In accordance with an embodiment of the present invention, at least two side faces of the magnet holding member adjacent to each other in the circumferential direction are connected with each other in the circumferential direction. In this case, it is preferable that all side faces of the magnet holding member are connected with each other in the circumferential direction. According to this structure, a magnetic path is easily formed between the shake correction magnets adjacent to each other in the circumferential direction. Therefore, a drive force of the swing drive mechanism can be improved effectively.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 28 is a schematic view showing a movable module of an optical unit with shake correcting function in accordance with another embodiment of the present invention.

DETAILED DESCRIPTION OF THE PREFERRED EMBODIMENTS

An embodiment of the present invention in which a magnetic drive mechanism for shake correction is structured on both sides of a movable module will be described below with reference to the accompanying drawings. In the following description, three directions perpendicular to each other, i.e., an X-axis, a Y-axis and a Z-axis are set in a fixed body, and the direction along an optical axis "L" (lens optical axis) is set to be the Z-axis. Therefore, in the following description, swing around the X-axis corresponds to so-called pitching (vertical swing), swing around the Y-axis corresponds to so-called yawing (lateral swing) and swing around the Z-axis corresponds to so-called rolling. Further, in the following description, "object to be photographed side" is described as "front side" or "upper side", and "opposite side to the object to be photographed side" is described as "rear side" or "lower side".

Figure 1A:
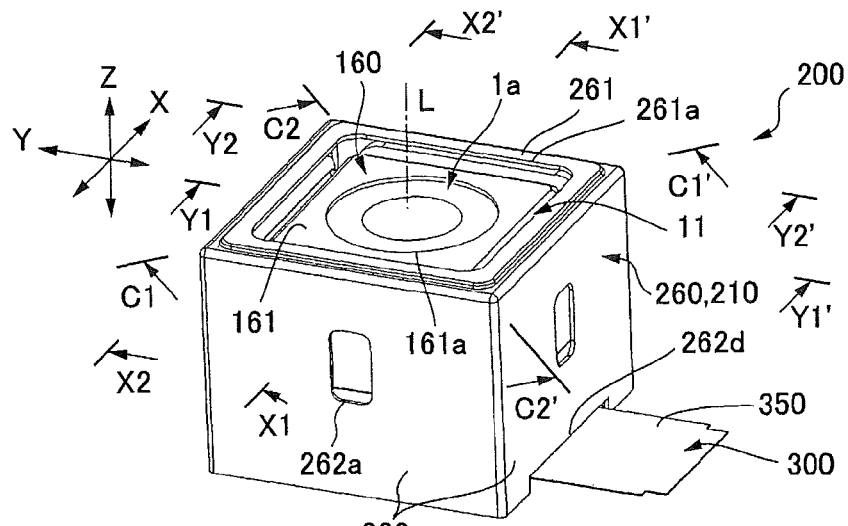
FIGS. 1(a), 1(b) and 1(c) are explanatory views showing an entire optical unit with shake correcting function in accordance with an embodiment of the present invention.
Figure 1B:
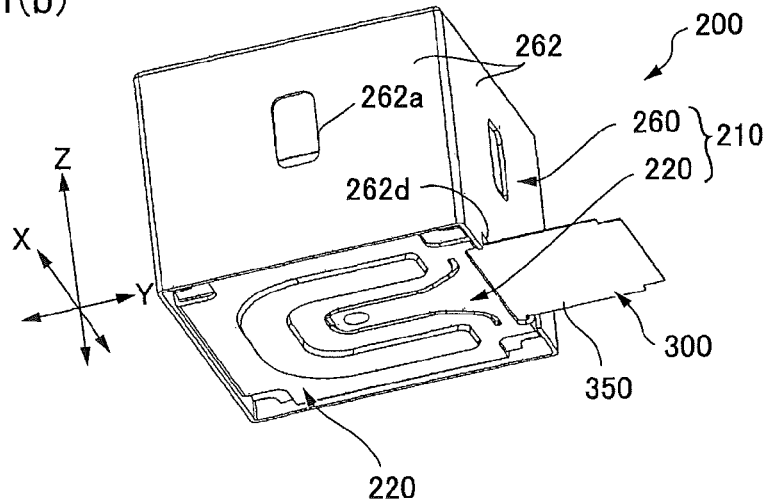
Figure 1C:
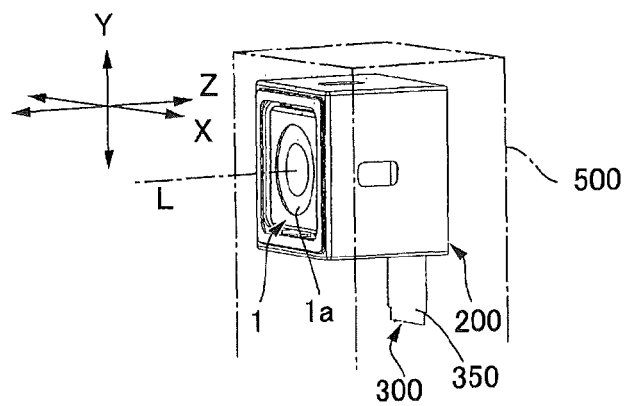

FIGS. 1(a), 1(b) and 1(c) are explanatory views showing an entire optical unit with shake correcting function in accordance with an embodiment of the present invention. FIG. 1(a) is a perspective view showing an optical unit with shake correcting function in accordance with an embodiment of the present invention which is viewed from an object to be photographed side (front side), FIG. 1(b) is a perspective view showing the optical unit viewed from the rear side which is an opposite side to the object to be photographed side, and FIG. 1(c) is an explanatory view showing a state where the optical unit with shake correcting function is mounted on an optical apparatus such as a cell phone.

An optical unit 200 with shake correcting function (for example, shake by hand) shown in FIGS. 1(a) and 1(b) is a thin type camera which is used in a cell phone with a camera. The optical unit 200 is provided with a substantially rectangular parallelepiped shape as a whole. In this embodiment, the optical unit 200 with shake correcting function includes a base 220 in a roughly rectangular plate shape and a box-shaped fixed cover 260 which is covered on an upper side of the base 220. The base 220 and the fixed cover 260 are fixed to each other to structure a part of the fixed body 210. In the fixed body 210, a front side end part of the fixed cover 260 (object side end part) may be mounted with an attached module which includes a shutter mechanism, a filter drive mechanism by which various filters are switched to a position on the optical axis or to a position retracted from the optical axis, and a diaphragm mechanism.

The fixed cover 260 is formed in a rectangular shape when viewed from a direction of the optical axis "L" (direction of Z-axis) and the fixed cover 260 is provided with a rectangular top plate part 261 on its front side. The top plate part 261 is formed with a rectangular opening part 261a and four side plate parts 262 are extended from an outer circumferential edge of the top plate part 261 toward the rear side. Rear end edges of two side plate parts 262 located in the Y-axis direction are formed with a cut-out part 262d and a lead-out part 350 of the flexible circuit board 300 is drawn in the Y-axis direction from one of two side plate parts 262 located in the Y-axis direction through the cut-out part 262d. The lead-out part 350 of the flexible circuit board 300 is fixed to the side plate part 262 with an adhesive.

A movable module 1 which accommodates a focus mechanism for a lens is disposed in an inside of the fixed cover 260 and, as described below, a shake correction mechanism for swinging the movable module 1 to perform shake correction, especially by hand shake, is structured in the inside of the fixed cover 260. The movable module 1 includes a lens drive module 1a accommodating the focus mechanism for a lens in its inside and the lens drive module 1a is held in the inside of a rectangular tube-shaped module cover 160.

Figure 2A:
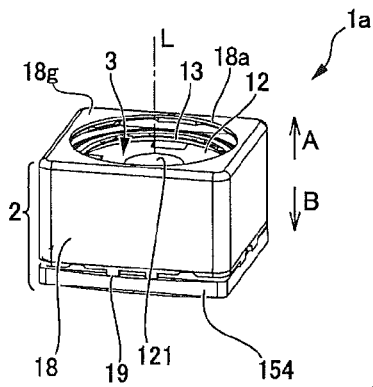
FIGS. 2(a) and 2(b) are explanatory views showing a lens drive module which is structured within a movable module of an optical unit with shake correcting function in accordance with an embodiment of the present invention.
Figure 2B:
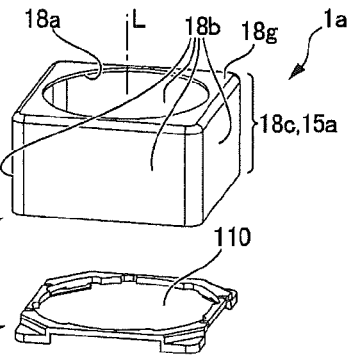
Figure 3:
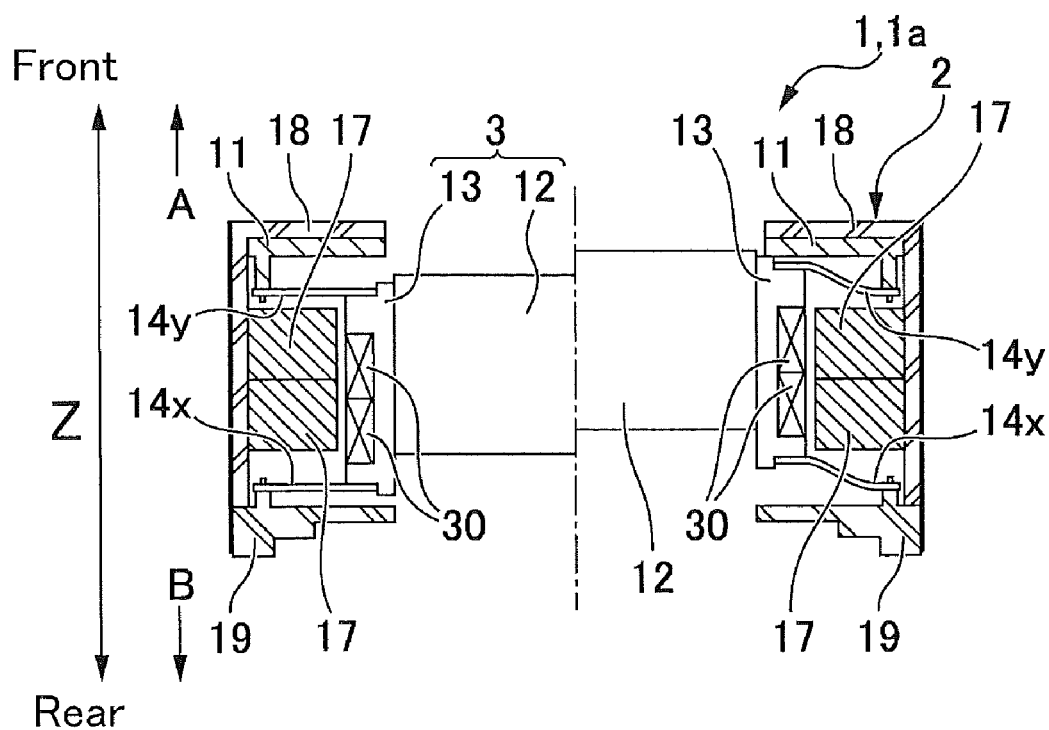
FIG. 3 is an explanatory view schematically showing an operation of the lens drive module shown in FIGS. 2(a) and 2(b).

FIGS. 2(a) and 2(b) are explanatory views showing the lens drive module 1a which is structured in the movable module 1 of the optical unit 200 with shake correcting function in accordance with an embodiment of the present invention. FIG. 2(*a*) is an outward appearance view showing the lens drive module 1*a* which is viewed from obliquely above and FIG. 2(*b*) is its exploded perspective view. FIG. 3 is an explanatory view schematically showing an operation of the lens drive module 1*a* shown in FIGS. 2(*a*) and 2(*b*). The left half portion in FIG. 3 shows a state where the movable body 3 is located at an infinity position (normal photographing position) and the right half portion in FIG. 3 shows a state where the movable body 3 is located at a macro-position (close-up photographing position).

In FIGS. 2(*a*) and 2(*b*) and FIG. 3, the lens drive module 1*a* moves a lens along the direction of the optical axis "L" in both of an "A"-direction (front side) toward an object to be photographed side (object side) and a "B"-direction (rear side) toward an opposite side to the object to be photographed side (imaging element side/image side). The lens drive module 1*a* is formed in a substantially rectangular parallelepiped shape. The lens drive module 1*a* generally includes the movable body 3, which holds three lenses 121 and a fixed diaphragm in its inside, a lens drive mechanism 5 for moving the movable body 3 along the direction of the optical axis "L", and a support body 2 on which the lens drive mechanism 5, the movable body 3 and the like are mounted. The movable body 3 includes a lens holder 12 in a cylindrical shape which holds the lenses 121 and the fixed diaphragm and a lens drive coil holder 13 which holds lens drive coils 30*s* and 30*t* described below on its outer peripheral side face.

The support body 2 includes an imaging element holder 19 in a rectangular plate shape which holds an imaging element 15 in a positioned state on an opposite side to the object to be photographed side, a box-shaped case 18 which is disposed on the object to be photographed side as a cover to the imaging element holder 19, and a spacer 11 in a rectangular plate shape which is disposed in the inside of the case 18. Centers of the case 18 and the spacer 11 are respectively formed with circular incident windows 110 and 18*a* for introducing a light from the object to be photographed into the lenses 121. Further, a center of the imaging element holder 19 is formed with an opening 19*a* for introducing the incident light into the imaging element 15.

In the lens drive module 1*a*, the support body 2 includes a circuit board 154 on which the imaging element 15 is mounted and the circuit board 154 is fixed to the under face of the imaging element holder 19. The circuit board 154 is a double-side circuit board and the flexible circuit board 300 shown in FIGS. 1(*a*), 1(*b*) and 1(*c*) is connected with the under face of the circuit board 154.

In this embodiment, the case 18 is made of a ferromagnetic plate such as a steel plate and functions as a yoke. Therefore, the case 18 structures an interlinkage magnetic field generating body 4 together with lens drive magnets 17 described below for generating interlinkage magnetic field with lens drive coils 30*s* and 30*t* which are held by a lens drive coil holder 13. The interlinkage magnetic field generating body 4 structures the lens drive mechanism 5 together with the lens drive coils 30*s* and 30*t* which are wound around the outer peripheral face of the lens drive coil holder 13.

The support body 2 and the movable body 3 are connected with each other through metal spring members 14*s* and 14*t*. Basic structures of the spring members 14*s* and 14*t* are similar to each other. Each of the spring members 14*s* and 14*t* is provided with an outer peripheral side connecting part 14*a* which is held by the support body 2, a ring-shaped inner peripheral side connecting part 14*b* which is held by the movable body 3, and an arm-shaped flat spring part 14*c* which connects the outer peripheral side connecting part 14*a* with the inner peripheral side connecting part 14*b*. The outer peripheral side connecting part 14*a* of the spring member 14*s* on the imaging element side is held by the imaging element holder 19 and its inner peripheral side connecting part 14*b* is connected with an imaging element side end face of the lens drive coil holder 13 of the movable body 3. The outer peripheral side connecting part 14*a* of the spring member 14*t* on the object to be photographed side is held by the spacer 11, and its inner peripheral side connecting part 14*b* is connected with an object to be photographed side end face of the lens drive coil holder 13 of the movable body 3. In this manner, the movable body 3 is movably supported along the direction of the optical axis "L" by the support body 2 through the spring members 14*s* and 14*t*. Each of the spring members 14*s* and 14*t* is made of nonmagnetic metal such as beryllium copper or nonmagnetic SUS steel material and is formed by means of that a thin plate having a predetermined thickness is performed by press working or etching processing with the use of a photo lithography technique. The spring member 14*s* is divided into two spring pieces 14*e* and 14*f* and coil ends of the lens drive coils 30*s* and 30*t* are respectively connected with the spring pieces 14*e* and 14*f*. Further, the spring pieces 14*e* and 14*f* of the spring member 14*s* are respectively formed with terminals 14*d* and the spring member 14*s* (spring pieces 14*e* and 14*f*) functions as a power supply member to the lens drive coils 30*s* and 30*t*.

In this embodiment, a ring-shaped magnetic piece 61 is held on the front side end face of the lens drive coil holder 13 and the magnetic piece 61 is located at a front side position with respect to the lens drive magnets 17. The magnetic piece 61 applies an urging force in the direction of the optical axis "L" to the movable body 3 by an attraction force generated between the lens drive magnets 17 and the magnetic piece 61. Therefore, the movable body 3 is prevented from being displaced by its own weight at the time of no energization and thus the movable body 3 is maintained in a desired posture and, in addition, its impact resistance is improved. Further, since the magnetic piece 61 is disposed on the front side end face of the lens holder 12, at the time of no energization (home position), the lens holder 12 is placed in a stationary state on the rear side by means of that the magnetic piece 61 is attracted by the lens drive magnets 17.

In the lens drive module 1*a* in this embodiment, when viewed from the direction of the optical axis "L", the lens 121 is formed in a circular shape but the case 18 used for the support body 2 is formed in a rectangular box shape. Therefore, the case 18 is provided with a rectangular tube-shaped body part 18*c* and an upper plate part 18*g* having an incident window 18*a* which is formed on an upper face of the rectangular tube-shaped body part 18*c*. In this embodiment, the rectangular tube-shaped body part 18*c* is formed in a square tube shape and provided with four side plate parts 18*b* at respective positions corresponding to sides of a quadrangle when viewed from the direction of the optical axis "L". Respective inner faces of four side plate parts 18*b* are fixed with the lens drive magnets 17 and each of the lens drive magnets 17 is formed of a rectangular flat plate-shaped permanent magnet. Each of four lens drive magnets 17 is magnetically divided into two pieces in the direction of the optical axis "L" and each of the pieces is magnetized so that its inner face and outer face are magnetized in different poles from each other. In four lens drive magnets 17, for example, an inner face of an upper half portion is magnetized in an "N"-pole and its outer face is magnetized in an "S"-pole, and an inner face of a lower half portion is magnetized in an "S"-pole and its outer face is magnetized in an "N"-pole. Therefore, in four lens drive magnets 17, arrangement of the magnetic poles of adjacent permanent magnets is the same as each other and thus interlinkage flux lines to the coils are generated efficiently.

The movable body 3 includes the lens holder 12 in a cylindrical shape, which holds the lenses 121 and the like, and the lens drive coil holder 13 in which the coil (lens drive coils 30s and 30t) are wound around its outer peripheral side face. A side wall portion of the movable body 3 is structured by the lens holder 12 and the lens drive coil holder 13. The lens holder 12 is structured so that its upper half portion is formed in a large diameter cylindrical part 12b having a larger diameter and its lower half portion is formed in a small diameter cylindrical part 12a having a smaller diameter than the large diameter cylindrical part 12b. The lens drive coil holder 13 is provided with a circular lens holder accommodating opening 130 for holding the lens holder 12 in its inside.

In this embodiment, an inner circumferential shape of the lens drive coil holder 13 is circular when viewed from the direction of the optical axis "L" but its outer peripheral side face 131 which defines the outer peripheral shape of the lens drive coil holder 13 is rectangular and thus four faces 132 are provided at respective positions corresponding to four sides of the quadrangle. On the outer peripheral side face 131 of the lens drive coil holder 13, rib-shaped protruded parts 131a, 131b and 131c are formed at both end positions and a middle position in the direction of the optical axis "L" over the whole circumference. A recessed part between the rib-shaped protruded part 131a which is formed at the imaging element side end part and the rib-shaped protruded part 131b formed at the middle position is a first coil winding part 132a, and a recessed part between the rib-shaped protruded part 131c which is formed at the object side end part and the rib-shaped protruded part 131b formed at the middle position is a second coil winding part 132b.

Each of four faces 132 of the lens drive coil holder 13 is formed with a rectangular through hole (through holes 133a and 133b) so that the first coil winding part 132a and the second coil winding part 132b are respectively removed so as to avoid the corner portion of the quadrangle. The through holes 133a and 133b are penetrated through the side wall face of the lens drive coil holder 13 in an inside and outside direction. In this manner, in this embodiment, hollow portions which are recessed toward inside are structured in the outer peripheral side face 131 of the movable body 3 by the through holes 133a and 133b of the lens drive coil holder 13. The through holes 133a and 133b are formed at center portions in the circumferential direction between adjacent corner portions in the outer peripheral side face 131 of the lens drive coil holder 13. Lengths of the through holes 133a and 133b in the circumferential direction are set to be about ⅓ dimension of lengths of the respective faces 132 (side dimension of the quadrangle). Therefore, the corner portions of the lens drive coil holder 13 are formed with support portions 134 having a larger wall thickness which are extended with a similar thickness toward the direction of the optical axis "L".

In the lens drive coil holder 13 which is structured as described above, the lens drive coil 30s is wound around the first coil winding part 132a and the lens drive coil 30t is wound around the second coil winding part 132b. In this embodiment, the first coil winding part 132a and the second coil winding part 132b are formed in a rectangular shape when viewed from the direction of the optical axis "L" and thus the lens drive coils 30s and 30t are wound around in a rectangular tube shape. As described above, each of four lens drive magnets 17 is magnetically divided into two pieces in the direction of the optical axis "L" and each of the pieces is magnetized so that its inner face and outer face are magnetized in different poles from each other. Therefore, winding directions of two lens drive coils 30s and 30t are opposite to each other.

The lens drive coil holder 13 which is structured as described above is disposed in the inside of the case 18. As a result, four side parts of the lens drive coils 30s and 30t are respectively faced with the lens drive magnets 17 which are fixed to the inner face of the rectangular tube-shaped body part 18c of the case 18.

In the lens drive module 1a in this embodiment, the movable body 3 is normally located on the imaging element side (rear side) and, in this state, when an electric current is supplied to the lens drive coils 30s and 30t in a predetermined direction, the lens drive coils 30s and 30t are respectively received with an upward (front side) electro-magnetic force. Therefore, the movable body 3 to which the lens drive coils 30s and 30t are fixed begins to move toward the object to be photographed side (front side). On the other hand, elastic forces which restrict movement of the movable body 3 are occurred between the spring member 14t and the front end of the movable body 3 and between the spring member 14s and the rear end of the movable body 3. Therefore, the movable body 3 is stopped when the electro-magnetic force moving the movable body 3 toward the front side and the elastic forces restricting movement of the movable body 3 are balanced with each other. In this case, when an amount of the electric current supplied to the lens drive coils 30s and 30t is adjusted according to the elastic forces acting on the movable body 3 by the spring members 14s and 14t, the movable body 3 can be stopped at a desired position.

Further, in the lens drive module 1a, the lens 121 is circular but the lens drive coils 30s and 30t are rectangular regardless of the lens shape, and the lens drive magnets 17 are flat plate-shaped permanent magnets which are respectively fixed to a plurality of inner faces corresponding to sides of the rectangular tube-shaped body part 18c of the case 18 in the support body 2 whose inner peripheral faces are formed in a rectangular shape. Therefore, even when there is no sufficient space between the movable body 3 and the support body 2 on the outer peripheral side of the movable body 3, facing area of the lens drive coils 30s and 30t with the lens drive magnets 17 is larger and thus a sufficient thrust force is obtained.

In the lens drive module 1a which is structured as described above, the imaging element 15 and the lens drive coils 30s and 30t are required to be electrically connected with a control section (not shown) of a device main body. Therefore, in this embodiment, the flexible circuit board 300 (see FIGS. 1(a), 1(b) and 1(c)) is disposed on an opposite side to the object to be photographed side with respect to the lens drive module 1a, and the imaging element 15 and the lens drive coils 30s and 30t are electrically connected with wiring patterns which are formed on the flexible circuit board 300.

As shown in FIG. 1(c), the optical unit 200 with shake correcting function in this embodiment is mounted on an apparatus 500 such as a cell phone for being used to photograph. When an object is to be photographed in the apparatus 500, the Z-axis is generally directed horizontally. Therefore, longitudinal shake around the X-axis and lateral shake around the Y-axis may occur due to shake of hand when a shutter is pushed. Accordingly, in this embodiment, a shake correction function is provided which will be described below with reference to FIG. 4(a) through FIG. 14(c). In the shake correction mechanism, a shake detection sensor is provided in the movable module 1, and it is structured that the movable module 1 which is disposed to be capable of swinging around the X-axis and the Y-axis with respect to the fixed body 210 is swung by a magnetic drive mechanism for shake correction.

Detailed structure of a shake correction mechanism which is structured in the optical unit 200 with shake correcting function in this embodiment will be described below in the following order:

Entire structure of the optical unit 200 with shake correcting function . . . FIG. 4(a) through FIG. 7

Detailed structure of the movable module 1 . . . FIG. 4(a) through FIG. 10

Structure of a support mechanism for the movable module 1 . . . FIG. 4(a) through FIG. 5(b) and FIG. 11(a) through FIG. 12(b)

Structure of a moving range restriction mechanism for the movable module 1 . . . FIG. 13(a) through FIG. 14(c)

Figure 4A:
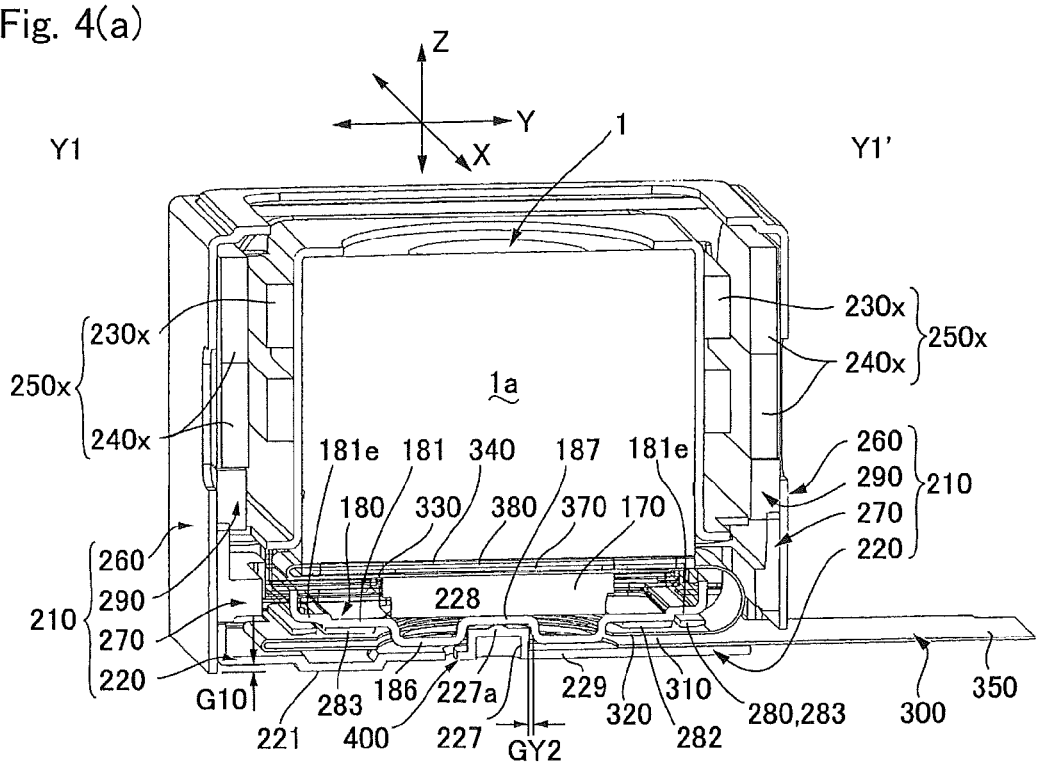
FIGS. 4(a) and 4(b) are explanatory cross sectional views showing the structure of an optical unit with shake correcting function in accordance with an embodiment of the present invention.
Figure 4B:
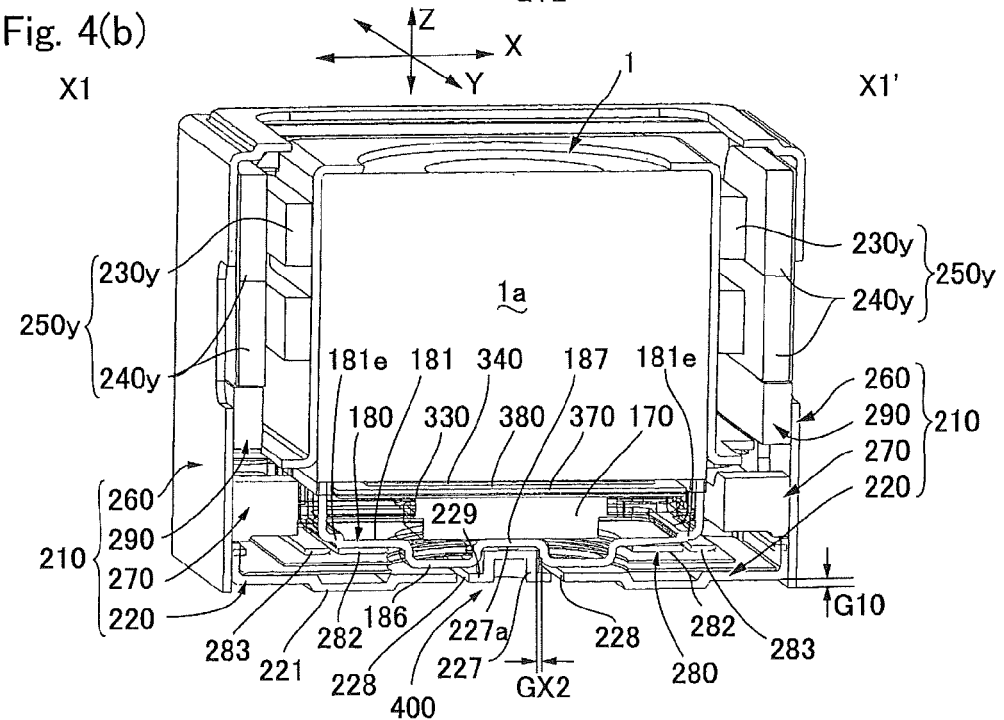
Figure 5A:
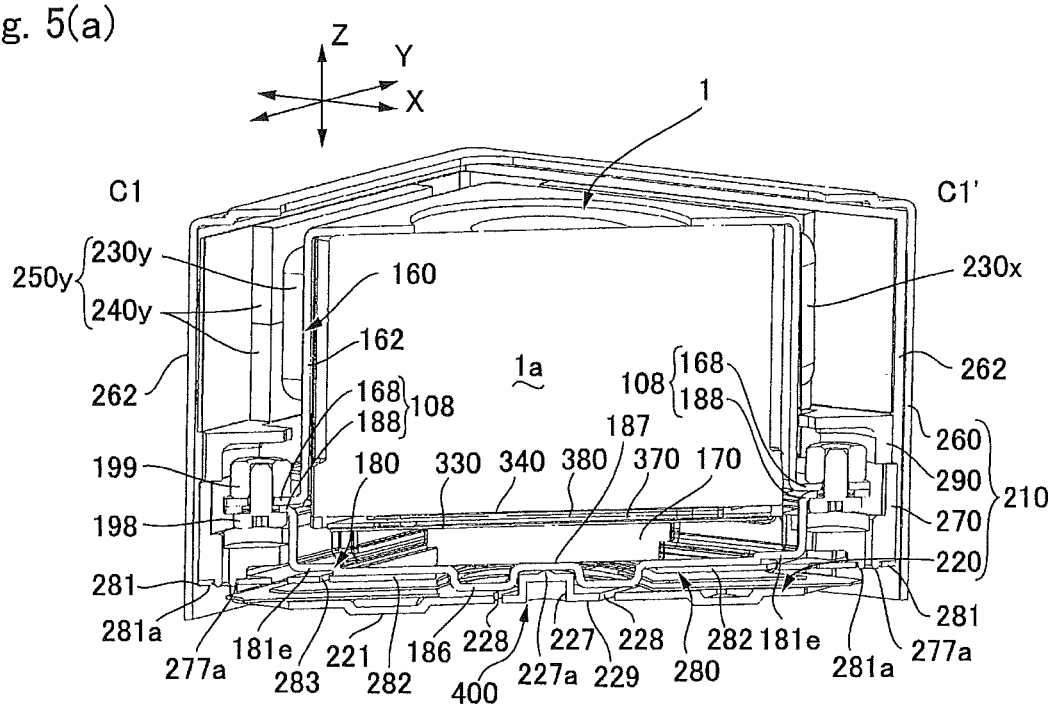
FIGS. 5(a) and 5(b) are explanatory cross sectional views showing the structure of the optical unit with shake correcting function in accordance with an embodiment of the present invention which are cut at positions different from FIGS. 4(a) and 4(b).
Figure 5B:
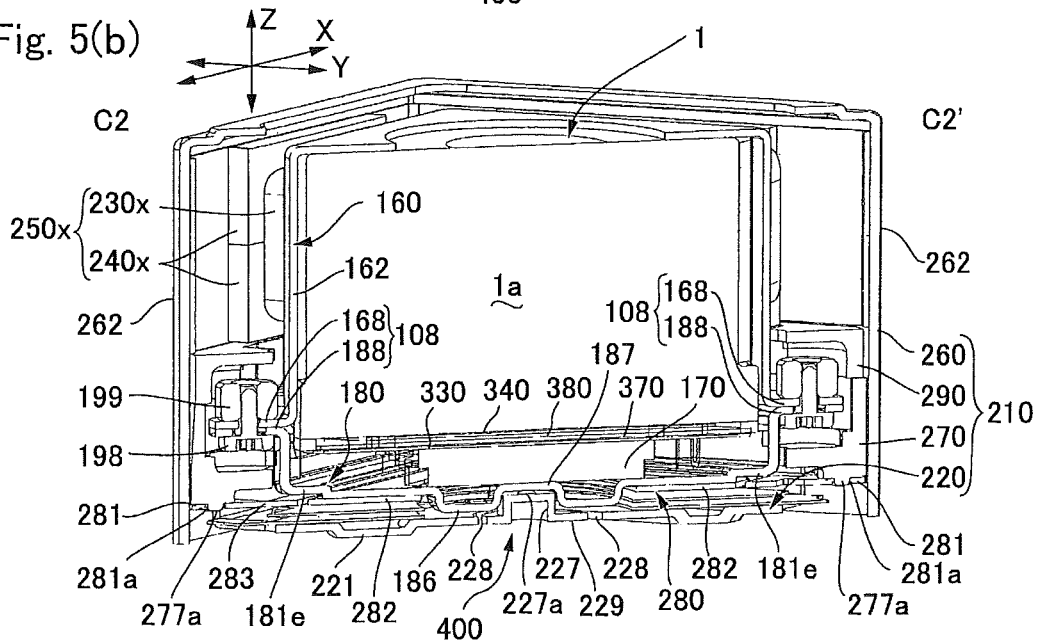
Figure 6:
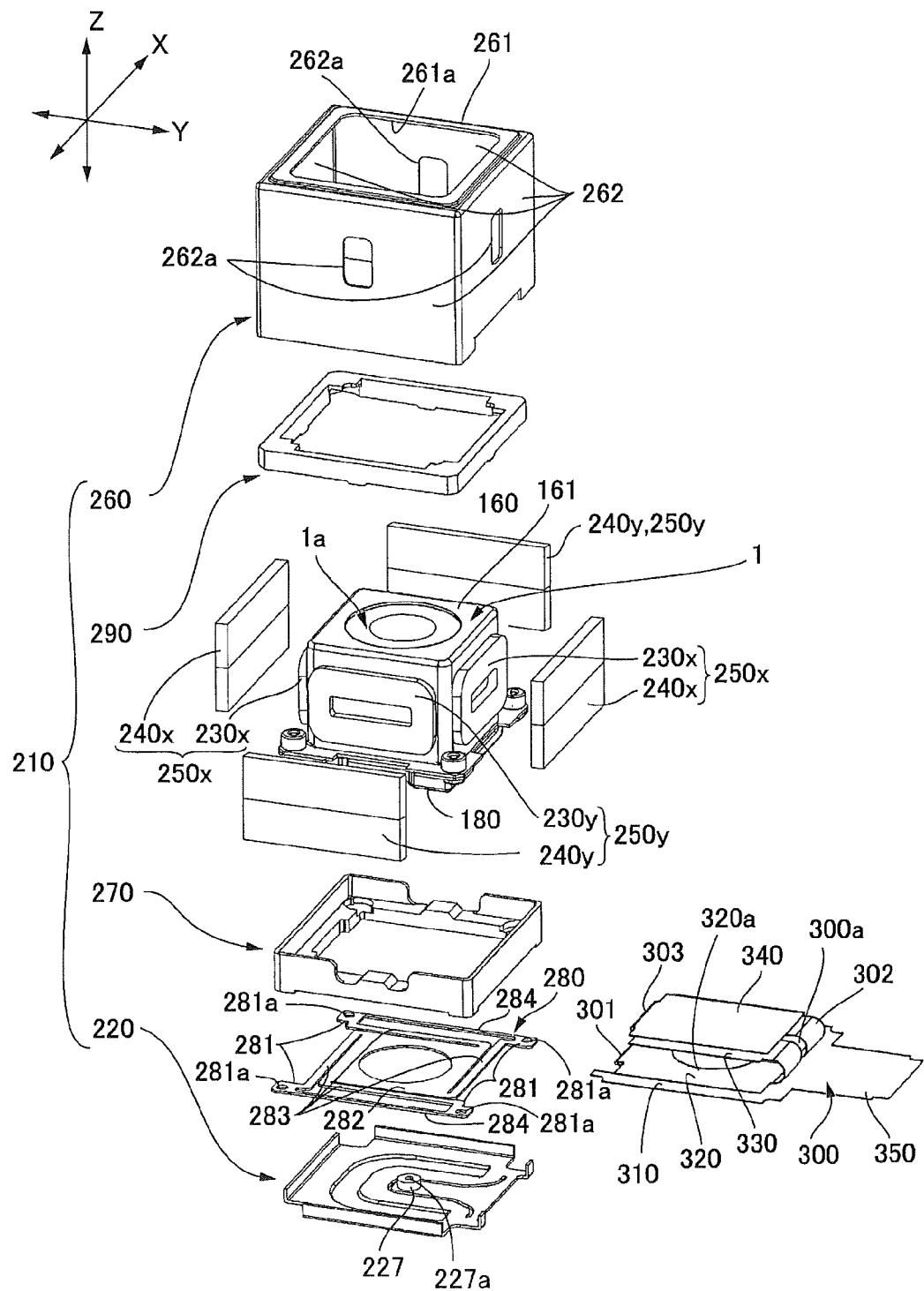
FIG. 6 is an exploded perspective view showing an optical unit with shake correcting function in accordance with an embodiment of the present invention which is viewed from a front side.
Figure 7:
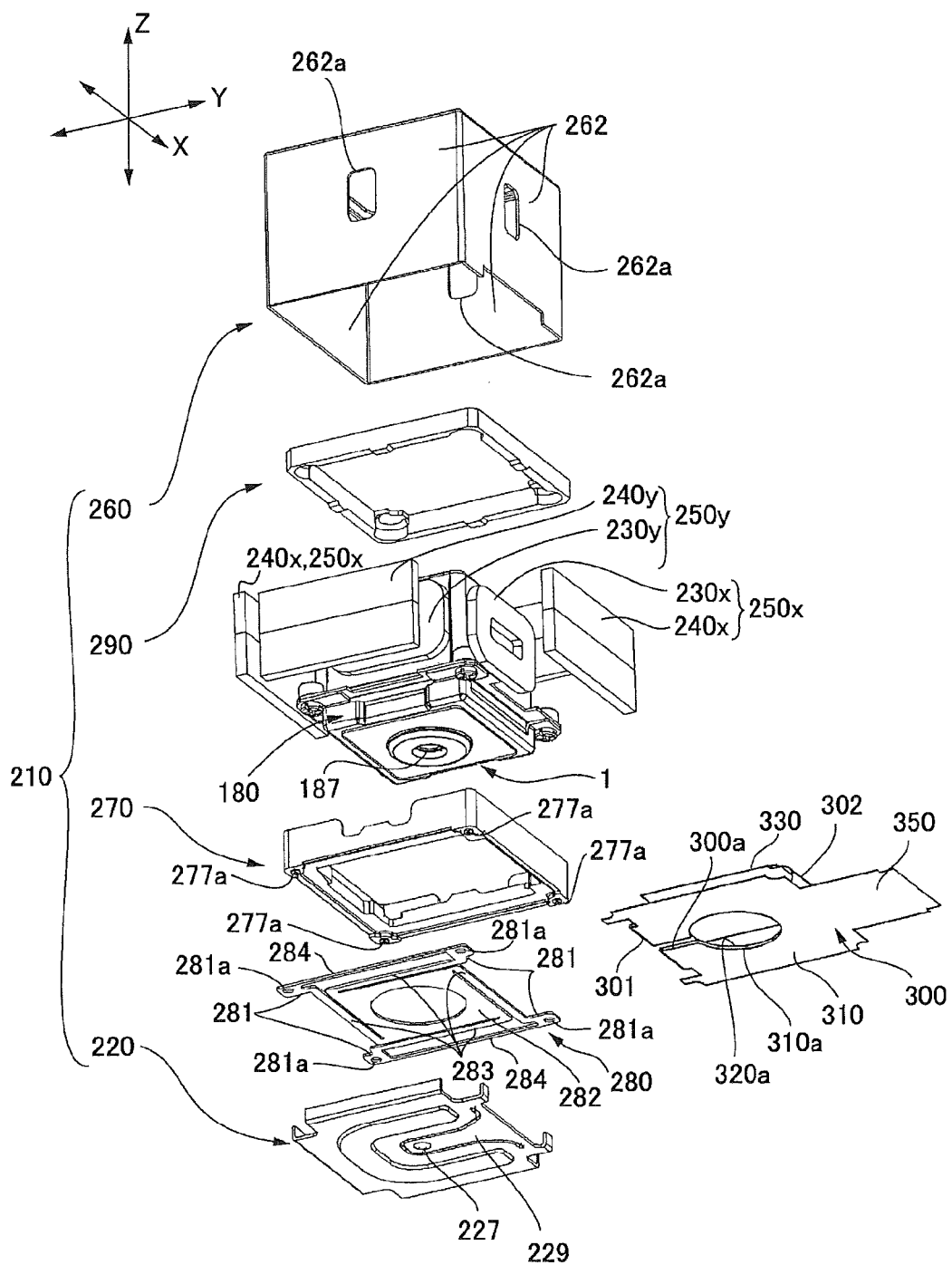
FIG. 7 is an exploded perspective view showing an optical unit with shake correcting function in accordance with an embodiment of the present invention which is viewed from a rear side.
Figure 8A:
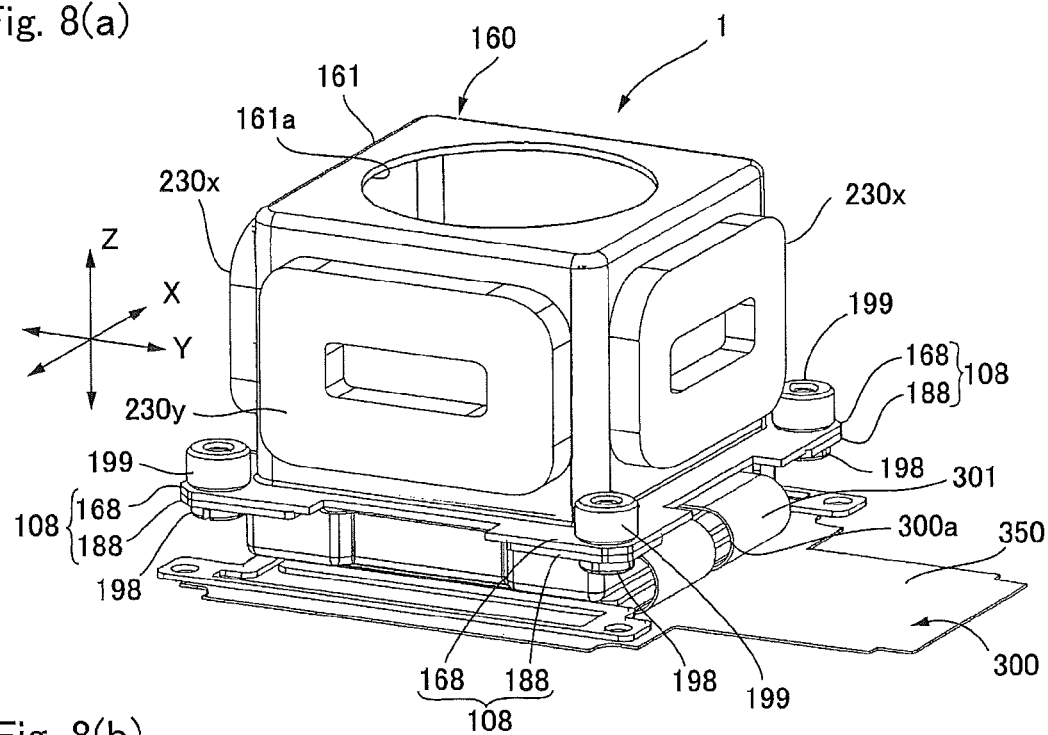
FIGS. 8(a) and 8(b) are explanatory views showing a movable module and structural members connected to the movable module of an optical unit with shake correcting function in accordance with an embodiment of the present invention.
Figure 8B:
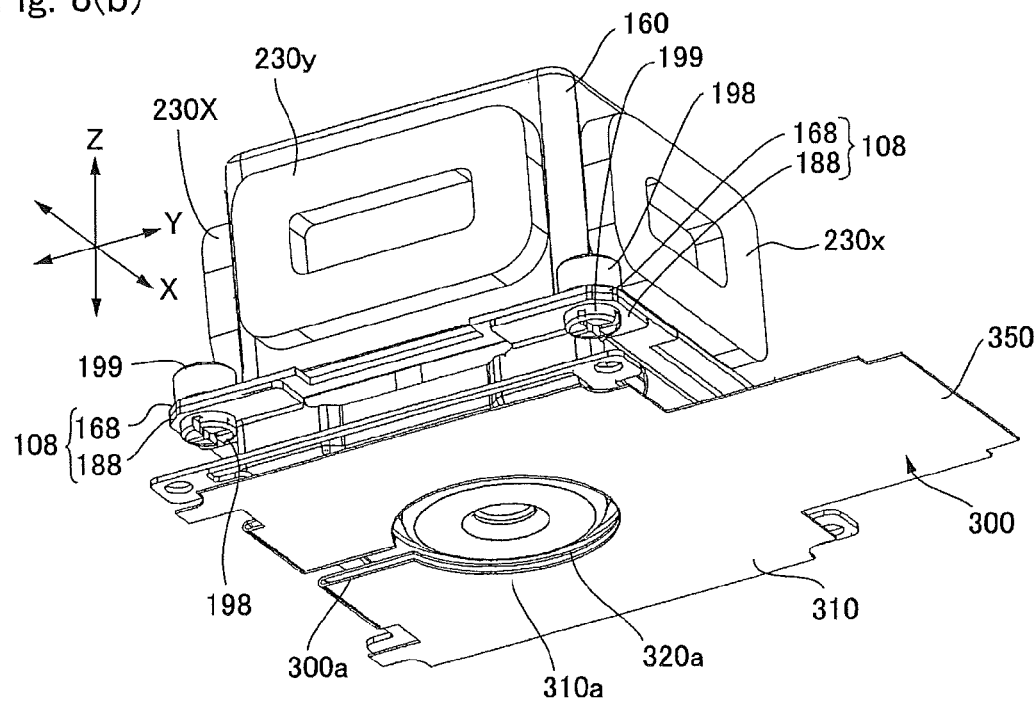

FIGS. 4(a) and 4(b) are explanatory cross sectional views showing the structure of the optical unit 200 with shake correcting function to which the present invention is applied. FIG. 4(a) is a longitudinal sectional view showing the optical unit 200 with shake correcting function which is cut at a position corresponding to the "Y1-Y1" line in FIG. 1(a) and FIG. 4(b) is a longitudinal sectional view showing the optical unit 200 which is cut at a position corresponding to the "X1-X1'" line in FIG. 1(a). FIGS. 5(a) and 5(b) are explanatory cross sectional views showing the structure of the optical unit 200 with shake correcting function to which the present invention is applied and which are cut at different positions from FIGS. 4(a) and 4(b). FIG. 5(a) is a longitudinal sectional view showing the optical unit 200 with shake correcting function which is cut at a position corresponding to the "C1-C1'" line in FIG. 1(a) and FIG. 5(b) is a longitudinal sectional view showing the optical unit 200 which is cut at a position corresponding to the "C2-C2" line in FIG. 1(a). FIG. 6 is an exploded perspective view showing the optical unit 200 with shake correcting function to which the present invention is applied and which is viewed from the front side and FIG. 7 is its exploded perspective view which is viewed from the rear side. FIGS. 8(a) and 8(b) are explanatory views showing the movable module 1 and structural members connected with the movable module 1 of the optical unit 200 with shake correcting function to which the present invention is applied. FIG. 8(a) is a perspective view showing the movable module 1 and structural members connected with the movable module 1 which are viewed from the front side and FIG. 8(b) is its perspective view which is viewed from the rear side.

As shown in FIG. 4(a) through FIG. 7, in this embodiment, the fixed body 210 is structured so that a base 220, a rear side stopper member 270, a front side stopper member 290 and a fixed cover 260 are sequentially superposed on each other from the rear side (lower side) to the front side (upper side). The base 220 supports the movable module 1 to be capable of swinging. The rear side stopper member 270 and the front side stopper member 290 function to prevent an excessive displacement of the movable module 1 which is supported to be capable of swinging. The fixed cover 260 functions as a housing of the optical unit 200 with shake correcting function and functions to hold shake correction magnets 240x and 240y.

The flexible circuit board 300 and a spring member 280 (urging member) shown in FIGS. 4(a) and 4(b) and FIGS. 8(a) and 8(b) are disposed between the base 220 and the movable module 1. The flexible circuit board 300 and the spring member 280 are connected with the movable module 1. The flexible circuit board 300 performs function to electrically connect a shake detection sensor 170 and a coil used in a magnetic drive mechanism for shake correction with the outside. The spring member 280 functions to urge the movable module 1 toward the base 220. In addition, the flexible circuit board 300 also performs function to electrically connect the imaging element 15 and the lens drive coils 30s and 30t of the lens drive mechanism 5 with the outside.

Figure 9:
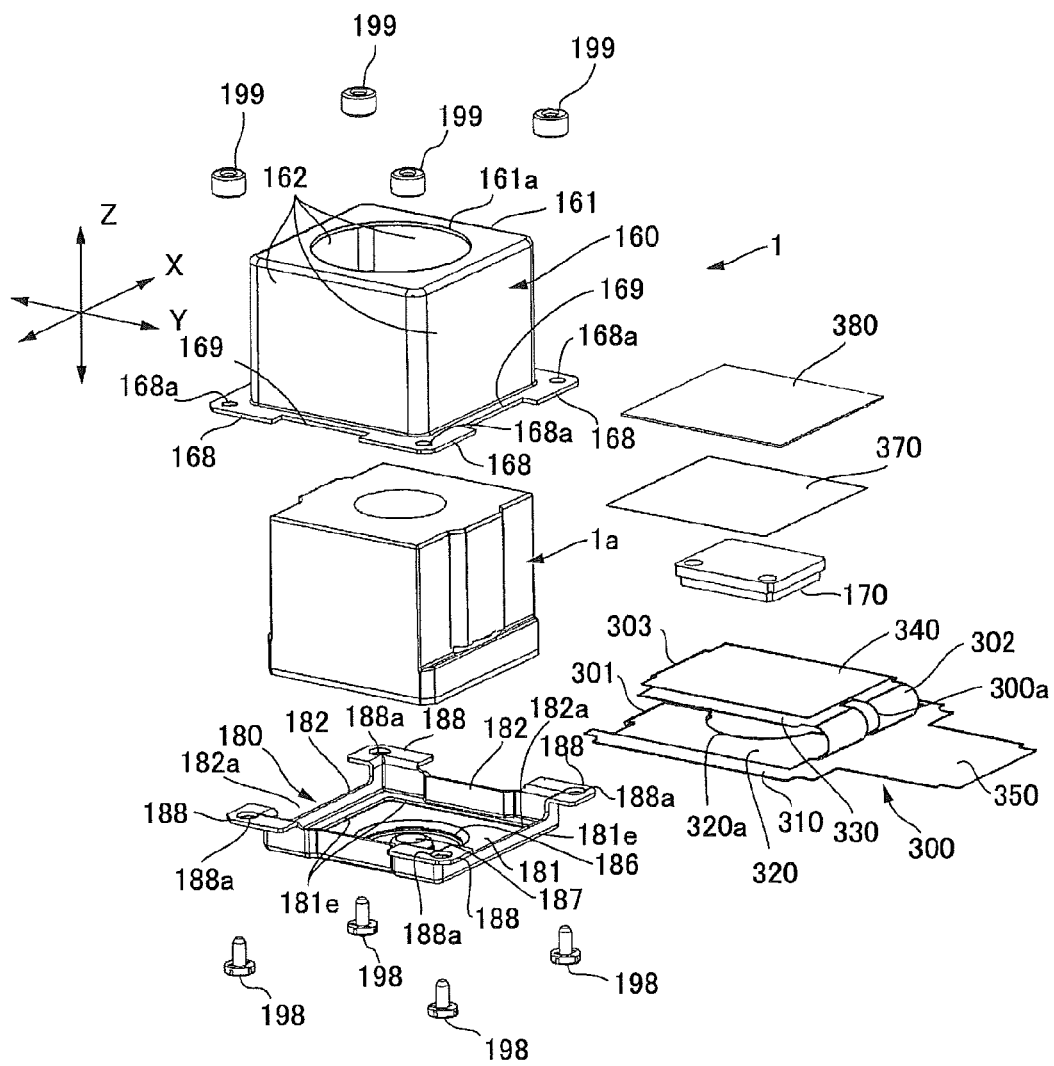
FIG. 9 is an exploded perspective view showing a movable module and a flexible circuit board which are used in an optical unit with shake correcting function in accordance with an embodiment of the present invention which are viewed from a front side.
Figure 10:
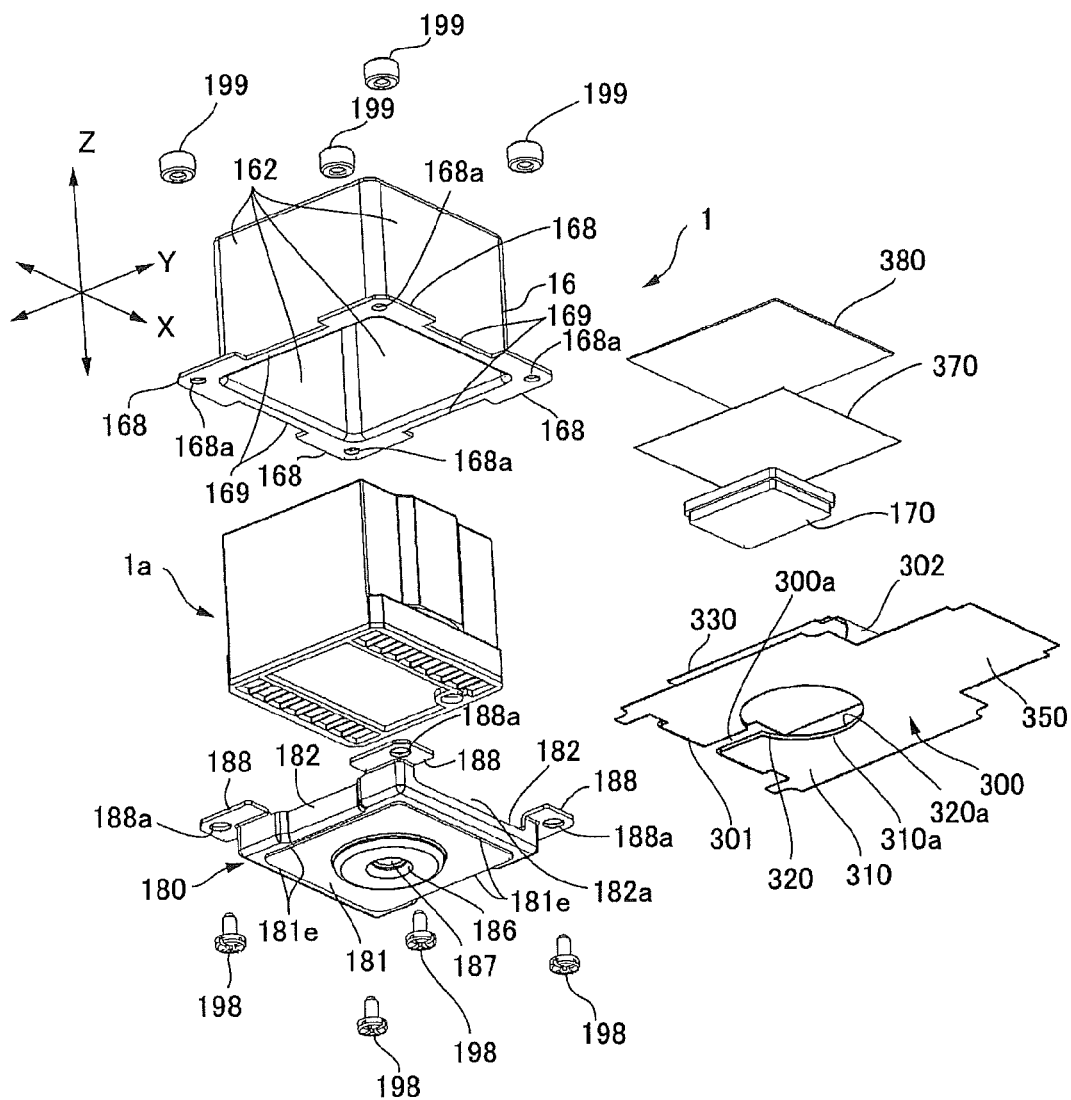
FIG. 10 is an exploded perspective view showing a movable module and a flexible circuit board which are used in an optical unit with shake correcting function in accordance with an embodiment of the present invention which are viewed from a rear side.

FIG. 9 is an exploded perspective view showing the movable module 1 and the flexible circuit board 300 which are used in the optical unit 200 with shake correcting function to which the present invention is applied and which are viewed from the front side, and FIG. 10 is their exploded perspective view which is viewed from the rear side.

As shown in FIG. 4(a) through FIG. 10, the movable module 1 includes a module cover 160 which holds the lens drive module 1a in its inside. In other words, the case 18 in FIGS. 2(a) and 2(b) is fitted into the inside of the module cover 160 and the module cover 160 and the case 18 in FIGS. 2(a) and 2(b) are integrated with each other. Therefore, since the module cover 160 and the case 18 are fixed to each other, the module cover 160 may be referred to as a support body for the lens drive module 1a. The module cover 160 is provided with a rectangular shape when viewed in the Z-axis direction and four side plate parts 162 are extended from an outer circumferential edge of a top plate part 161 formed in a rectangular shape toward the rear side. The top plate part 161 of the module cover 160 is formed with a circular opening part 161a.

A rear end part of the module cover 160 is opened as an aperture and a metal sensor cover 180 is connected with the rear end part of the module cover 160 so as to cover the aperture. In order to attain this connection, in this embodiment, the rear end part of the module cover 160 is formed with a bent part 169 which is protruded to an outer side. The bent part 169 is provided at four corner portions with module cover side flange parts 168 which are largely projected toward the outer side in a plane intersecting the Z-axis (in this embodiment, in a plane perpendicular to the Z-axis).

The sensor cover 180 is provided with a bottom plate part 181 and four side plate parts 182 which are stood up toward the front side from an outer circumferential edge of the bottom plate part 181. Each of four corner portions at front end edges of the side plate parts 182 is formed with a sensor cover side flange part 188 which is projected toward an outer side in a plane intersecting the Z-axis (in this embodiment, in a plane perpendicular to the Z-axis).

The sensor cover side flange part 188 and the module cover side flange part 168 are formed to superpose on each other in the Z-axis direction. Further, the sensor cover side flange part 188 and the module cover side flange part 168 are formed with small openings 188a and 168a. Therefore, in this embodiment, in a state that shaft parts of screws 198 are penetrated through the small openings 188a and 168a, the shaft parts are fitted to tube-shaped members 199 whose inner peripheral faces are formed with a female screw. When the sensor cover 180 and the module cover 160 are connected with each other as described above, as shown in FIG. 4(a) through FIG. 8(b), the outer peripheral face of the movable module 1 is formed with protruded parts 108 so as to project toward the outer side by the module cover side flange part 168 and the sensor cover side flange part 188 at four corner portions of the movable module.

The side plate parts 182 facing in the Y-axis direction of the sensor cover 180 are formed with a cut-out part 182a at their front end edges. Therefore, in the state that the sensor cover 180 and the module cover 160 are connected with each other, gap spaces which are opened in the Y-axis direction are formed between the sensor cover 180 and the module cover 160. Therefore, a part of the flexible circuit board 300 is disposed between the sensor cover 180 and the lens drive module 1a and the lead-out part 350 of the flexible circuit board 300 is extended from the movable module 1 toward one side in the Y-axis direction.

The flexible circuit board 300 is formed in a folded shape where a sheet in a roughly rectangular shape which is extended in the Y-axis direction is bent at three portions in its longitudinal direction (bent portions 301, 302 and 303). Therefore, the flexible circuit board 300 is provided with a lead-out portion 350 extended to the outside, a first flat plate portion 310 which is connected with the lead-out portion 350, a second flat plate portion 320 which is connected with the first flat plate portion 310 through the bent portion 301, a third flat plate portion 330 which is connected with the second flat plate portion 320 through the bent portion 302, and a fourth flat plate portion 340 which is connected with the third flat plate portion 330 through the bent portion 303. The first flat plate portion 310, the second flat plate portion 320, the third flat plate portion 330 and the fourth flat plate portion 340 are disposed in a shape sequentially folded from the rear side to the front side in the Z-axis direction. In this embodiment, the bent portions 301 and 303 are bent at an acute angle but the bent portion 302 is circularly curved in a "U"-shape.

In the flexible circuit board 300, the first flat plate portion 310 and the second flat plate portion 320 are disposed on the rear side (lower side) of the sensor cover 180 and the third flat plate portion 330 and the fourth flat plate portion 340 are disposed between the sensor cover 180 and the lens drive module 1a. Therefore, one side of the flexible circuit board 300 to the bent portion 302 is accommodated into the inside of the movable module 1, and the other side of the flexible circuit board 300 to the bent portion 302 is extended from the movable module 1 to the outside.

In the flexible circuit board 300, the shake detection sensor 170 is mounted on an under face of the third flat plate portion 330 and an under face of the shake detection sensor 170 is adhesively fixed to the sensor cover 180. In this embodiment, the shake to be detected is mainly shake by hand but the shake to be detected is not limited to the hand shake. The portion of the flexible circuit board 300 which is disposed in the inside of the movable module 1 is displaced together with the movable module 1 in an integral manner, and the portion of the flexible circuit board 300 which is extended to the outside from the movable module 1 and is located near the movable module 1 is deformed according to an swing operation of the movable module 1. In this embodiment, as described above, since the sensor cover 180 and the module cover 160 are integrally connected with each other, the shake detection sensor 170 which is adhesively fixed to the sensor cover 180 and the imaging element 15 which is fixed to the module cover 160 are mounted on the movable module 1 in an integral manner.

An upper face of the third flat plate portion 330 is fixed with a metal plate 380 for reinforcement through a flexible double-side tape 370. In this state, the under face side of the shake detection sensor 170 is shielded by the sensor cover 180 and the upper face side of the shake detection sensor 170 is shielded by the metal plate 380. Further, the metal plate 380 is disposed between the shake detection sensor 170 and the imaging element 15 (see FIGS. 2(a) and 2(b)) and thus the metal plate 380 functions also as a shield for the under face side of the imaging element 15. The fourth flat plate portion 340 of the flexible circuit board 300 is electrically connected with the imaging element 15, which is described with reference to FIGS. 2(a) and 2(b), through the circuit board 154 (double-side circuit board). The lens drive coils 30s and 30t are also electrically connected with the flexible circuit board 300 through the spring pieces 14e and 14f. In this embodiment, the shake detection sensor 170 is a surface mounting type gyro-sensor (gyroscope: angular velocity sensor), which detects two axial angular velocity, preferably detects angular velocities of two axes perpendicular to each other.

The first flat plate portion 310 and the second flat plate portion 320 of the flexible circuit board 300, which are disposed on the rear side of the sensor cover 180, are formed with circular openings 310a and 320a having a larger diameter. The openings 310a and 320a are cut-out portions for disposing a support mechanism 400 which supports the movable module 1 to be capable of being swung on the rear face side of the sensor cover 180. As described above, in this embodiment, the cut-out part is formed in the flexible circuit board 300 and the flexible circuit board 300 is disposed so as to avoid the support mechanism 400. Therefore, a space between the base 220 and the movable module 1 can be utilized as an arrangement space of the flexible circuit board 300.

Center portions in a widthwise direction of the first flat plate portion 310, the bent portion 301, the second flat plate portion 320 and the bent portion 302 are formed with a slit 300a which is extended in the Y-axis direction. The slit 300a is continuously extended from the opening 310a which is formed in the first flat plate portion 310 to the bent portion 302. Therefore, since the flexible circuit board 300 is formed with the slit 300a and the openings 310a and 320a, the flexible circuit board 300 can be easily deformed in the widthwise direction (X-axis direction). Further, since the flexible circuit board 300 is symmetrically arranged in the X-axis direction, even when the movable module 1 is swung in any direction around the Y-axis, forces of the flexible circuit board 300 applied to the movable module 1 are equivalent to each other. Therefore, the movable module 1 can be swung appropriately and thus shake correction is performed surely. In addition, the lead-out portion of the flexible circuit board 300 from the movable module 1 is provided with the bent portions 301 and 302 in the Y-axis direction. Therefore, when the movable module 1 is swung around the X-axis, a returning force of deformed flexible circuit board 300 into its original shape hardly affects the swing of the movable module 1.

Figure 11A:
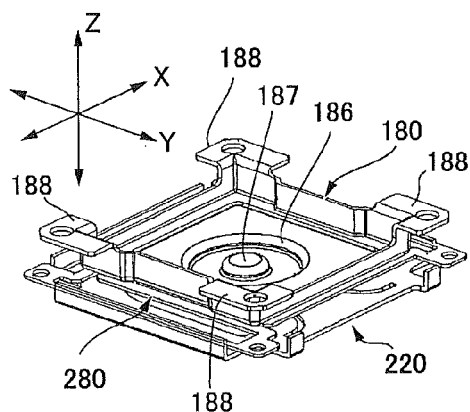
FIGS. 11(a), 11(b), 11(c) and 11(d) are explanatory views showing structural members of a support mechanism and the like in an optical unit with shake correcting function in accordance with an embodiment of the present invention.
Figure 11B:
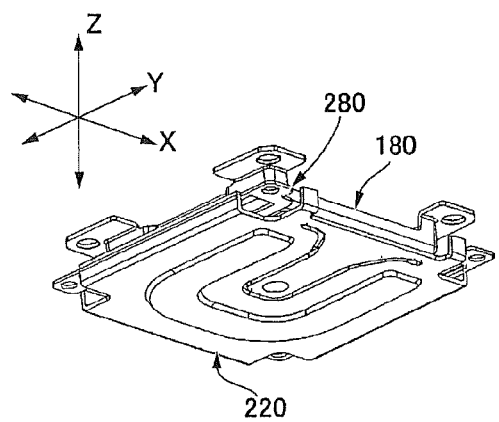
Figure 11C:
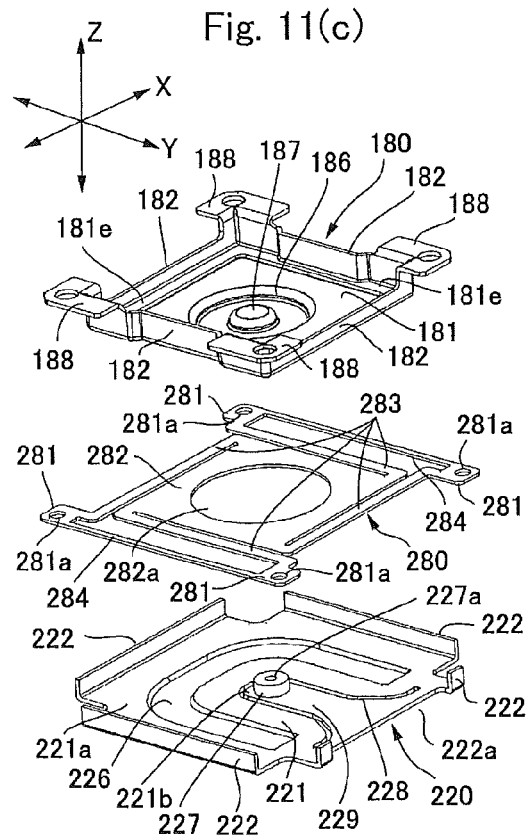
Figure 11D:
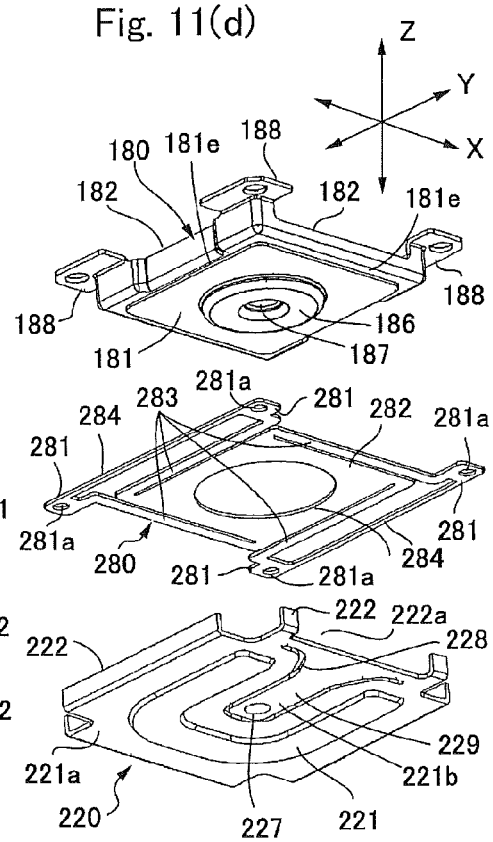
Figure 12A:
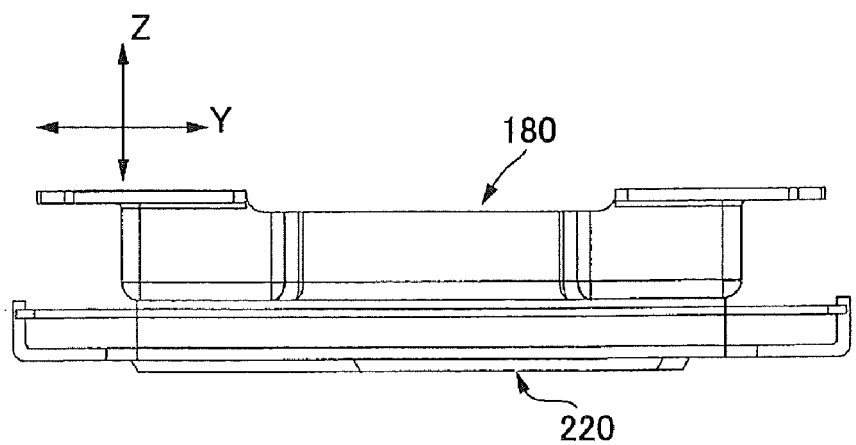
FIG. 12(a) is an explanatory view showing a base, a spring member and a sensor cover of an optical unit with shake correcting function in accordance with an embodiment of the present invention which is viewed from an X-axis direction.
Figure 12B:
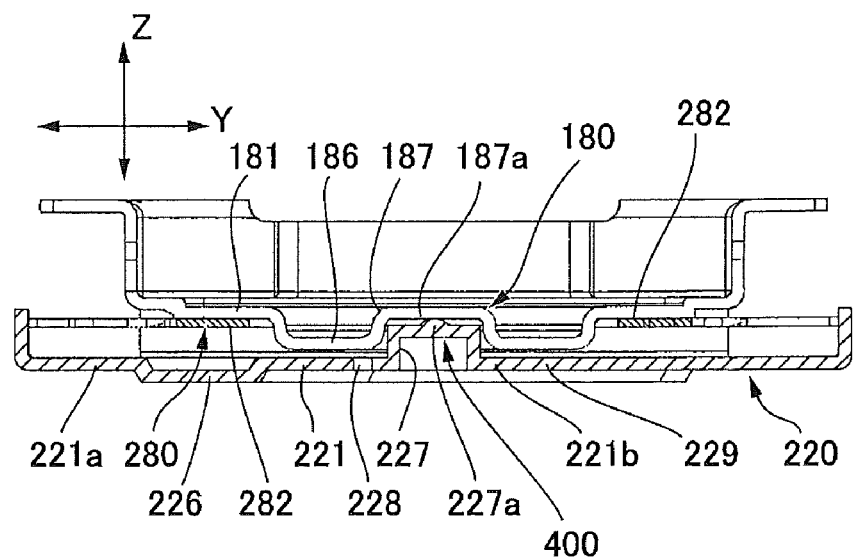
FIG. 12(b) is its sectional view.

FIGS. 11(a) through 11(d) are explanatory views showing members which structure the support mechanism 400 and the like in the optical unit 200 with shake correcting function to which the present invention is applied. FIG. 11(a) is a perspective view showing the base 220, the spring member 280 and the sensor cover 180 of the optical unit 200 with shake correcting function which are viewed from the front side, FIG. 11(b) is their perspective view which is viewed from the rear side, FIG. 11(c) is their exploded perspective view which is viewed from the front side, and FIG. 11(d) is their exploded perspective view which is viewed from the rear side. FIG. 12(a) is an explanatory view showing the base 220, the spring member 280 and the sensor cover 180 of the optical unit 200 with shake correcting function to which the present invention is applied and which is viewed from the X-axis direction, and FIG. 12(b) is their sectional view.

The bottom plate part 181 of the sensor cover 180, which is described with reference to FIGS. 4(a) and 4(b), FIGS. 5(a) and 5(b), FIG. 9 and FIG. 10, is formed so that, as shown in FIGS. 11(a) through 11(d), when viewed from the front side, a center circular portion 186 is dented on the rear side and a recessed part 187 (receiving part for support) is formed at a center portion of the circular portion 186 so as to protrude toward the front side in a bottomed cylindrical shape and so that its under face is opened toward the rear side.

The base 220 which is oppositely disposed on the rear side to the sensor cover 180 is structured so that four side plate parts 222 are stood up from an outer circumferential edge of the rectangular bottom plate part 221 toward the front side, and one of the side plate parts 222 facing in the Y-axis direction is formed with the cut-out part 222a for extending the flexible circuit board 300 to the outside which is described with reference to FIGS. 9 and 10. A center portion of the bottom plate part 221 of the base 220 is formed with a support protruded part 227 in a bottomed cylindrical shape which is protruded toward the front side (upper side). A front end face of the support protruded part 227 is formed with a small protruded part 227a in a hemispheric shape. Therefore, as shown in FIG. 12(a), when the sensor cover 180 is disposed on the front side (upper side) of the base 220, the support protruded part 227 of the base 220 is fitted to the recessed part 187 of the sensor cover 180 and the small protruded part 227a is abutted with the bottom under face 187a of the recessed part 187 as shown in FIGS. 4(a) and 4(b), FIGS. 5(a) and 5(b) and FIG. 12(b).

As described above, in this embodiment, a pivot part is formed between the base 220 of the fixed body 210 and the sensor cover 180 of the movable module 1 through the bottom under face 187a of the recessed part 187 and the small protruded part 227a of the support protruded part 227. The pivot part structures the support mechanism 400 which enables the movable module 1 to swing with respect to the fixed body 210. In this embodiment, the support mechanism 400 is disposed on the rear side of the shake detection sensor 170 at a position where the support mechanism 400 is superposed on the shake detection sensor 170 in the Z-axis direction.

In FIGS. 11(a) through 11(d), the base 220 is a press-worked product which is made of a metal plate. When viewed from the front side (upper side), the bottom plate part 221 is formed with an outer peripheral region 221a and a recessed part 226 which is dented toward the rear side between the center region 221b where the support protruded part 227 is formed and the outer peripheral region 221a. The recessed part 226 is formed to surround three sides of the center region 221b where the support protruded part 227 is formed. Further, the center region 221b of the bottom plate part 221 of the base 220 is formed with a slit 228 which surrounds three sides of the region where the support protruded part 227 is formed. A flat spring part 229 extending in the Y-axis direction is formed by the slit 228. Therefore, the support protruded part 227 is formed at the tip end of the flat spring part 229. Accordingly, when the flat spring part 229 is deformed in the Z-axis direction, the entire support mechanism 400 is displaced in the Z-axis direction.

In this embodiment, the flat spring part 229 is located on a slightly front side relative to the rear face of the base 220. Therefore, as shown in FIGS. 4(a) and 4(b), the rear face of the flat spring part 229 is located on the front side by a predetermined dimension "G10" with respect to the rear face of the base 220 and the rear end edge of the fixed cover 260.

The spring member 280 for urging the movable module 1 toward the base 220 is disposed between the sensor cover 180 of the movable module 1 and the base 220. The spring member 280 generates an urging force in a direction where the bottom under face 187a of the recessed part 187 and the small protruded part 227a of the support protruded part 227 are abutted with each other. The spring member 280 is a flat spring having a rectangular shape and is formed by press working to a metal thin plate made of phosphor bronze, beryllium copper, nonmagnetic SUS steel material or the like, or by etching processing using a photo lithography technique. Four corner portions of the spring member 280 are formed with a fixed body side connecting part 281 which is connected with the fixed body 210. In this embodiment, the fixed body side connecting parts 281 are fixed to the rear side stopper member 270 shown in FIG. 4(a) through FIG. 7 which is a member structuring the fixed body 210. In this embodiment, small openings 281a are formed in the fixed body side connecting parts 281 of the spring member 280 and small protruded parts 277a are formed in four corner portions on the rear side face of the rear side stopper member 270. Therefore, after the small protruded parts 277a of the rear side stopper member 270 are fitted to the small openings 281a of the spring member 280 to position the spring member 280 and the rear side stopper member 270 to each other, adhesion or caulking is performed and, as a result, the fixed body side connecting parts 281 are connected with the fixed body 210.

The center portion of the spring member 280 is formed with a movable module side connecting part 282 in a roughly rectangular shape which is connected with the sensor cover 180 of the movable module 1. A center region of the movable module side connecting part 282 is formed with a circular opening 282a to which a circular portion 186 protruded toward the rear side from the bottom plate part 181 of the sensor cover 180 is fitted. The movable module side connecting part 282 of the spring member 280 is fixed to the rear face of the bottom plate part 181 of the sensor cover 180 by a method such as adhesion.

The spring member 280 is formed in a gimbal-spring shape which is provided with four arm parts 283 having a thinner width whose both ends are connected with the center movable module side connecting part 282 and with four fixed body side connecting parts 281. In this embodiment, four arm parts 283 are respectively extended in the X-axis direction or the Y-axis direction along the side parts of the movable module side connecting part 282. Further, the movable module side connecting part 282 of the spring member 280 is located on the front side relative to the fixed body side connecting parts 281 in the state where the spring member 280 is mounted on the optical unit 200 with shake correcting function. Therefore, the arm parts 283 urge the movable module 1 toward the base 220.

In this embodiment, each of four arm parts 283 is extended from the fixed body side connecting part 281 in the same circumferential direction and four arm parts 283 are provided with the same shape and size and are disposed with an equal angular distance around the optical axis. Therefore, four arm parts 283 are formed in rotational symmetry at 90 degrees, 180 degrees and 270 degrees. Further, the spring member 280 is provided with the movable module side connecting part 282 which is made of a flat plate portion having a wide area and thus the spring member 280 is connected with the sensor cover 180 with a wide area through the movable module side connecting part 282. Therefore, the spring member 280 generates an urging force in the direction where the bottom under face 187a of the recessed part 187 and the small protruded part 227a of the support protruded part 227 are abutted with each other and, when an external force is not applied to the movable module 1, the optical axis "L" of the movable module is held in a parallel posture to the Z-axis.

In this embodiment, the first flat plate portion 310 and the second flat plate portion 320 of the flexible circuit board 300, which are described with reference to FIGS. 9 and 10, are disposed on the rear side of the sensor cover 180 between the spring member 280 and the base 220. Therefore, in the spring member 280, two fixed body side connecting parts 281 are connected with each other in the X-axis direction through beam parts 284 but the beam parts 284 are not formed in the Y-axis direction and cut-out parts are formed between two fixed body side connecting part 281. Therefore, the flexible circuit board 300 can be passed through a space between the fixed body side connecting parts 281 in one of the Y-axis direction.

Further, a portion of the rear face of the bottom plate part 181 of the sensor cover 180, which is superposed on the arm parts 283 of the spring member 280 in the Z-axis direction, is formed as a recessed part 181e which is dented toward the front side in comparison with a region where the movable module side connecting part 282 of the spring member 280 is connected. Therefore, the bottom plate part 181 of the sensor cover 180 is not abutted with the arm parts 283 and, even when the movable module 1 is swung to deform the spring member 280, the bottom plate part 181 of the sensor cover 180 and the arm parts 283 are not abutted with each other.

In this embodiment, as shown in FIGS. 4(a) through 7, as a magnetic drive mechanism for shake correction which generates a magnetic drive force for swinging the movable module 1, two sets of magnetic drive mechanisms for shake correction are structured which are comprised of a first magnetic drive mechanism 250x for shake correction capable of swinging the movable module 1 around the X-axis with the support mechanism 400 as a supporting point and a second magnetic drive mechanism 250y for shake correction capable of swinging the movable module 1 around Y-axis with the support mechanism 400 as a supporting point. Structures of the first magnetic drive mechanism 250x for shake correction and the second magnetic drive mechanism 250y for shake correction will be described below.

In the fixed body 210, a shake correction magnet 240x (first shake correction magnet) formed in a rectangular plate shape which structures a first magnetic drive mechanism 250x for shake correction is held on inner faces of two side plate parts 262 of the fixed cover 260 facing in the Y-axis direction, and a shake correction magnet 240y (second shake correction magnet) formed in a rectangular plate shape which structures a second magnetic drive mechanism 250y for shake correction is held on inner faces of the other two side plate parts 262 facing in the X-axis direction of the fixed cover 260. Each of the shake correction magnets 240x and 240y is a rectangular flat plate-shaped permanent magnet. In this embodiment, the shake correction magnets 240x and 240y are structured of two flat plate-shaped permanent magnets which are arranged in the Z-axis direction and, in the flat plate-shaped permanent magnet, its outer face and inner face are magnetized in different poles from each other. Further, two pieces of the flat plate-shaped permanent magnet which are arranged in the Z-axis direction are magnetized in reverse directions. In accordance with an embodiment of the present invention, the shake correction magnets 240x and 240y may be structured by means of that one piece of permanent magnet is magnetized to have two pairs of different polarities.

Further, in the movable module 1, a shake correction coil 230x (first coil for shake correction) which structures a first magnetic drive mechanism 250x for shake correction is adhesively fixed to outer faces of two side plate parts 162 of the module cover 160 facing in the Y-axis direction, and a shake correction coil 230y (second coil for shake correction) which structures a second magnetic drive mechanism 250y for shake correction is adhesively fixed to outer faces of the other two side plate parts 162 of the module cover 160 facing in the X-axis direction. The shake correction coils 230x and 230y are respectively faced to the shake correction magnets 240x and 240y. Further, two effective side parts located in the Z-axis direction of the shake correction coils 230x and 230y are respectively faced to two pieces arranged in the Z-axis direction of the flat plate-shaped permanent magnet in the shake correction magnets 240x and 240y. In this embodiment, respective end parts of the shake correction coils 230x and 230y are, similarly to the shake detection sensor 170, the imaging element 15, the lens drive coils 30s and 30t of the lens drive mechanism 5, electrically connected with the outside through the flexible circuit board 300. The side plate part 262 of the fixed cover 260 is formed with small opening parts 262a which are utilized, for example, to apply an adhesive for reinforcement after the shake correction magnets 240x and 240y have been fixed to the side plate parts 262.

As described above, in this embodiment, a pair of the first magnetic drive mechanisms 250x for shake correction is structured at two portions so as to face in the Y-axis direction and superpose the support mechanism 400 therebetween for swinging the movable module 1 around the X-axis. Two shake correction coils 230x in the first magnetic drive mechanisms 250x for shake correction are electrically connected so as to generate magnetic-drive forces in the movable module 1 in the same direction around the X-axis when energized. Therefore, two first magnetic drive mechanisms 250x for shake correction apply moments in the same direction around the X-axis passing through the support mechanism 400 to the movable module 1 when two shake correction coils 230x are energized. Further, in this embodiment, a pair of the second magnetic drive mechanisms 250y for shake correction is structured at two portions so as to face in the X-axis direction and superpose the support mechanism 400 therebetween for swinging the movable module 1 around the Y-axis. Two shake correction coils 230y in the second magnetic drive mechanisms 250y for shake correction are electrically connected so as to generate magnetic-drive forces in the movable module 1 in the same direction around the Y-axis when energized. Therefore, two second magnetic drive mechanisms 250y for shake correction apply moments in the same direction around the Y-axis passing through the support mechanism 400 to the movable module 1 when two shake correction coils 230y are energized.

In this embodiment, the fixed cover 260 is made of magnetic body and functions as a yoke to the shake correction magnets 240x and 240y.

In a cell phone with a camera on which the optical unit 200 with shake correcting function structured as described above is mounted, the shake detection sensor 170 such as a gyrosensor (gyroscope) is mounted on the movable module 1 to detect shake at the time of photographing. A control section which is mounted on the cell phone with a camera supplies an electric current to one or both of the shake correction coils 230x and the shake correction coils 230y based on a detection result in the shake detection sensor 170 and the movable module 1 is swung one or both of around the X-axis and the Y-axis. When these swing operations are synthesized, the movable module 1 can be swung in the entire "X-Y" plane. Therefore, all shakes occurred in the cellular phone with a camera can be corrected surely.

In order to perform shake correction, in this embodiment, the shake detection sensor 170 is mounted on the movable module 1 and a control section (not shown) performs a closed loop control in the first magnetic drive mechanism 250x for shake correction and the second magnetic drive mechanism 250y for shake correction so that an angular velocity which is detected by the shake detection sensor 170 becomes zero. Alternatively, the control section (not shown) performs a closed loop control in the first magnetic drive mechanism 250x for shake correction and the second magnetic drive mechanism 250y for shake correction so that an integral value of the angular velocity, i.e., angular displacement which is detected by the shake detection sensor 170 becomes zero.

In this embodiment, the shake detection sensor 170 is mounted on the movable module 1. Specifically, the shake detection sensor 170 is adhesively fixed to the sensor cover 180 and the sensor cover 180 is integrally connected to the module cover 160 and thus the shake detection sensor 170 is mounted on the movable module 1. Therefore, since shake of the optical axis "L" is directly detected by the shake detection sensor 170, the shake can be corrected with a high degree of accuracy.

Further, since the movable module 1 is swung with the support mechanism 400 structured on the rear side of the movable module 1 as a center, deformation of the flexible circuit board 300 is extremely small. Therefore, the returning force to its original shape is small when the flexible circuit board 300 is deformed and thus the movable module 1 can be swung quickly.

In this embodiment, magnetic center positions in the Z-axis direction of magnetic forces acting on the movable module 1 with the swing supporting point of the support mechanism 400 as a reference are located at farther positions than the center position in the Z-axis direction of the movable module 1. Therefore, magnetic-drive forces of the first magnetic drive mechanism 250x for shake correction and the second magnetic drive mechanism 250y for shake correction which are required to swing the movable module 1 can be small.

On the other hand, with the swing supporting point of the support mechanism 400 as a reference, when magnetic center positions in the Z-axis direction of magnetic forces acting on the movable module 1 are located at nearer positions than the center position in the Z-axis direction of the movable module 1, the movable module 1 can be swung largely with a little displacement and thus responsibility of shake correction is superior.

Figure 13A:
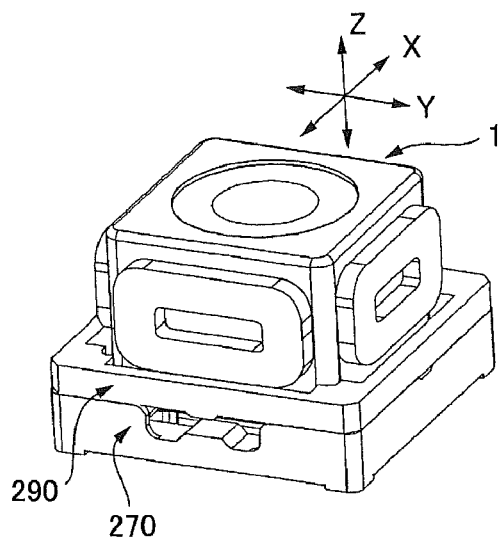
FIGS. 13(a), 13(b), 13(c) and 13(d) are explanatory views showing structural members for restricting a moving range of the movable module in an optical unit with shake correcting function in accordance with an embodiment of the present invention.
Figure 13B:
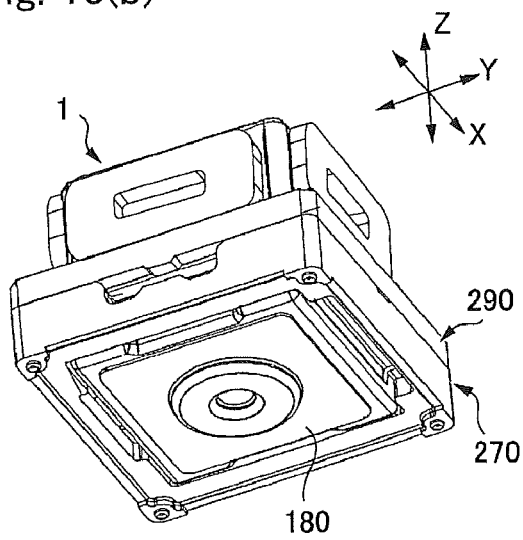
Figure 13C:
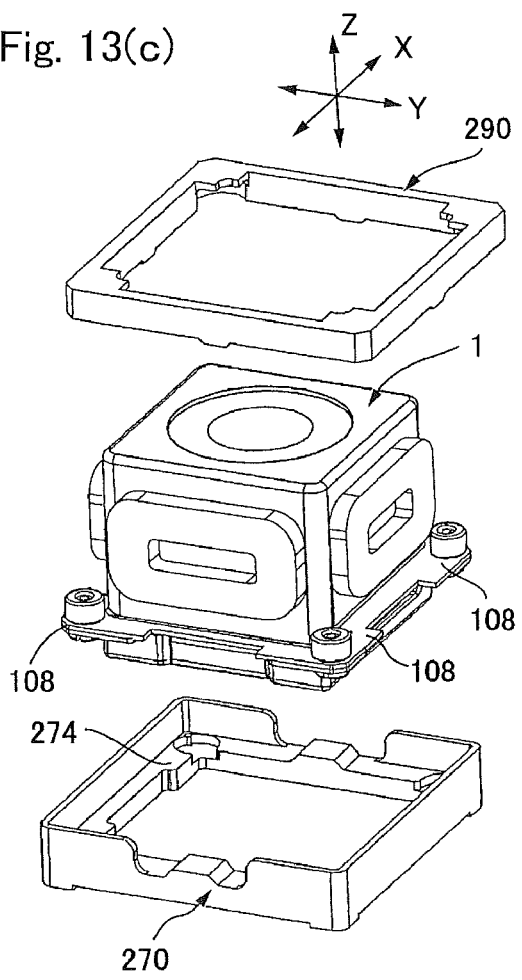
Figure 13D:
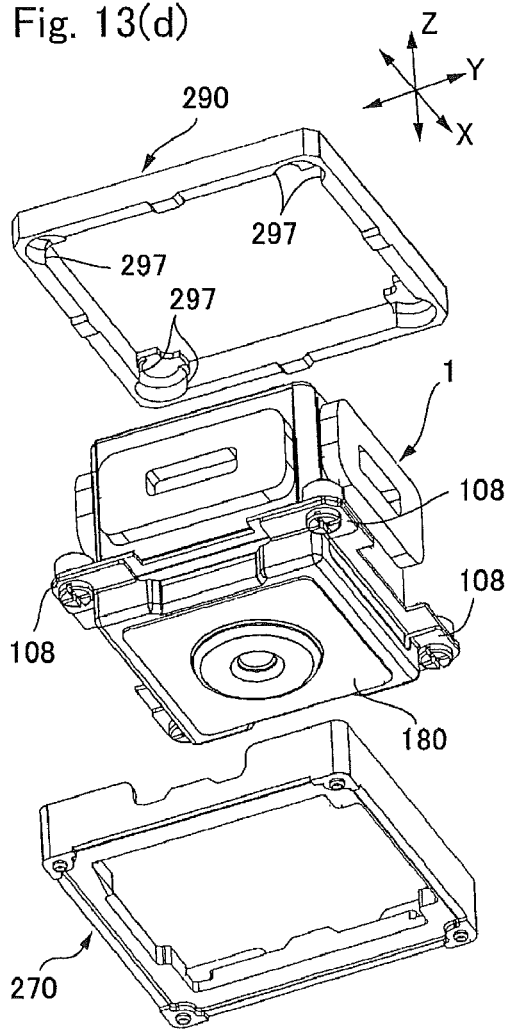
Figure 14A:
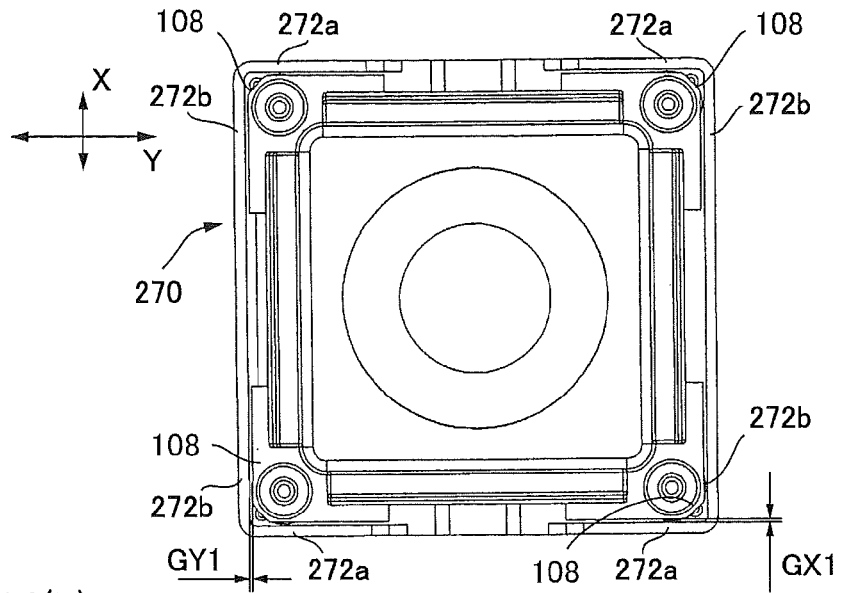
FIGS. 14(a), 14(b) and 14(c) are explanatory views showing a mechanism for restricting a moving range of the movable module in an optical unit with shake correcting function in accordance with an embodiment of the present invention.
Figure 14B:
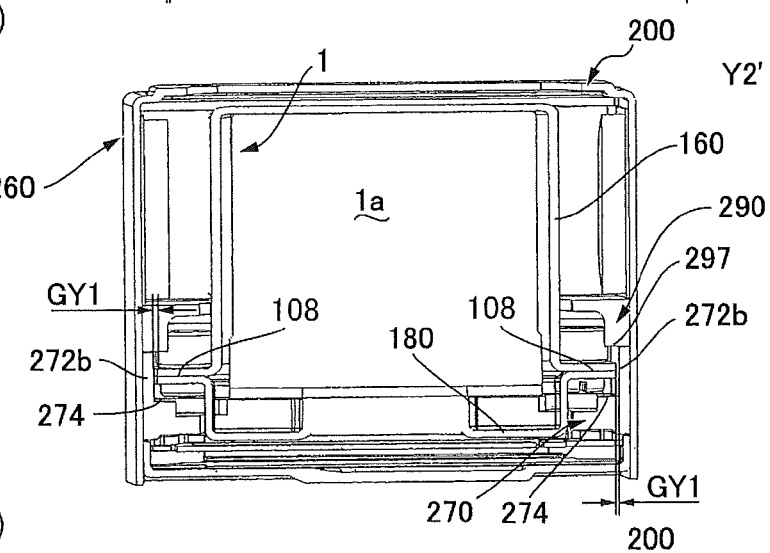
Figure 14C:
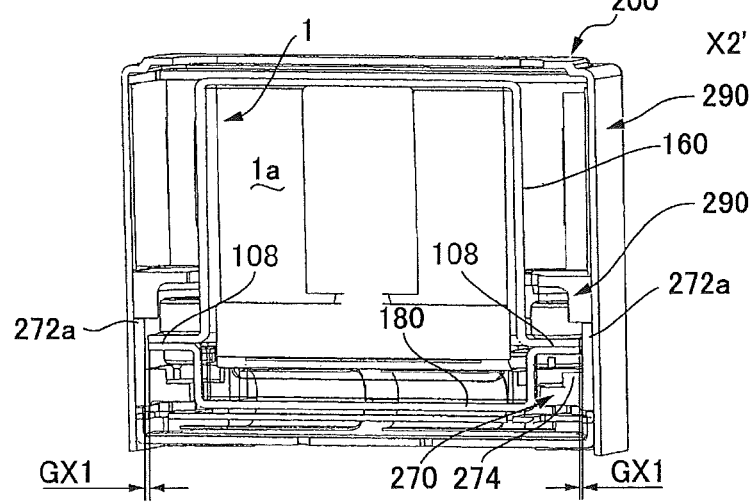

FIGS. 13(a) through 13(d) are explanatory views showing members restricting a moving range of the movable module 1 in the optical unit 200 with shake correcting function to which the present invention is applied. FIG. 13(a) is a perspective view showing a state where a rear side stopper member 270 and a front side stopper member 290 are disposed in the movable module 1 and which is viewed from the front side, FIG. 13(b) is their perspective view which is viewed from the rear side, FIG. 13(c) is their exploded perspective view which is viewed from the front side, and FIG. 13(d) is their exploded perspective view which is viewed from the rear side. FIGS. 14(a), 14(b) and 14(c) are explanatory views showing a mechanism which restricts a moving range of the movable module 1 in the optical unit 200 with shake correcting function to which the present invention is applied. FIG. 14(a) is a plan view showing a state where a rear side stopper member is disposed in the movable module in the optical unit 200 with shake correcting function to which the present invention is applied and which is viewed from the front side, FIG. 14(b) is a sectional view showing the optical unit 200 with shake correcting function which is cut by the line "Y2-Y2" in FIG. 1(a) passing near its corner portions, and FIG. 14(c) is a sectional view showing the optical unit 200 with shake correcting function which is cut by the line "X2-X2" in FIG. 1(a) passing near its corner portions.

As shown in FIG. 4(a) through FIG. 7 and FIGS. 13(a) through 13(d), in this embodiment, a front side stopper member 290 and a rear side stopper member 270 formed in a rectangular frame shape are disposed around the movable module 1. Moving ranges of the movable module 1 in both directions in the X-axis direction, both directions in the Y-axis direction and both directions in the Z-axis direction, and both directions around the X-axis, both directions around the Y-axis and both directions around the Z-axis are restricted by the front side stopper member 290 and the rear side stopper member 270.

As shown in FIGS. 14(a), 14(b) and 14(c), when viewed from the front side, each of four corner portions of the rear side stopper 270 is provided with an inner wall 272a which faces the protruded part 108 of the corner portion of the movable module 1 projecting in the X-axis direction and the Y-axis direction on an outer side in the X-axis direction through a little gap space "GX1" and an inner wall 272b which faces the protruded part 108 on an outer side in the Y-axis direction through a little gap space "GY1". Therefore, moving ranges of the movable module 1 are restricted in both directions in the X-axis direction, both directions in the Y-axis direction, both directions around the X-axis, both directions around the Y-axis and both directions around the Z-axis.

Further, as shown in FIGS. 14(b) and 14(c), the rear side stopper 270 is provided with a plate-like part 274 which faces the protruded part 108 on the rear side in the Z-axis direction. In addition, a corner part 297 formed in a frame portion of the front side stopper 290 faces the protruded part 108 on the front side in the Z-axis direction. Therefore, moving ranges in both directions in the Z-axis direction of the movable module 1 is restricted.

In this embodiment, the front side stopper member 290 and the rear side stopper member 270 are made of resin and thus, different from metal, they are provided with satisfactory impact absorption performance and vibration absorption performance. Therefore, even when the movable module 1 is abutted with the front side stopper member 290 and the rear side stopper member 270, noise and vibration can be reduced.

In the support mechanism 400 shown in FIG. 4(a) through FIG. 5(b) and FIGS. 12(a) and 12(b), the support protruded part 227 of the base 220 is fitted to the recessed part 187 of the sensor cover 180. Therefore, in this embodiment, moving ranges of the movable module 1 in both directions in the X-axis direction and both directions in the Y-axis direction are restricted also by the support mechanism 400. In other words, as shown in FIGS. 4(a) and 4(b), a little gap space "GX2" is formed in the X-axis direction and a little gap space "GY2" is formed in the Y-axis direction between an outer peripheral face of the support protruded part 227 and an inner peripheral face of the recessed part 187.

In addition, in the support mechanism 400 shown in FIG. 4(a) through FIG. 5(b) and FIGS. 12(a) and 12(b), the small protruded part 227a of the support protruded part 227 of the base 220 is abutted with the bottom under face 187a of the recessed part 187. Therefore, displacement toward the rear side in the Z-axis direction of the movable module 1 is restricted also by the support mechanism 400. In this embodiment, when the movable module 1 is rapidly displaced toward the rear side in the Z-axis direction by an impact such as dropping, load acting between the small protruded part 227a and the bottom under face 187a of the recessed part 187 is concentrated until the protruded part 108 of the movable module 1 is abutted with the plate-like part 274 of the rear side stopper 270. Therefore, the small protruded part 227a or the bottom under face 187a of the recessed part 187 may be deformed. However, in this embodiment, the support protruded part 227 is formed in the tip end part of the flat spring part 229 which is formed in the base 220. Therefore, when the movable module 1 is displaced toward the rear side in the Z-axis direction, the entire support mechanism 400 is displaced in the Z-axis direction. Therefore, even when load is concentrated on the small protruded part 227a and the bottom under face 187a of the recessed part 187 due to impact such as dropping, the small protruded part 227a and the bottom under face 187a of the recessed part 187 are prevented from being deformed.

In this embodiment, as shown in FIGS. 4(a) and 4(b), the flat spring part 229 is located toward the front side by the predetermined dimension "G10" with respect to the rear face of the base 220 and the rear end edge of the fixed cover 260. Therefore, even when the movable module 1 is rapidly displaced toward the rear side in the Z-axis direction due to impact such as dropping to cause the flat spring part 229 to displace toward the rear side, the flat spring part 229 does not project toward the rear side from the rear face of the base 220 and the rear end edge of the fixed cover 260.

As described above, in the optical unit 200 with shake correcting function in this embodiment, a magnetic drive mechanism is utilized to correct shake, especially hand shake of the movable module 1. Therefore, shake correction of the movable module 1 is performed without mechanically connecting the movable module 1 with the fixed body 210 through a drive mechanism. As a result, assembling of the optical unit 200 with shake correcting function is easy and its vibration resistance is excellent.

In the optical unit 200 with shake correcting function in this embodiment, a pair of the first magnetic drive mechanisms 250x for shake correction is disposed at two portions interposing the support protruded part 227 in the Y-axis direction, and a pair of the second magnetic drive mechanisms 250y for shake correction is disposed at two portions interposing the support protruded part 227 in the X-axis direction. Further, two first magnetic drive mechanism 250x for shake correction generate magnetic forces to make the movable module 1 swing in the same direction and two second magnetic drive mechanism 250y for shake correction generate magnetic forces to make the movable module 1 swing in the same direction. Therefore, different from a structure that the first magnetic drive mechanism 250x for shake correction is disposed only one side of the support protruded part 227 or that the second magnetic drive mechanism 250y for shake correction is disposed only one side of the support protruded part 227, drive ability is stable and thus shake can be corrected with a high degree of accuracy. For example, when positional relationship between the shake correction magnet 240x and the shake correction coil 230x is displaced in a direction such that the magnetic-drive force becomes smaller in one of two first magnetic drive mechanisms 250x for shake correction, in the other of the two first magnetic drive mechanism 250x for shake correction, positional relationship between the other shake correction magnet 240x and the other shake correction coil 230x is displaced in a direction so as to correct the above-mentioned positional displacement, in other words, the other positional relationship is displaced in a direction so that the magnetic-drive force becomes larger. Therefore, drive ability of the first magnetic drive mechanism 250x for shake correction is stable. This operation is similarly performed in the second magnetic drive mechanism 250y for shake correction.

In the embodiment described above, in each of the first magnetic drive mechanism 250x for shake correction and the second magnetic drive mechanism 250y for shake correction, a coil (shake correction coils 230x and 230y) which is lighter than a magnet is held by the movable module 1 that is a movable body, and the magnet (shake correction magnets 240x and 240y) which is heavier than a coil is held by the fixed body 210. Therefore, the movable module 1 can be driven with a small torque and responsibility of correction is rapid.

When the coil (shake correction coils 230x and 230y) is disposed on the movable module 1, the coil is required to be electrically connected with the outside. However, in this embodiment, respective end parts of the shake correction coils 230x and 230y are, similarly to the shake detection sensor 170, the imaging element 15 and the lens drive coils 30s and 30t of the lens drive mechanism 5, electrically connected with the outside through the flexible circuit board 300. Therefore, in this embodiment, since the flexible circuit board 300 is commonly used, structure is simplified and cost can be reduced.

Further, in order to be capable of swinging the movable module 1, the support mechanism 400 provided with a pivot part is structured between the base 220 of the fixed body 210 and the sensor cover 180 of the movable module 1 and thus the movable module 1 is prevented from being displaced in the Z-axis direction. Further, the flat spring formed in a gimbal-spring shape which is used as the spring member 280 is provided with the long arm parts 283 and thus linearity of deformation amount (displacement amount) and spring force is high and shake correction of the movable module is easily performed.

In addition, in this embodiment, moving ranges of the movable module 1 are restricted in both directions in the X-axis direction, both directions in the Y-axis direction, both directions in the Z-axis direction, both directions around the X-axis, both directions around the Y-axis, and both directions around the Z-axis by the front side stopper member 290 and the rear side stopper member 270. Therefore, since the movable module 1 is not displaced excessively, plastic deformation or the like of the spring member 280 is prevented.

In the embodiment described above, in each of the first magnetic drive mechanism 250x for shake correction and the second magnetic drive mechanism 250y for shake correction, the shake correction coil (shake correction coils 230x and 230y) is held on the movable module 1 which is the movable body, and the shake correction magnet (shake correction magnets 240x and 240y) is held by the fixed body 210. However, it may be structured that, in one of the first magnetic drive mechanism 250x for shake correction and the second magnetic drive mechanism 250y for shake correction, the shake correction coil is held on the movable module 1 which is the movable body and the shake correction magnet is held by the fixed body 210 and, in the other of the magnetic drive mechanism for shake correction, the shake correction magnet is held on the movable module 1 which is the movable body and the shake correction coil is held by the fixed body 210.

In the embodiment described above, both of the first magnetic drive mechanism 250x for shake correction and the second magnetic drive mechanism 250y for shake correction are provided for the movable module 1 as the magnetic drive mechanism for shake correction. However, in accordance with an embodiment of the present invention, in order to correct only shake in a direction where shake is easily occurred by a user, only one of the first magnetic drive mechanism 250x for shake correction and the second magnetic drive mechanism 250y for shake correction may be provided. In other words, only one of the first magnetic drive mechanism 250x for shake correction and the second magnetic drive mechanism 250y for shake correction may be provided on both sides interposing the support protruded part 227 so as to form a pair. In this case, the extending direction of the flexible circuit board 300 may be set only the Y-axis direction.

In the embodiment described above, the spring member 280 is used in which a plurality of arm parts 283 linearly extending in the same circumferential direction as the urging member. However, when a plurality of arm parts 283 are extended in the same circumferential direction, the arm parts 283 may be extended in a curved manner.

In the embodiment described above, only the spring member 280 is used as the urging member for urging the movable module 1 toward the base 220. However, in accordance with an embodiment of the present invention, a magnetic spring which urges the movable module 1 toward the base 220 by magnetic operation and a mechanical spring member which mechanically urges the movable module 1 toward the base 220 may be used as the urging member. Further, a magnetic body is disposed as the magnetic spring on the rear side of the shake correction magnets 240x and 240y in the fixed body 210. According to this structure, a state where the movable module 1 is supported by the support mechanism 400 is surely maintained. Further, it may be structured that the movable module 1 is urged toward the base 220 only by the magnetic spring and the spring member 280 is set in a non-deformed state where the spring member 280 does not generate an urging force during a neutral period when the magnetic drive mechanism for shake correction is not operated. In this case, when the movable module 1 is swung, the spring member 280 is deformed to generate an urging force. In other words, the spring member 280 keeps a flat shape during a period when the movable module 1 is not swung. Therefore, a portion having linearity between a force applied to the spring member 280 and a deformed amount of the spring member 280 is utilized effectively and thus the movable module 1 is appropriately swung and the shake correction can be performed surely.

In accordance with an embodiment of the present invention, vibration absorption material such as gel material or elastic sheet is preferably fitted to the connected portions of the arm parts 283 and the fixed side connecting parts 281, to the connected portions of the arm parts 283 and the movable module side connecting parts 282, or to the entire arm parts 283 in the spring member 280. In a case that this measure is performed, when the movable module 1 is swung, vibration of the arm parts 283 can be rapidly stopped and thus vibration of the movable module 1 can be also rapidly stopped.

In the embodiment described above, the small protruded part 227a is formed at the tip end of the support protruded part 227 but the entire support protruded part 227 may be formed in a hemispherical shape. Further, in the embodiment described above, the support protruded part 227 is formed in the base 220 and the recessed part 187 is formed in the sensor cover 180. However, a support protruded part is formed in the sensor cover 180 and a recessed part for receiving the support protruded part may be formed in the base 220.

Further, in order to support the movable module 1 to be capable of being swung with an opposite side to an object to be photographed side as its swinging center, a plurality of wire suspensions which are extended toward the object to be photographed side from the opposite side to the object to be photographed side is used as a swing support part instead of the pivot part and the movable module 1 may be supported by a plurality of the wire suspensions.

In the embodiment described above, the present invention is applied to the optical unit 200 with shake correcting function using the lens drive module 1a in which the lens drive coils 30s and 30t are formed in a square tube-shape and the lens drive magnet 17 is formed in a flat plate shape. However, the present invention may be applied to an optical unit with shake correcting function using a movable module in which the lens drive coils 30s and 30t are formed in a cylindrical shape, the case 18 is formed in a square tube shape, and the lens drive magnets 17 are disposed at corner portions of the case 18.

Further, in the embodiment described above, the flexible circuit board 300 is commonly used for all of the shake correction coils 230x and 230y, the shake detection sensor 170, the imaging element 15, and the lens drive coils 30s and 30t of the lens drive mechanism 5. However, the flexible circuit board 300 is not required to use commonly for all. Individual or common flexible circuit boards combined arbitrarily may be used, for example, for convenience on electrical wiring.

In the embodiment described above, the present invention is applied to the optical unit 200 with shake correcting function which is used in a cell phone with a camera. However, the present invention is applied to the optical unit 200 with shake correcting function which is used in a thin digital camera. Further, in the embodiment described above, the movable module 1 includes, in addition to the lens 121 and the imaging element 15, the lens drive mechanism 5 for magnetically driving the movable body 3 including the lens 121 in the optical axis "L" direction which is supported on the support body 2. However, the present invention may be applied to a fixed focus type optical unit with shake correcting function in which the lens drive mechanism 5 is not mounted on the movable module 1.

In addition, the present invention may be applied to an optical instrument which emits light such as a laser beam pointer, a portable projection display device or a projection display device for a car as well as an optical apparatus for photography.

Next, an embodiment of the second present invention which is capable of reducing its size and making it thinner will be described below with reference to the accompanying drawings. In the embodiment described above, in order to drive the movable module 1 with a small torque and in order to enhance responsibility of correction, a coil whose weight is lighter than a magnet is held by the movable body and a magnet whose weight is heavier than a coil is held by the fixed body. However, an embodiment of the second present invention which is capable of reducing its size and making it thinner may be applied to both of positional relationships between a coil and a magnet. Therefore, an embodiment in which a magnet is held by a movable body and a coil is held by a fixed body will be described below.

Figure 15:
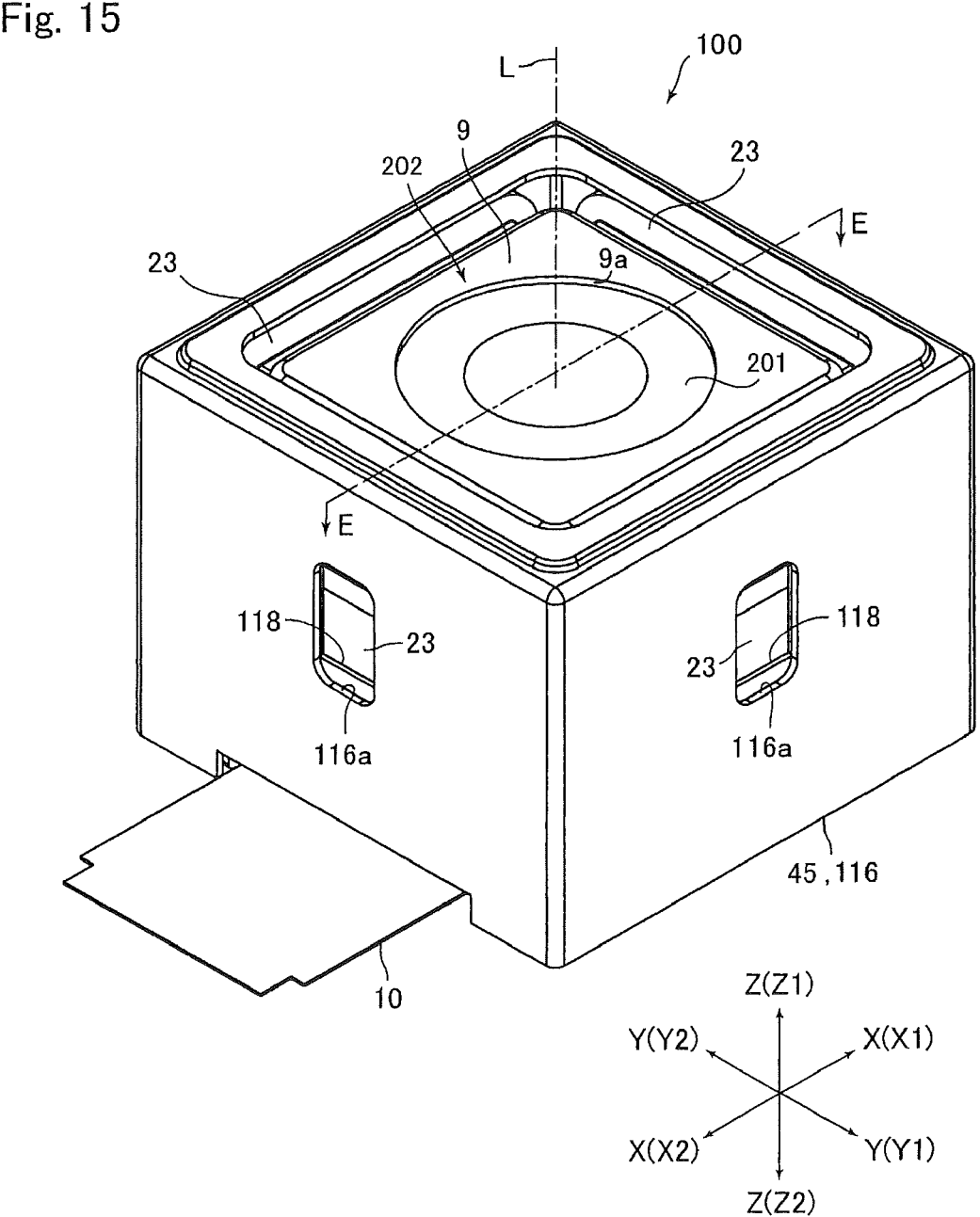
FIG. 15 is a perspective view showing an optical unit with shake correcting function in accordance with another embodiment of the present invention.
Figure 16:
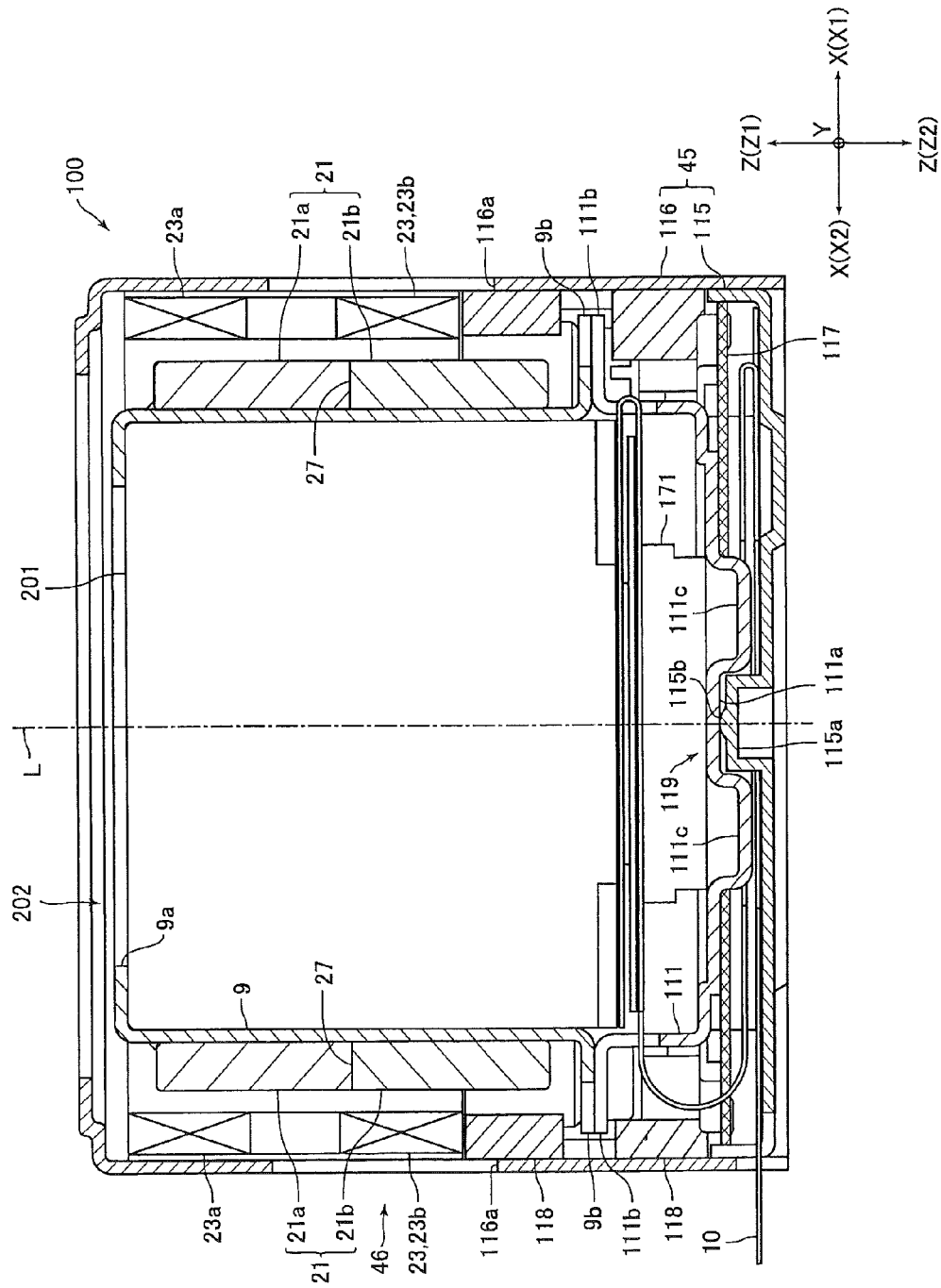
FIG. 16 is a cross sectional view showing the optical unit with shake correcting function which is cut by the "E-E" line in FIG. 15.
Figure 17:
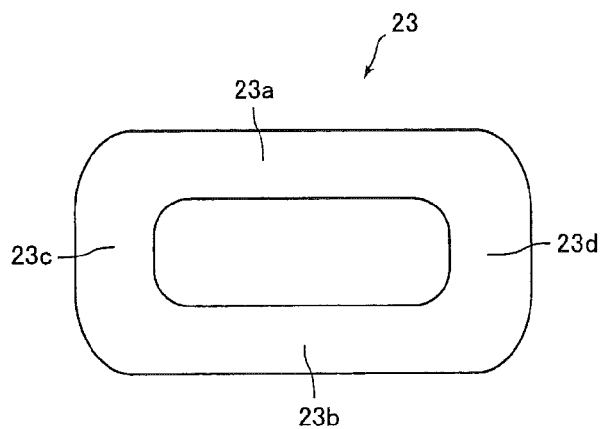
FIG. 17 is a plan view showing a shake correction coil in FIG. 16.
Figure 18:
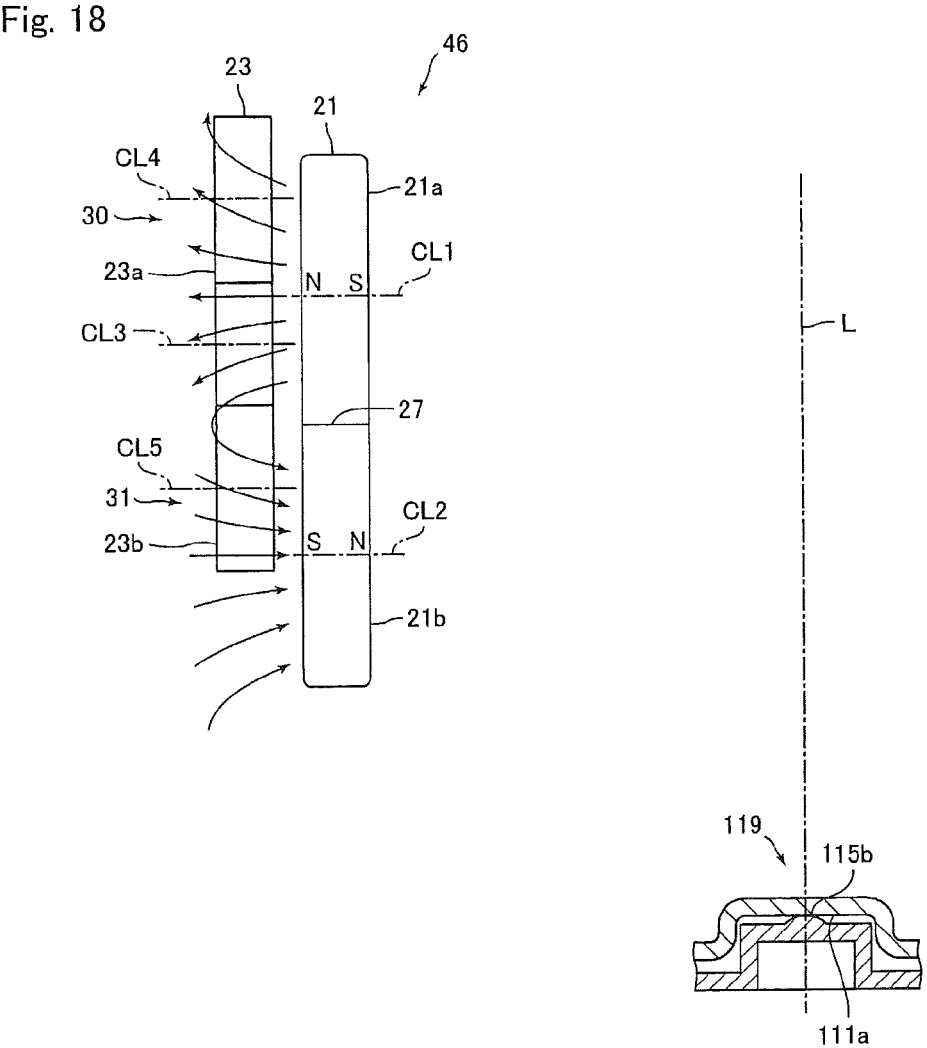
FIG. 18 is an explanatory view showing magnetic lines of force generated from the shake correction magnet shown in FIG. 16.
Figure 19:
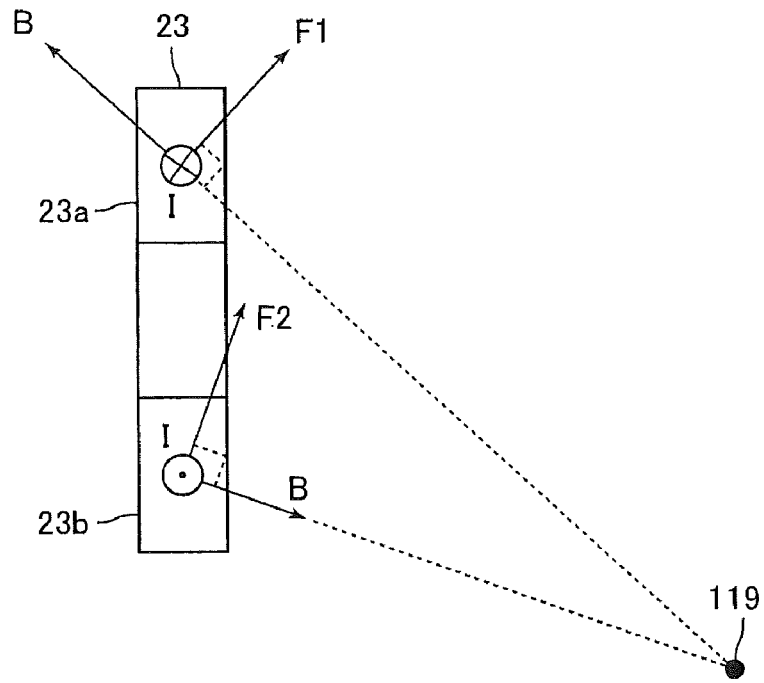
FIG. 19 is an explanatory view showing directions of electro-magnetic forces which are generated when an electric current is supplied to the shake correction coil shown in FIG. 16.

FIG. 15 is a perspective view showing an optical unit 100 with shake correcting function in accordance with an embodiment of the present invention. FIG. 16 is a cross sectional view showing the optical unit 100 which is cut by the line "E-E" in FIG. 15. FIG. 17 is a plan view showing a shake correction coil 23 shown in FIG. 16. FIG. 18 is an explanatory view showing magnetic lines of force which are generated by a shake correction magnet 21 shown in FIG. 16. FIG. 19 is an explanatory view showing directions of electro-magnetic forces which are generated by supplying an electric current to the shake correction coil 23 shown in FIG. 16.

In the following discussion, as shown in FIG. 15, three directions perpendicular to each other are set to be "X" direction, "Y" direction and "Z" direction. Further, an "X1" direction side in FIG. 15 is referred to as "right" side, an "X2" direction side is as "left" side, a "Y1" direction side is as "front" side, a "Y2" direction side is as "rear" side, a "Z1" direction side is an "upper" side, and a "Z2" direction side is as a "lower" side. In this embodiment, when an optical unit 100 is not swung, the "Z" direction (upper and lower direction) is coincided with a direction of an optical axis "L" (optical axis direction) and, since the maximum swing angle of the optical unit 100 is a little (for example, about 2° (degree)), even when the optical unit 100 is swung, the upper and lower direction and the optical axis direction are almost coincided with each other.

The optical unit 100 in this embodiment is a small and thin camera, which is mounted on a portable apparatus such as a cellular phone and is generally formed in a roughly rectangular parallelepiped shape. As shown in FIGS. 15 and 16, the optical unit 100 with shake correcting function includes a lens drive module 201 on which a lens and an imaging element are mounted, a sensor 171 which detects variation of inclination of the lens drive module 201, a support body 45 which supports the lens drive module 201, and a swing drive mechanism 46 for swinging the lens drive module 201.

Similarly to the above-mentioned embodiment, a lens and an imaging element are mounted on the lens drive module 201. Specifically, a lens is mounted on an upper end side of the lens drive module 201 and an imaging element is mounted on a lower end of the lens drive module 201. Further, the lens drive module 201 is mounted with a lens drive mechanism for driving the lens in an optical axis direction. The lens drive module 201 may be structured to be the same as the above-mentioned lens drive module 1*a* and the lens drive mechanism may be also structured to be the same as the lens drive mechanism 5 which is used in the above-mentioned embodiment and thus their detailed description is omitted.

The lens drive module 201 is generally formed in a roughly rectangular parallelepiped shape. Front and back side faces and right and left side faces of the lens drive module 201 are covered by a cover member 9 which is formed in a substantially rectangular tube shape. The cover member 9 is provided with a bottom part and its lower end is opened. The cover member 9 is the same member as the module cover 160 in the above-mentioned embodiment and thus the cover member 9 is formed of magnetic and metal material. The bottom part of the cover member 9 which is disposed on an upper end is formed with a circular through hole 9*a*. Further, a lower end of the cover member 9 is formed with a flange part 9*b* which is extended toward outer sides in the front and rear direction and toward outer sides in the lateral direction. Front and back side faces and right and left side faces of the cover member 9 are formed to be substantially parallel to the optical axis direction and each of the side faces is fixed with a shake correction magnet 21 which structures the swing drive mechanism 46.

The sensor 171 is a gyroscope for detecting a variation of inclination of the lens drive module 201. In other words, the sensor 171 is an angular velocity sensor for detecting an angular velocity of the lens drive module 201. The sensor 171 is disposed on a lower side of the lens drive module 201. Specifically, the sensor 171 is disposed on the lower side of the lens drive module 201 so that the optical axis "L" passes through substantially the center of the sensor 171. The sensor 171 is connected with a flexible printed circuit board (FPC) 10. The FPC 10 is also connected with the imaging element which is mounted on the optical unit 100. The FPC 10 is extended over a lower end side of the optical unit 100 and, for example, is drawn outside from a left side face of the optical unit 100.

The sensor 171 is disposed on an inner side of a sensor cover member 111 whose upper end is opened and which is flatly formed in a roughly rectangular tube shape with a bottom part. The center of the bottom part of the sensor cover member 111 which is disposed on the lower end side is formed with a flatly formed abutting face 111*a* abutting with a supporting point protruded part 115*b* described below. Further, an upper end of the sensor cover member 111 is formed with a flange part 111*b*, which is abutted with the flange part 9*b* of the cover member 9 from the lower side, so as to extend toward an outer side in the front and rear direction and toward an outer side in the lateral direction. In this embodiment, the flange part 9*b* and the flange part 111*b* are fixed to each other. In other words, the sensor cover member 111 is fixed to the lower end of the cover member 9.

In this embodiment, the lens drive module 201, the sensor 171, the cover member 9 and the sensor cover member 11 are supported by the support body 45, which corresponds to the fixed body 210 in the above-mentioned embodiment, so as to be capable of swinging. In other words, the lens drive module 201, the sensor 171, the cover member 9 and the sensor cover member 11 structure a movable module 202 which is capable of swinging with respect to the support body 45.

The support body 45 includes a base body 115 structuring an under face of the optical unit 100 and a case body 116 (corresponding to the above-mentioned fixed cover 260) structuring front and rear outer peripheral faces and right and left outer peripheral faces of the optical unit 100. The case body 116 is fixed with a stopper member 118 for restricting a swing range of the movable module 202. Further, the stopper member 118 is fixed with a flat spring 117 which supports the movable module 202 to be capable of swinging.

The base body 115 is formed in a roughly rectangular shape. A substantially center part of the base body 115 is formed with a protruded part 115*a* which protrudes toward an upper side. Further, an upper face of the protruded part 115*a* is formed with a supporting point protruded part 115*b* which is a supporting point for swinging of the movable module 202. In other words, in this embodiment, a supporting point for swinging of the movable module 202 is disposed on the lower side of the movable module 202. The supporting point protruded part 115*b* is, for example, formed in a hemispherical shape and is abutted with the abutting face 111*a* of the sensor cover member 111. In this embodiment, a supporting point part 119 which is a swing center of the lens drive module 201 is structured of the supporting point protruded part 115*b* and the abutting face 111*a*. The supporting point part 119 is disposed at a position where the optical axis "L" of the lens drive module 201 is passed through. In this embodiment, the optical axis "L" of the lens drive module 201 is disposed at the center of the movable module 202.

The case body 116 is formed in a substantially rectangular tube shape whose upper end and lower end are opened. A base body 115 is fixed to the lower end of the case body 116. Roughly centers of the front and rear side faces and the right and left side faces of the case body 116 are formed with an opening part 116*a* for disposing lead wires of a shake correction coil 23 which structures a swing drive mechanism 46 so that the opening part 116*a* is penetrated through each of the side faces. The opening part 116*a* is formed in a roughly rectangular shape. The case body 116 in this embodiment is formed of nonmagnetic material. Further, the case body 116 is formed of metal material.

The flat spring 117 is generally formed in a roughly rectangular shape. Four corners of the flat spring 117 are fixed to the stopper member 118, and the center part of the flat spring 117 is fixed with the movable module 202. In other words, the flat spring 117 is provided with a fixing part which is fixed to the stopper member 118, a holding part which holds the movable module 202, and a spring part which connects the fixing part with the holding part. In this embodiment, the sensor cover member 111 is fixed to a center part of the flat spring 117 and the flat spring 117 holds the lower end side of the movable module 202.

In this embodiment, the flat spring 117 is fixed to the stopper member 118 in a state that the flat spring 117 is resiliently bent so as to generate pressurization for surely abutting the abutting face 111*a* of the sensor cover member 111 with the supporting point protruded part 115*b* of the base body 115, in other words, so that an urging force for urging the movable module 202 toward the lower direction is generated. Specifically, the flat spring 117 in this embodiment is fixed to the case body 116 through the stopper member 118. In other words, four corners of the flat spring 117 are fixed to the stopper member 118 which is fixed to the inner peripheral face of the case body 116.

The stopper member 118 is fixed to the inner peripheral face of the case body 116. Specifically, two stopper members 118 are fixed to the inner peripheral face of the case body 116 at a position where the stopper member 118 is capable of abutting with the upper face of the flange part 9*b* of the cover member 9 and at a position where the stopper member 118 is capable of abutting with the under face of the flange part 111*b* of the sensor cover member 111. Therefore, the swing range of the movable module 202 is restricted by the stopper members 118 and the flange parts 9*b* and 111*b*.

The swing drive mechanism 46 includes shake correction magnets 21 and shake correction coils 23 which are disposed to face the shake correction magnets 21. The swing drive mechanism 46 in this embodiment includes four shake correction magnets 21 and four shake correction coils 23.

The shake correction magnet 21 is formed in a substantially rectangular plate shape. Further, the shake correction magnet 21 is structured of two magnet pieces comprised of a first magnet piece 21*a* and a second magnet piece 21*b*. Specifically, the first magnet piece 21*a* and the second magnet piece 21*b* are adhesively fixed to each other in a state that an under face of the first magnet piece 21*a* and an upper face of the second magnet piece 21*b* are abutted with each other and, in this manner, the shake correction magnet 21 is formed. The first magnet piece 21*a* and the second magnet piece 21*b* are formed so that their heights, widths and thicknesses are the same as each other.

One piece of the shake correction magnet 21 is fixed to each of front and rear side faces and right and left side faces in the cover member 9. In other words, the shake correction magnets 21 are fixed on the outer peripheral face of the cover member 9 and are disposed in the inside of the case body 116. Further, the shake correction magnets 21 are swung together with the lens drive module 201. As described above, the cover member 9 is formed of magnetic material and functions as a back yoke for the shake correction magnets 21. Further, the cover member 9 in this embodiment is a magnet holding member for holding the shake correction magnets 21.

In this embodiment, the shake correction magnets 21 fixed on the right and left side faces of the cover member 9 are magnetized such that magnetic poles of the shake correction magnet 21 formed on the right side are different from magnetic poles formed on the left face. Further, the shake correction magnets 21 fixed on the right and left side faces of the cover member 9 are magnetized such that magnetic poles formed on outer side faces of the first magnet pieces 21*a* in the lateral direction are different from magnetic poles formed on outer side faces of the second magnet pieces 21*b* in the lateral direction. In other words, the shake correction magnets 21 are magnetized such that magnetic poles formed on inner side faces of the first magnet pieces 21*a* in the lateral direction are different from magnetic poles formed on inner side faces of the second magnet pieces 21*b* in the lateral direction.

Similarly, the shake correction magnets 21 fixed on the front and rear side faces of the cover member 9 are magnetized such that magnetic poles formed on the front faces of the shake correction magnets 21 are different from magnetic poles formed on their rear faces. Further, the shake correction magnets 21 fixed on the front and rear side faces of the cover member 9 are magnetized such that magnetic poles formed on outer side faces of the first magnet pieces 21*a* in the front and rear direction are different from magnetic poles formed on outer side faces of the second magnet pieces 21*b*.

For example, a right side face of the first magnet piece 21*a* of the shake correction magnet 21 which is fixed on the right side face of the cover member 9 is magnetized in an "S"-pole and its left side face is magnetized in an "N"-pole. Further, a right side face of the second magnet piece 21*b* of the shake correction magnet 21 is magnetized in an "N"-pole and its left side face is magnetized in an "S"-pole. Similarly, a left side face of the first magnet piece 21*a* of the shake correction magnet 21 which is fixed on the left side face of the cover member 9 is magnetized in an "S"-pole and its right side face is magnetized in an "N"-pole. Further, a left side face of the second magnet piece 21*b* of the shake correction magnet 21 is magnetized in an "N"-pole and its right side face is magnetized in an "S"-pole.

Further, for example, a rear side face of the first magnet piece 21*a* of the shake correction magnet 21 which is fixed on the rear side face of the cover member 9 is magnetized in an "N"-pole and its front side face is magnetized in an "S"-pole, and a rear side face of the second magnet piece 21*b* of the shake correction magnet 21 is magnetized in an "S"-pole and its front side face is magnetized in an "N"-pole. Similarly, a front side face of the first magnet piece 21*a* of the shake correction magnet 21 which is fixed on the front side face of the cover member 9 is magnetized in an "N"-pole and its rear side face is magnetized in an "S"-pole, and a front side face of the second magnet piece 21*b* of the shake correction magnet 21 is magnetized in an "S"-pole and its rear side face is magnetized in an "N"-pole.

The shake correction coil 23 is an air-core coil which is structured so that a fusion wire provided with insulation coating covering around a conducting wire and a fusion coating further covering around the insulation coating is wound around in an air core shape (i.e., without a winding core such as a coil bobbin). The shake correction coil 23 in this embodiment is formed so that a fusion wire is wound around in a roughly rectangular shape. In other words, the shake correction coil 23 is, as shown in FIG. 17, structured of two long side parts 23*a* and 23*b* which are parallel to each other and two short side parts 23*c* and 23*d* which are formed shorter than the long side parts 23*a* and 23*b* and parallel to each other. Further, the shake correction coil 23 is a flat coil whose thickness is substantially constant.

The shake correction coil 23 is fixed by one piece to each of the front and rear side faces and the right and left side faces of the case body 116 through an insulative film. In other words, the shake correction coil 23 is fixed to the inner peripheral face of the case body 116 through a film. Further, the shake correction coil 23 is fixed to the case body 116 so that longitudinal directions of the short side parts 23*c* and 23*d* are coincided with the upper and lower direction. In other words, the shake correction coil 23 is fixed to the case body 116 so that longitudinal directions of the long side parts 23*a* and 23*b* are coincided with the lateral direction or the front and rear direction. In this embodiment, the long side part 23*a* disposed on the upper side is a first side part and the long side part 23*b* disposed on the lower side is a second side part.

As shown in FIG. 16, the shake correction magnets 21 and the shake correction coils 23 are oppositely disposed to each other in the lateral direction or the front and rear direction through a predetermined gap space. Specifically, the shake correction magnets 21 and the shake correction coils 23 are disposed on an upper side of the supporting point part 119 so as to face each other and, even when the movable module 202 is swung with the supporting point part 119 as the supporting point, the shake correction magnets 21 and the shake correction coils 23 are oppositely disposed through a predetermined gap space so that the shake correction magnets 21 are not contacted with the shake correction coils 23. In this embodiment, when an electric current is not supplied to the shake correction coils 23, as shown in FIG. 16, the movable module 202 is located at a neutral position where the movable module 202 is not inclined with respect to the support body 45.

As described above, the shake correction magnets 21 are magnetized so that the magnetic poles formed on the outer side faces of the first magnet pieces 21a in the lateral direction or the front and rear direction are different from the magnetic poles formed on the outer side faces of the second magnet pieces 21b. In other words, opposite faces of the shake correction magnets 21 to the shake correction coil 23 are formed with two magnetic poles ("N"-pole and "S"-pole) which are superposed on each other in the optical axis direction. Therefore, magnetic lines of force that the shake correction magnets 21 generate are, for example, shown by the arrows in FIG. 18.

Therefore, for example, on an upper side in the optical axis direction relative to the center "CL1" of the first magnet piece 21a, a region 30 where magnetic lines of force are directed in directions generally going away from the supporting point part 119 is formed on an outer side in the front and rear direction (or right and left direction) of the opposite face of the first magnet piece 21a to the shake correction coil 23. The region 30 is referred to as a "first region 30". In other words, on an upper side relative to the center "CL1", which is the magnetic center of the magnetic pole ("N"-pole) formed on the opposite face of the first magnet piece 21a to the shake correction coil 23, the first region 30 is formed on the outer side in the front and rear direction (or right and left direction) of the opposite face of the first magnet piece 21a to the shake correction coil 23.

Further, on an upper side in the optical axis direction relative to the center "CL2" of the second magnet piece 21b, a region 31 where magnetic lines of force are directed in directions generally going toward the supporting point part 119 is formed on an outer side in the front and rear direction (or right and left direction) of the opposite face of the second magnet piece 21b to the shake correction coil 23. The region 31 is referred to as a "second region 31". In other words, on an upper side relative to the center "CL2", which is the magnetic center of the magnetic pole ("S"-pole) formed on the opposite face of the second magnet piece 21b to the shake correction coil 23, the second region 31 is formed on the outer side in the front and rear direction (or right and left direction) of the opposite face of the second magnet piece 21b to the shake correction coil 23.

In this embodiment, as shown in FIGS. 16 and 18, the shake correction magnet 21 and the shake correction coil 23 are oppositely disposed so that the center "CL3" of the shake correction coil 23 in the optical axis direction is located on an upper side with respect to the abutting face 27 of the first magnet piece 21a with the second magnet piece 21b. In other words, the center "CL3" of the shake correction coil 23 is disposed at a position far away from the supporting point part 119, i.e., the swing center of the lens drive module 201, in the optical axis direction relative to the abutting face 27 of the shake correction magnet 21, i.e., the magnetic center.

Specifically, as shown in FIG. 18, the center "CL4" of the long side part 23a in the optical axis direction is located on an upper side relative to the center "CL1" of the first magnet piece 21a, and the center "CL5" of the long side part 23b in the optical axis direction is located on a lower side relative to the abutting face 27 and located on an upper side relative to the center "CL2" of the second magnet piece 21b. In other words, the center "CL4" of the long side part 23a is disposed on the upper side relative to the center "CL1" which is the magnetic center of the magnetic pole formed on the opposite face of the first magnet piece 21a to the shake correction coil 23. In addition, the center "CL5" of the long side part 23b is disposed on a lower side relative to the abutting face 27 which is a boundary of two magnetic poles formed on the opposite face of the shake correction magnet 21 to the shake correction coil 23, and the center "CL5" of the long side part 23b is disposed on an upper side relative to the center "CL2" which is the magnetic center of the magnetic pole formed on the opposite face of the second magnet piece 21b to the shake correction coil 23.

In other words, in this embodiment, the shake correction magnet 21 and the shake correction coil 23 are disposed so that the long side part 23a is disposed in the first region 30 where magnetic lines of force are directed to directions roughly going away from the supporting point part 119 (swing center of the lens drive module 201) and the long side part 23b is disposed in the second region 31 where magnetic lines of force are directed to directions roughly going toward the supporting point part 119 (swing center of the lens drive module 201).

Therefore, as shown in FIG. 19, it is structured such that a direction of an electro-magnetic force "F1" generated in the long side part 23a when an electric current is supplied to the shake correction coil 23 is roughly coincided with a tangential direction of a circle whose center is the supporting point part 119 and which passes through the long side part 23a. Further, a direction of an electro-magnetic force "F2" generated in the long side part 23b when an electric current is supplied to the shake correction coil 23 is roughly coincided with a tangential direction of a circle whose center is the supporting point part 19 and which passes through the long side part 23b. In other words, it is structured such that the directions of the electro-magnetic forces "F1" and "F2" generated in the shake correction coil 23 when an electric current is supplied to the shake correction coils 23 are roughly coincided with directions which generate swing forces for making the movable module 202 swing with the supporting point part 119 as a center. In this embodiment, since the shake correction coil 23 is fixed to the case body 116, the shake correction magnet 21 is moved and thus the movable module 202 is swung with the supporting point part 119 as a swing center to correct the shake.

In the optical unit 100 structured as described above, when a variation of inclination of the lens drive module 201 is detected by the sensor 171, in other words, when a shake (vibration) of the lens drive module 201 is detected, an electric current is supplied to the shake correction coil 23 on the basis of a detection result with the sensor 171, and the movable module 202 is swung with the supporting point part 119 as a center to correct the shake. Specifically, in the optical unit 100 with shake correcting function, when a hand shake is detected on the basis of a detection result with the sensor 171, an electric current is supplied to the shake correction coil 23 and the movable module 202 is swung with the supporting point part 119 as a center to correct the hand shake.

In this embodiment, the shake correction mechanism in which the lens drive module 201 is swung with respect to the support body 45 on the basis of a detection result with the sensor 171 to correct the shake is structured of the supporting point part 119 comprised of the abutting face 111a and the supporting point protruded part 115b, the swing drive mechanism 46, and the flat spring 117. In other words, in this embodiment, the shake correction mechanism is structured of the supporting point part 119, the swing drive mechanism 46 and the flat spring 117, and the lens drive module 201 is swung with the supporting point part 119 as a swing center on the basis of the detection result with the sensor 171 to correct the shake by hand.

As described above, in this embodiment, the shake correction magnets 21 and the shake correction coils 23 are oppositely disposed to each other on the upper side relative to the supporting point part 119. In addition, the shake correction magnets 21 and the shake correction coils 23 are oppositely disposed to each other so that the center "CL3" of the shake correction coil 23 is disposed at a remote position relative to the abutting face 27 of the shake correction magnet 21 in the optical axis direction from the supporting point part 119. Specifically, the shake correction magnets 21 and the shake correction coils 23 are disposed so that the center "CL4" of the long side part 23a is disposed on the upper side relative to the center "CL1" which is the magnetic center of the magnetic pole of the first magnet piece 21a formed on the opposite face to the shake correction coil 23 and, in addition, the center "CL5" of the long side part 23b is disposed on the lower side relative to the abutting face 27 which is the boundary of two magnetic poles of the shake correction magnet 21 formed on the opposite face to the shake correction coil 23 and, furthermore, the center "CL5" of the long side part 23b is disposed on the upper side relative to the center "CL2" which is the magnetic center of the magnetic pole of the second magnet piece 21b formed on the opposite face to the shake correction coil 23.

In other words, in this embodiment, the shake correction coil 23 is disposed in the first region 30 where the magnetic lines of force generated by the shake correction magnet 21 are directed in directions generally going away from the supporting point part 119 (the swing center of the lens drive module 201) and in the second region 31 where the magnetic lines of force generated by the shake correction magnet 21 are directed in directions generally going toward the supporting point part 119 (the swing center of the lens drive module 201). More specifically, the long side part 23a is disposed in the first region 30 and the long side part 23b is disposed in the second region 31.

Therefore, as described above, directions of the electro-magnetic forces "F1" and "F2" which are generated by supplying an electric current to the shake correction coils 23 are generally coincided with directions for generating swing forces for making the movable module 202 swing with the supporting point part 119 as a center. Therefore, driving force of the swing drive mechanism 46 is improved by effectively utilizing magnetic flux generated from the shake correction magnet 21. As a result, in this embodiment, even when the optical unit 100 with shake correcting function is made smaller and thinner, a sufficient driving force for swinging the lens drive module 201 can be obtained.

Especially, in this embodiment, the long side part 23a is disposed in the first region 30 and the long side part 23b is disposed in the second region 31. Therefore, the electro-magnetic forces "F1" and "F2" are generated by the long side parts 23a and 23b in directions generally coincided with the direction for generating a swing force in the movable module 202 with the supporting point part 119 as the swing center. Accordingly, in this embodiment, a driving force of the swing drive mechanism 46 is improved efficiently.

Further, in this embodiment, the center "CL3" of the shake correction coil 23 is disposed at a remote position in the optical axis direction from the supporting point part 119 relative to the abutting face 27 of the shake correction magnet 21. Therefore, in comparison with a case that the abutting face 27 of the shake correction magnet 21 and the center "CL3" of the shake correction coil 23 are disposed at equal positions in the optical axis direction from the supporting point part 119, the distance from the supporting point part 119 to the shake correction coil 23 is set to be longer. A torque for swinging the movable module 202 with the supporting point part 119 as a center becomes larger in proportion to a distance from the supporting point part 119 to the shake correction coil 23 and thus, in this embodiment, the torque is increased. In other words, a driving force of the swing drive mechanism 46 is enhanced.

In this embodiment, the long side part 23a is disposed in the first region 30 and the long side part 23b is disposed in the second region 31 and thus a driving force of the swing drive mechanism 46 is further enhanced in comparison with a case that the short side parts 23c and 23d are disposed in the first region 30 and the second region 31. Further, in comparison with a case that the shake correction coil 23 is wound in a substantially square shape, in this embodiment, while the driving force of the swing drive mechanism 46 is enhanced, the size of the optical unit 100 with shake correcting function can be reduced in the upper and lower direction where the long side parts 23a and 23b are faced each other. In addition, lengths of the short side parts 23c and 23d are shortened which hardly contribute a driving force of the swing drive mechanism 46. Therefore, an electrical resistance value of the shake correction coil 23 is reduced and thus power consumption in the shake correction coil 23 is reduced.

Figure 20:
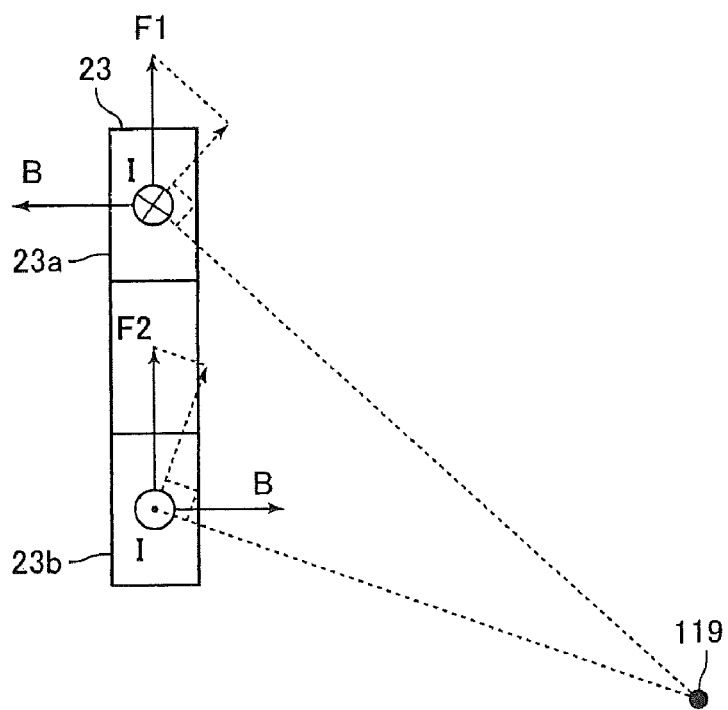
FIG. 20 is an explanatory view showing an effect of an optical unit with shake correcting function in accordance with an embodiment of the present invention.

As a comparison example, it may be structured that the shake correction magnet 21 and the shake correction coil 23 are disposed so that the abutting face 27 of the shake correction magnet 21 and the center "CL3" of the shake correction coil 23 are coincided with each other in the optical axis direction. In this case, as shown in FIG. 20, when the shake correction coil 23 is disposed in a region where directions of the magnetic lines of force generated from the shake correction magnet 21 is set to be in a roughly lateral direction (or roughly front and rear direction), for example, upward electro-magnetic forces "F1" and "F2" are generated in the shake correction coil 23 to which an electric current is supplied. In other words, in this case, the directions of the electro-magnetic forces "F1" and "F2" do not coincide with direction generating a swing force for swinging the movable module 202 with the supporting point part 119 as a swinging center. Therefore, in this case, magnetic flux generated from the shake correction magnet 21 is not utilized effectively.

Figure 21:
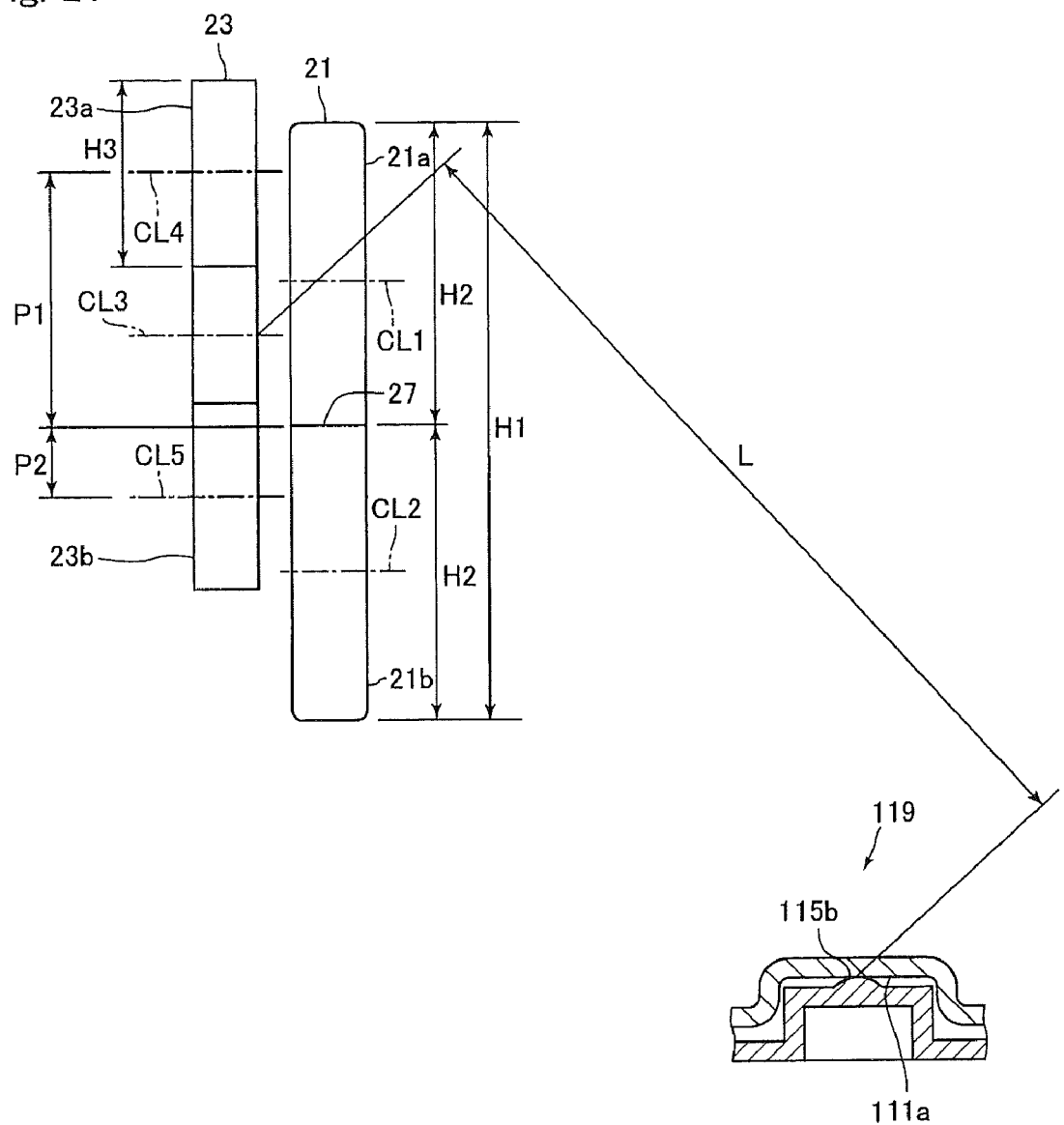
FIG. 21 is an explanatory view showing conditions of simulation for comparing drive forces of the swing drive mechanism shown in FIG. 16.
Figure 22:
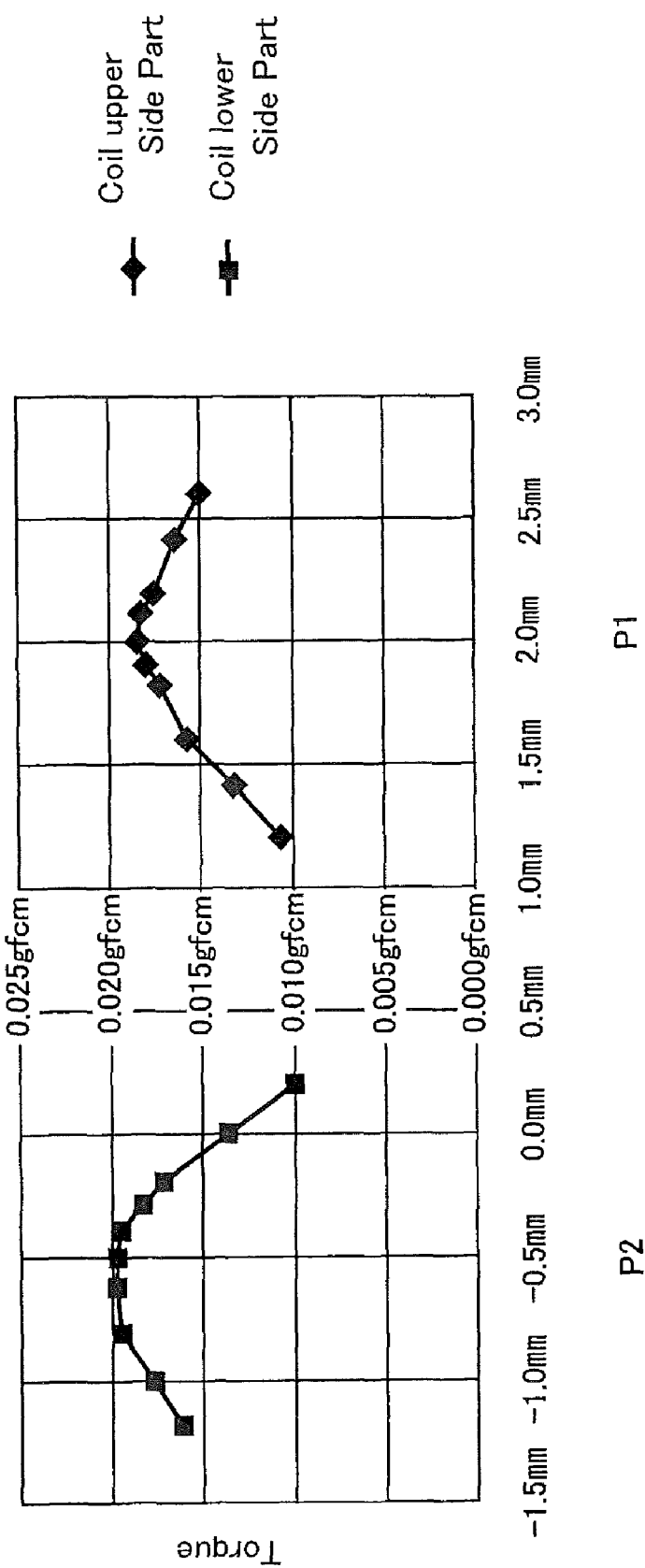
FIG. 22 is a graph showing results of simulation for comparing drive forces of the swing drive mechanism shown in FIG. 16.

FIG. 21 is a view for explaining conditions of simulation in which a driving force of the swing drive mechanism 46 shown in FIG. 16 is compared. FIG. 22 is a graph showing results of simulation in which a driving force of the swing drive mechanism 46 shown in FIG. 16 is compared.

Relationship between distances between the long side parts 23a and 23b and the abutting face 27 of the shake correction magnet 21 in the optical axis direction and a driving force of the swing drive mechanism 46 will be described below on the basis of simulation results.

Torques generated by the swing drive mechanism 46 are simulated while the distance "P1" (see FIG. 21) between the center "CL4" of the long side part 23a and the abutting face 27 in the optical axis direction and the distance "P2" (see FIG. 21) between the center "CL5" of the long side part 23b and the abutting face 27 in the optical axis direction are changed. In this simulation, as shown in FIG. 21, the height "H1" of the shake correction magnet 21 is 4.8 mm, the height "H2" of the first magnet piece 21a and the second magnet piece 21b is 2.4 mm, and the height "H3" of the long side parts 23a and 23b is 1.2 mm. Further, when the distance "P1" is 2 mm and the distance "P2" is 0.5 mm, the distance "L" between the supporting point part 119 and the shake correction coil 23 is about 7.6 mm.

Simulation results are shown in FIG. 22. In the horizontal scale in FIG. 22, values of the distances "P1" and "P2" are positive (plus) when the centers "CL4" and "CL5" are located on upper sides relative to the abutting face 27, and values of the distances "P1" and "P2" are negative (minus) when the centers "CL4" and "CL5" are located on lower sides relative to the abutting face 27.

As shown in FIG. 22, in this simulation, a torque of the swing drive mechanism 46 becomes the maximum when the distance "P1" is 2 mm and the distance "P2" is −0.5 mm. This torque is about 1.4 times of the torque of the swing drive mechanism 46 when the distance "P1" is 1.2 mm and the distance "P2" is −1.2 mm. In other words, the torque of the swing drive mechanism 46 when the distance "P1" is 2 mm and the distance "P2" is −0.5 mm becomes about 1.4 times of the torque of the swing drive mechanism 46 when the center "CL3" of the shake correction coil 23 and the abutting face 27 are disposed at the same position in the optical axis direction.

In the simulation described above, the torque of the swing drive mechanism 46 is the maximum when the distance "P1" is 2 mm and the distance "P2" is −0.5 mm. However, when dimensions of the shake correction magnet 21, the shake correction coil 23 and the like are changed, optimum distances "P1" and "P2" are also changed. Further, when optimum distances "P1" and "P2" for obtaining the maximum torque of the swing drive mechanism 46 are unable to set due to restrictions of the outside dimension of the optical unit 100 with shake correcting function or the like, appropriate distances "P1" and "P2" which are allowed within the restriction may be set so that the torque of the swing drive mechanism 46 is made larger.

Figure 23:
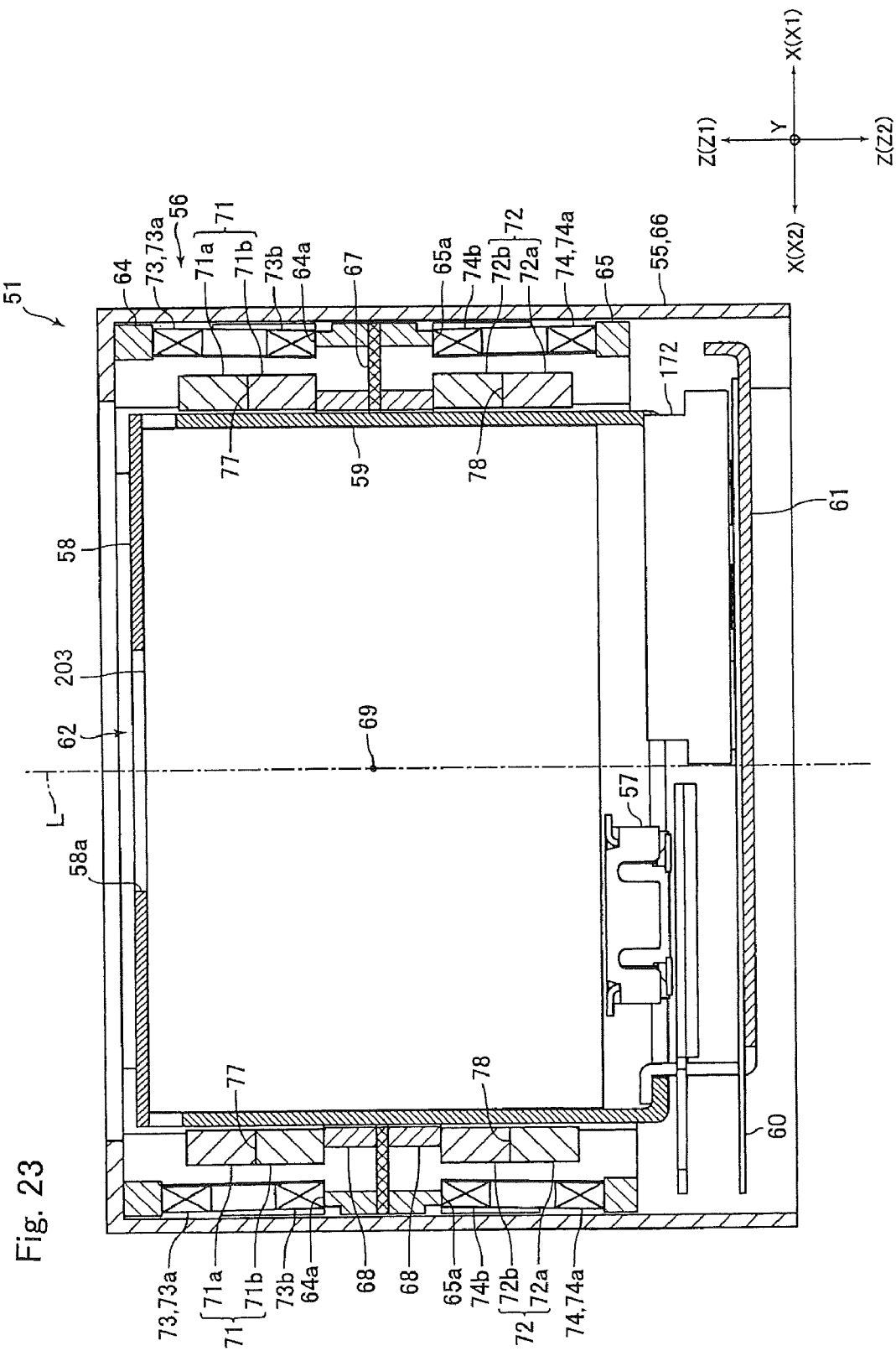
FIG. 23 is a cross-sectional view showing an optical unit with shake correcting function in accordance with another embodiment of the present invention.
Figure 24:
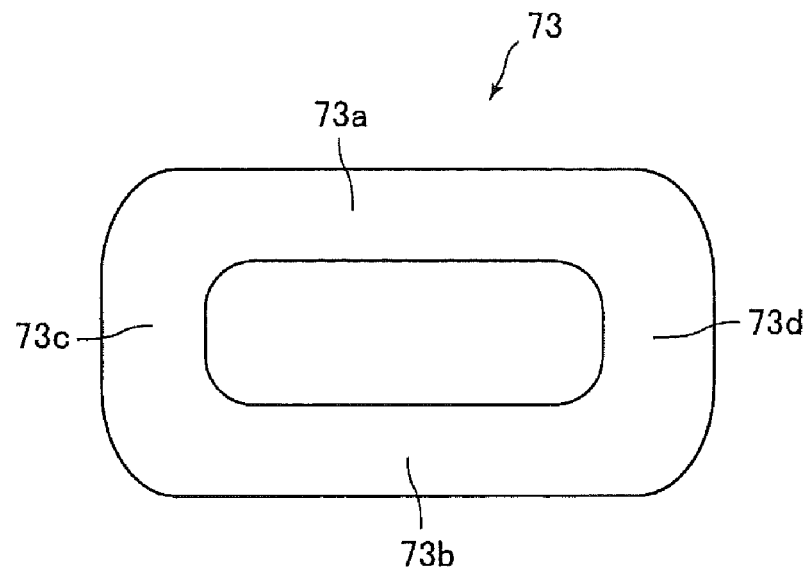
FIG. 24 is a plan view showing the shake correction coil in FIG. 23.
Figure 25:
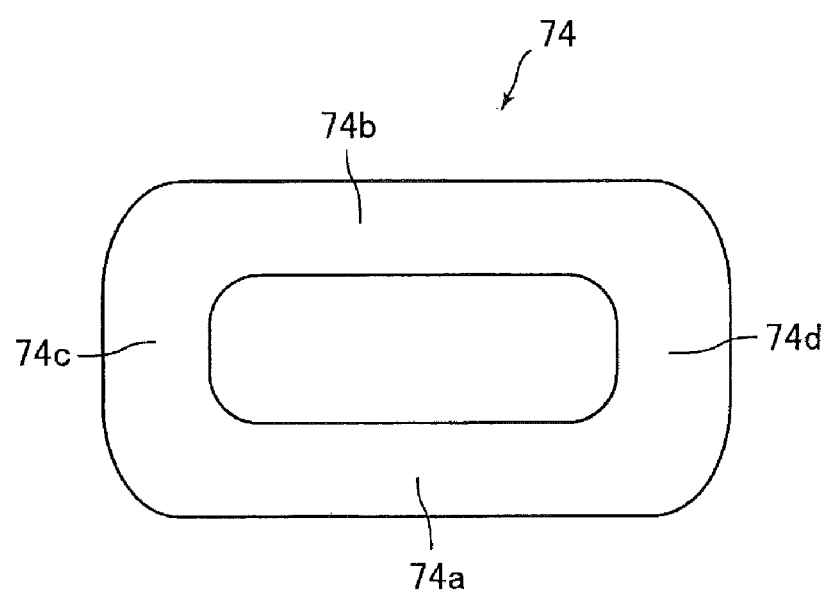
FIG. 25 is a plan view showing another shake correction coil in FIG. 23.
Figure 26:
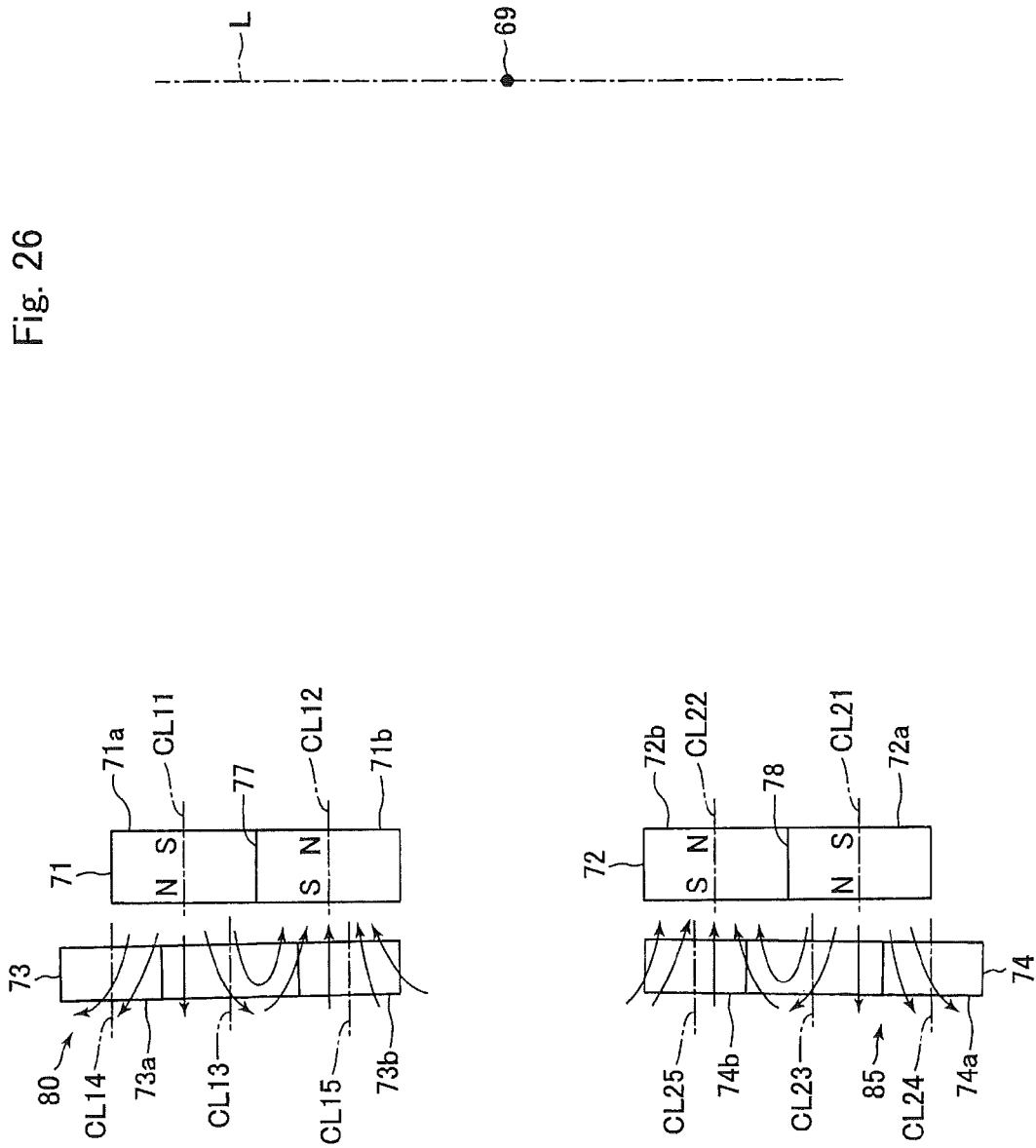
FIG. 26 is an explanatory view showing magnetic lines of force which are generated from the shake correction magnets shown in FIG. 23.
Figure 27:
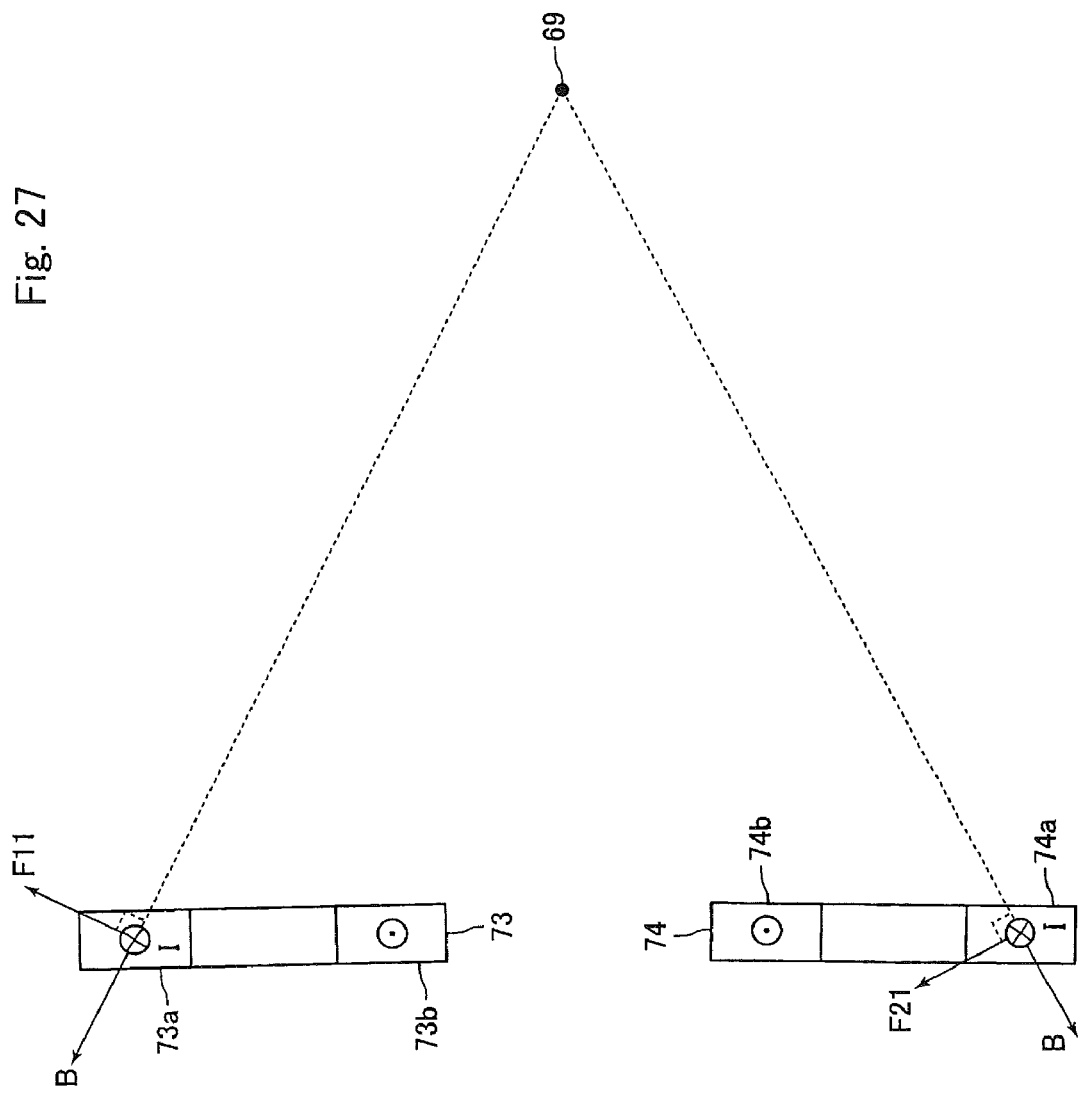
FIG. 27 is an explanatory view showing directions of electro-magnetic forces generated when an electric current is supplied to the shake correction coils shown in FIG. 23.

FIG. 23 is a sectional view showing an optical unit 51 with shake correcting function in accordance with another embodiment of the present invention. FIG. 24 is a plan view showing a shake correction coil 73 shown in FIG. 23. FIG. 25 is a plan view showing a shake correction coil 74 shown in FIG. 23. FIG. 26 is an explanatory view showing magnetic lines of force which are generated by shake correction magnets 71 and 72 shown in FIG. 23. FIG. 27 is an explanatory view showing directions of electro-magnetic forces which are generated by supplying an electric current to shake correction coils 73 and 74 shown in FIG. 23.

In the following descriptions, the same structures as the above-mentioned embodiment are referred to as the same notational symbols and their descriptions are omitted or simplified. Further, also in the following descriptions, three directions perpendicular to each other are set in an "X" direction, a "Y" direction and a "Z" direction, and an "X1" direction side is set as a "right" side, an "X2" direction side is set as a "left" side, a "Y1" direction side as a "front" side, a "Y2" direction side as a "back" side, a "Z1" direction side as an "upper" side, and a "Z2" direction side is set as a "lower" side.

An optical unit 51 with shake correcting function in this embodiment is, similarly to the above-mentioned optical unit 100 with shake correcting function, a small and thin camera which is mounted on a portable apparatus such as a cellular phone. As shown in FIG. 23, the optical unit 51 includes a lens drive module 203, a sensor 172, a support body 55 which supports the lens drive module 203, and a swing drive mechanism 56 for swinging the lens drive module 203. Also in this embodiment, an upper and lower direction is coincided with an optical axis direction of the optical unit 51 with shake correcting function when the lens drive module 203 is not swung.

Front and rear side faces and right and left side faces of the lens drive module 203 are covered by a cover member 59 whose upper end and lower end are opened and which is formed in a substantially rectangular tube shape. The cover member 59 is formed of magnetic material. Front and rear side faces and right and left side faces of the cover member 59 are formed to be substantially parallel to the optical axis direction and each of the side faces is fixed with shake correction magnets 71 and 72 which structure the swing drive mechanism 56. An upper end of the cover member 59 is attached with an upper cover member 58 which is formed in a roughly rectangular plate shape. In other words, the upper end of the cover member 59 is covered by the upper cover member 58. A circular through hole 58a is formed at a center of the upper cover member 58.

A sensor 172 is disposed on a lower side of the lens drive module 203. Specifically, the sensor 172 is disposed on the lower side of the lens drive module 203 so as to be displaced from the optical axis "L". An FPC 60 is connected with the sensor 172. In accordance with an embodiment of the present invention, a connector 57 with which an imaging element and the like mounted on the lens drive module 203 are electrically connected is disposed on an under face of the lens drive module 203 so as to be adjacent to the sensor 172.

An under face of the sensor 172 is covered by a lower cover member 61 which is formed in a roughly rectangular plate shape. The lower cover member 61 is attached to a lower end of the cover member 59 to cover the lower end of the cover member 59.

In this embodiment, the lens drive module 203, the sensor 172, the cover member 59, the upper cover member 58 and the lower cover member 61 are supported by the support body 55 so as to be capable of swinging. In other words, in this embodiment, the movable module 62 capable of swinging with respect to the support body 55 is structured of the lens drive module 203, the sensor 172, the cover member 59, the upper cover member 58 and the lower cover member 61.

The support body 55 includes a case body 66, which structures front and rear outer peripheral faces and right and left outer peripheral faces of the optical unit 51 with shake correcting function, and coil holding members 64 and 65 which hold shake correction coils 73 and 74 structuring the swing drive mechanism 56. A flat spring 67 which swingably supports the movable module 62 is fixed to the coil holding members 64 and 65 or the case body 66.

The case body 66 is formed in a substantially rectangular tube shape whose upper end and lower end are opened. Front and rear side faces and right and left side faces of the case body 66 are formed in substantially parallel to the optical axis direction.

The coil holding members 64 and 65 are formed, for example, of resin having insulation property. Further, the coil holding members 64 and 65 are formed in a substantially rectangular tube shape having four side faces which are parallel to side faces of the case body 66. The coil holding members 64 and 65 are fixed to inner peripheral faces of the case body 66. Specifically, the coil holding members 64 and 65 are fixed to the inner peripheral face of the case body 66 so as to be superposed on each other in the optical axis direction. Further, the coil holding member 64 is disposed on an upper side and the coil holding member 65 is disposed on a lower side.

Each of four side faces of the coil holding member 64 is formed with an arrangement hole 64a on which the shake correction coil 73 is disposed. The arrangement hole 64a is formed so as to penetrate through the side face of the coil holding member 64. Further, each of four side faces of the coil holding member 65 is formed with an arrangement hole 65*a* on which the shake correction coil 74 is disposed. The arrangement hole 65*a* is formed so as to penetrate through the side face of the coil holding member 65.

The flat spring 67 is generally formed in a roughly rectangular shape. An outer peripheral side of the flat spring 67 is fixed to the support body 55 and the movable module 62 is fixed to a center part of the flat spring 67. In other words, the flat spring 67 is provided with a fixing part which is fixed to the support body 55, a holding part which holds the movable module 62, and a spring part which connects the fixing part with the holding part.

In this embodiment, a substantially center position in the optical axis direction of the cover member 59 is fixed to the center part of the flat spring 67. Specifically, a substantially center position in the optical axis direction of the cover member 59 is fixed to the center part of the flat spring 67 through a spacer 68 which is fixed at a substantially center position in the optical axis direction of the cover member 59. Therefore, the flat spring 67 is disposed at an intermediate position of the movable module 62 in the optical axis direction. In this embodiment, a substantially center position of the flat spring 67 becomes to be a swing center 69 of the movable module 62. The swing center 69 is disposed at a position through which the optical axis "L" of the lens drive device 2 is passed. The optical axis "L" of the lens drive module 203 is disposed at the center of the movable module 62.

The swing drive mechanism 56 includes the shake correction magnets 71 disposed on upper sides in the optical axis direction relative to the swing center 69, the shake correction coils 73 which are disposed on upper sides in the optical axis direction relative to the swing center 69 so as to face the shake correction magnets 71, the shake correction magnets 72 disposed on lower sides in the optical axis direction relative to the swing center 69, and the shake correction coils 74 which are disposed on lower sides in the optical axis direction relative to the swing center 69 so as to face the shake correction magnets 72. The swing drive mechanism 56 in this embodiment includes four pieces of the shake correction magnets 71, four pieces of the shake correction magnets 72, four pieces of the shake correction coils 73, and four pieces of the shake correction coils 74.

The shake correction magnet 71 is formed in a substantially rectangular plate shape having a constant thickness. Further, the shake correction magnet 71 is structured of two magnet pieces, i.e., a first magnet piece 71*a* and a second magnet piece 71*b*. Specifically, the first magnet piece 71*a* and the second magnet piece 71*b* are adhesively fixed to each other in a state that an under face of the first magnet piece 71*a* and an upper face of the second magnet piece 71*b* are abutted with each other to form the shake correction magnet 71. The first magnet piece 71*a* and the second magnet piece 71*b* are formed so that their heights, widths and thicknesses are the same as each other.

The shake correction magnet 72 is formed similarly to the shake correction magnet 71. In other words, the shake correction magnet 72 is formed in a substantially rectangular plate shape having a constant thickness. Further, the shake correction magnet 72 is structured of two magnet pieces, i.e., a first magnet piece 72*a* and a second magnet piece 72*b*. Specifically, the first magnet piece 72*a* and the second magnet piece 72*b* are adhesively fixed to each other in a state that an under face of the first magnet piece 72*a* and an upper face of the second magnet piece 72*b* are abutted with each other to form the shake correction magnet 72. The first magnet piece 72*a* and the second magnet piece 72*b* are formed so that their heights, widths and thicknesses are the same as each other.

The shake correction magnets 71 and 72 are fixed by one piece to each of the front and rear side faces and the right and left side faces of the cover member 59. Specifically, one piece of the shake correction magnet 71 is fixed to each of the front and rear side faces and the right and left side faces of the cover member 59 on the upper side of the flat spring 67, and one piece of the shake correction magnet 72 is fixed to each of the front and rear side faces and the right and left side faces of the cover member 59 on the lower side of the flat spring 67. In other words, the shake correction magnets 71 and 72 are swung together with the lens drive module 203. As described above, the cover member 59 is formed of magnetic material which functions as a back yoke for the shake correction magnets 71 and 72. The cover member 59 in this embodiment is a magnet holding member which holds the shake correction magnets 71 and 72. In accordance with an embodiment of the present invention, the shake correction magnets 71 and 72 are fixed to the side face of the cover member 59 in a state positioned in the optical axis direction by the spacer 68 which is formed in a roughly rectangular frame shape.

In this embodiment, the shake correction magnets 71 and 72 fixed on the right and left side faces of the cover member 59 are magnetized so that magnetic poles of the shake correction magnet 71 and 72 formed on the right side are different from magnetic poles formed on the left face. Further, the shake correction magnets 71 and 72 fixed on the right and left side faces of the cover member 59 are magnetized so that magnetic poles formed on outer side faces of the first magnet pieces 71*a* and 72*a* in the lateral direction are different from magnetic poles formed on outer side faces of the second magnet pieces 71*b* and 72*b* in the lateral direction. In other words, the shake correction magnets 71 and 72 are magnetized so that magnetic poles formed on inner side faces of the first magnet pieces 71*a* and 72*a* in the lateral direction are different from magnetic poles formed on inner side faces of the second magnet pieces 71*b* and 72*b* in the lateral direction.

Similarly, the shake correction magnets 71 and 72 fixed on the front and rear side faces of the cover member 59 are magnetized so that magnetic poles formed on the front faces of the shake correction magnets 71 and 72 are different from magnetic poles formed on their rear faces. Further, the shake correction magnets 71 and 72 fixed on the front and rear side faces of the cover member 59 are magnetized so that magnetic poles formed on outer side faces of the first magnet pieces 71*a* and 72*a* in the front and rear direction are different from magnetic poles formed on outer side faces of the second magnet pieces 71*b* and 72*b*.

For example, a right side face of the first magnet piece 71*a* of the shake correction magnet 71 which is fixed on the right side face of the cover member 59 is magnetized in an "S"-pole and its left side face is magnetized in an "N"-pole. Further, a right side face of the second magnet piece 71*b* of the shake correction magnet 71 is magnetized in an "N"-pole and its left side face is magnetized in an "S"-pole. Similarly, a left side face of the first magnet piece 71*a* of the shake correction magnet 71 which is fixed on the left side face of the cover member 59 is magnetized in an "S"-pole and its right side face is magnetized in an "N"-pole. Further, a left side face of the second magnet piece 71*b* of the shake correction magnet 71 is magnetized in an "N"-pole and its right side face is magnetized in an "S"-pole.

Further, for example, a rear side face of the first magnet piece 71*a* of the shake correction magnet 71 which is fixed on the rear side face of the cover member 59 is magnetized in an "N"-pole and its front side face is magnetized in an "S"-pole, and a rear side face of the second magnet piece 71*b* of the shake correction magnet 71 is magnetized in an "S"-pole and its front side face is magnetized in an "N"-pole. Similarly, a front side face of the first magnet piece 71a of the shake correction magnet 71 which is fixed on the front side face of the cover member 59 is magnetized in an "N"-pole and its rear side face is magnetized in an "S"-pole, and a front side face of the second magnet piece 71b of the shake correction magnet 71 is magnetized in an "S"-pole and its rear side face is magnetized in an "N"-pole.

Further, for example, a right side face of the first magnet piece 72a of the shake correction magnet 72 which is fixed on the right side face of the cover member 59 is magnetized in an "S"-pole and its left side face is magnetized in an "N"-pole, and a right side face of the second magnet piece 72b of the shake correction magnet 72 is magnetized in an "N"-pole and its left side face is magnetized in an "S"-pole. Similarly, a left side face of the first magnet piece 72a of the shake correction magnet 72 which is fixed on the left side face of the cover member 59 is magnetized in an "S"-pole and its right side face is magnetized in an "N"-pole, and a left side face of the second magnet piece 72b of the shake correction magnet 72 is magnetized in an "N"-pole and its right side face is magnetized in an "S"-pole.

Further, for example, a rear side face of the first magnet piece 72a of the shake correction magnet 72 which is fixed on the rear side face of the cover member 59 is magnetized in an "N"-pole and its front side face is magnetized in an "S"-pole, and a rear side face of the second magnet piece 72b of the shake correction magnet 72 is magnetized in an "S"-pole and its front side face is magnetized in an "N"-pole. Similarly, a front side face of the first magnet piece 72a of the shake correction magnet 72 which is fixed on the front side face of the cover member 59 is magnetized in an "N"-pole and its rear side face is magnetized in an "S"-pole, and a front side face of the second magnet piece 72b of the shake correction magnet 72 is magnetized in an "S"-pole and its rear side face is magnetized in an "N"-pole.

The shake correction coils 73 and 74 are air-core coils which are similar to the shake correction coil 23. In other words, the shake correction coils 73 and 74 are flat coils whose thickness is substantially constant. Further, the shake correction coils 73 and 74 are formed in a substantially rectangular wound shape. In other words, the shake correction coil 73 is, as shown in FIG. 24, structured of two long side parts 73a and 73b which are parallel to each other and two short side parts 73c and 73d which are formed shorter than the long side parts 73a and 73b and parallel to each other. Further, the shake correction coil 74 is, as shown in FIG. 25, structured of two long side parts 74a and 74b which are parallel to each other and two short side parts 74c and 74d which are formed shorter than the long side parts 74a and 74b and parallel to each other.

The shake correction coil 73 is fixed by one piece to each of the front and rear side faces and the right and left side faces of the coil holding member 64. Further, the shake correction coil 74 is fixed by one piece to each of the front and rear side faces and the right and left side faces of the coil holding member 65. Further, the shake correction coil 73 is fixed to the coil holding member 64 so that longitudinal directions of the short side parts 73c and 73d are coincided with the upper and lower direction, and the shake correction coil 74 is fixed to the coil holding member 65 so that longitudinal directions of the short side parts 74c and 74d are coincided with the upper and lower direction. In other words, the shake correction coil 73 is fixed to the coil holding member 64 so that longitudinal directions of the long side parts 73a and 73b are coincided with the lateral direction or the front and rear direction, and the shake correction coil 74 is fixed to the coil holding member 65 so that longitudinal directions of the long side parts 74a and 74b are coincided with the lateral direction or the front and rear direction.

In the shake correction coil 73 in this embodiment, the long side part 73a disposed on the upper side is a first side part and the long side part 73b disposed on the lower side is a second side part. Further, in the shake correction coil 74 in this embodiment, the long side part 74a disposed on the lower side is a first side part and the long side part 73b disposed on the upper side is a second side part.

As shown in FIG. 23, the shake correction magnets 71 and the shake correction coils 73 are oppositely disposed to each other in the front and rear direction or the lateral direction through a predetermined gap space. Specifically, the shake correction magnets 71 and the shake correction coils 73 are disposed on an upper side relative to the swing center 69 so as to face each other and, even when the movable module 62 is swung with the swing center 69 as a center, the shake correction magnets 71 and the shake correction coils 73 are oppositely disposed through a predetermined gap space so that the shake correction magnets 71 are not contacted with the shake correction coils 73. Further, the shake correction magnets 72 and the shake correction coils 74 are disposed on a lower side relative to the swing center 69 so as to face each other and, even when the movable module 62 is swung with the swing center 69 as a center, the shake correction magnets 72 and the shake correction coils 74 are oppositely disposed through a predetermined gap space so that the shake correction magnets 72 are not contacted with the shake correction coils 74.

In this embodiment, when an electric current is not supplied to the shake correction coils 73 and 74, as shown in FIG. 23, the movable module 62 is located at a neutral position where the movable module 62 is not inclined with respect to the support body 55. In other words, the lens drive module 203 is located at a neutral position where the lens drive module 203 is not inclined with respect to the support body 55.

In this embodiment, when the movable module 62 is located at the neutral position as shown in FIG. 23, inner side faces in the lateral direction of the shake correction coils 73 which are fixed to the right and left side faces of the coil holding member 64 are inclined so that the inner side faces are gradually widened outside in the lateral direction toward the upper direction. Similarly, when the movable module 62 is located at the neutral position, inner side faces in the front and rear direction of the shake correction coils 73 which are fixed to the front and rear side faces of the coil holding member 64 are inclined so that the inner side faces are gradually widened outside in the front and rear direction toward the upper direction.

Further, as shown in FIG. 23, when the movable module 62 is located at the neutral position, inner side faces in the lateral direction of the shake correction coils 74 which are fixed to the right and left side faces of the coil holding member 65 are inclined so that the inner side faces are gradually widened outside in the lateral direction toward the downward direction. Similarly, when the movable module 62 is located at the neutral position, inner side faces in the front and rear direction of the shake correction coils 74 which are fixed to the front and rear side faces of the coil holding member 65 are inclined so that the inner side faces are gradually widened outside in the front and rear direction toward the downward direction.

As described above, the shake correction magnets 71 and 72 are magnetized so that the magnetic poles formed on the outer side faces of the first magnet pieces 71a and 72a in the lateral direction or the front and rear direction are different from the magnetic poles formed on the outer side faces of the second magnet pieces 71*b* and 72*b*. In other words, opposite faces of the shake correction magnets 71 to the shake correction coils 73 are formed with two magnetic poles ("N"-pole and "S"-pole) which are superposed on each other in the optical axis direction, and opposite faces of the shake correction magnets 72 to the shake correction coils 74 are formed with two magnetic poles ("N"-pole and "S"-pole) which are superposed on each other in the optical axis direction. Therefore, magnetic lines of force generated by the shake correction magnets 71 and 72 are, for example, shown by the arrows in FIG. 26.

Therefore, for example, on an upper side in the optical axis direction with respect to the center "CL11" of the first magnet piece 71*a*, a region 80 where magnetic lines of force are directed in directions generally going away from the swing center 69 is formed on an outer side in the front and rear direction (or right and left direction) of the opposite face of the first magnet piece 71*a* to the shake correction coil 73. The region 80 is referred to as a "first region 80". In other words, on an upper side with respect to the center "CL11", which is the magnetic center of the magnetic pole ("N"-pole) formed on the opposite face of the first magnet piece 71*a* to the shake correction coil 73, the first region 80 is formed on the outer side in the front and rear direction (or right and left direction) of the opposite face of the first magnet piece 71*a* to the shake correction coil 73.

Further, for example, on a lower side in the optical axis direction with respect to the center "CL21" of the first magnet piece 72*a*, a region 85 where magnetic lines of force are directed in directions generally going away from the swing center 69 is formed on an outer side in the front and rear direction (or right and left direction) of the opposite face of the first magnet piece 72*a* to the shake correction coil 74. The region 85 is referred to as a "first region 85". In other words, on a lower side with respect to the center "CL21", which is the magnetic center of the magnetic pole ("N"-pole) formed on the opposite face of the first magnet piece 72*a* to the shake correction coil 74, the first region 85 is formed on the outer side in the front and rear direction (or right and left direction) of the opposite face of the first magnet piece 72*a* to the shake correction coil 74.

In this embodiment, as shown in FIGS. 23 and 26, the shake correction magnet 71 and the shake correction coil 73 are oppositely disposed so that the center "CL13" of the shake correction coil 73 in the optical axis direction is located on an upper side with respect to the abutting face 77 of the first magnet piece 71*a* with the second magnet piece 71*b*. In other words, the center "CL13" of the shake correction coil 73 is disposed at a position far away from the swing center 69 in the optical axis direction relative to the abutting face 77, i.e., the magnetic center of the shake correction magnet 71.

Specifically, as shown in FIG. 26, the center "CL14" of the long side part 73*a* in the optical axis direction is located on an upper side relative to the center "CL11" of the first magnet piece 71*a*. In other words, the center "CL14" of the long side part 73*a* is disposed on the upper side relative to the center "CL11" which is the magnetic center of the magnetic pole formed on the opposite face of the first magnet piece 71*a* to the shake correction coil 73. In other words, in this embodiment, the long side part 73*a* is disposed in the first region 80. In this embodiment, the center "CL15" of the long side part 73*b* in the optical axis direction is disposed on a lower side relative to the center "CL12" of the second magnet piece 71*b*. In other words, the center "CL15" of the long side part 73*b* is disposed on a lower side relative to the center "CL12" which is the magnetic center of the magnetic pole formed on the opposite face of the second magnet piece 71*b* to the shake correction coil 73.

In this embodiment, as shown in FIGS. 23 and 26, the shake correction magnet 72 and the shake correction coil 74 are oppositely disposed so that the center "CL23" of the shake correction coil 74 in the optical axis direction is located on a lower side with respect to the abutting face 78 of the first magnet piece 72*a* with the second magnet piece 72*b*. In other words, the center "CL23" of the shake correction coil 74 is disposed at a position far away from the swing center 69 in the optical axis direction relative to the abutting face 78, i.e., the magnetic center of the shake correction magnet 72.

Specifically, as shown in FIG. 26, the center "CL24" of the long side part 74*a* in the optical axis direction is located on a lower side relative to the center "CL21" of the first magnet piece 72*a*. In other words, the center "CL24" of the long side part 74*a* is disposed on the lower side relative to the center "CL21" which is the magnetic center of the magnetic pole formed on the opposite face of the first magnet piece 72*a* to the shake correction coil 74. In other words, in this embodiment, the long side part 74*a* is disposed in the first region 85. In this embodiment, the center "CL25" of the long side part 74*b* in the optical axis direction is disposed on an upper side relative to the center "CL22" of the second magnet piece 72*b*. In other words, the center "CL25" of the long side part 74*b* is disposed on the upper side relative to the center "CL22" which is the magnetic center of the magnetic pole formed on the opposite face of the second magnet piece 72*b* to the shake correction coil 74.

As described above, in this embodiment, the long side part 73*a* is disposed in the first region 80 and the long side part 74*a* is disposed in the first region 85. Therefore, as shown in FIG. 27, a direction of the electro-magnetic force "F11" generated in the long side part 73*a* when an electric current is supplied to the shake correction coil 73 is roughly coincided with a tangential direction of a circle whose center is the swing center 69 and which passes through the long side part 73*a*. Further, a direction of the electro-magnetic force "F21" generated in the long side part 74*a* when an electric current is supplied to the shake correction coil 74 is roughly coincided with a tangential direction of a circle whose center is the swing center 69 and which passes through the long side part 74*a*. In other words, the directions of the electro-magnetic forces "F11" and "F21" generated in the shake correction coils 73 and 74 when an electric current is supplied to the shake correction coils 73 and 74 are roughly coincided with directions which generate swing forces for making the movable module 62 swing with the swing center 69 as a center.

In the optical unit 51 with shake correcting function 51 which is structured as described above, when a variation of inclination of the lens drive module 203 is detected with the sensor 172, in other words, when shake (vibration) of the lens drive module 203 is detected, an electric current is supplied to the shake correction coils 73 and 74 on the basis of detection result with the sensor 172 and thus the movable module 62 is swung with the swing center 69 as a center to correct the shake. In this embodiment, the shake correction mechanism (shake by hand correction mechanism) is structured in which the lens drive module 203 is swung on the basis of detection result with the sensor 172 by using the swing drive mechanism 56 and the flat spring 67 to correct the shake (shake by hand).

As described above, in this embodiment, the shake correction magnets 71 and the shake correction coils 73 are oppositely disposed to each other on the upper side relative to the swing center 69, and the center "CL14" of the long side part 73*a* is disposed on the upper side relative to the center "CL11" which is the magnetic center of the magnetic pole formed on the opposite face of the first magnet piece 71*a* to the shake correction coil 73. Further, the shake correction magnets 72 and the shake correction coils 74 are oppositely disposed to each other on the lower side relative to the swing center 69, and the center "CL24" of the long side part 74*a* is disposed on the lower side relative to the center "CL21" which is the magnetic center of the magnetic pole formed on the opposite face of the first magnet piece 72*a* to the shake correction coil 74.

In other words, in this embodiment, the long side part 73*a* is disposed in the first region 80 where magnetic lines of force generated by the shake correction magnet 71 are directed in directions generally going away from the swing center 69, and the long side part 74*a* is disposed in the first region 85 where magnetic lines of force generated by the shake correction magnet 72 are directed in directions generally going away from the swing center 69. Therefore, as described above, the directions of the electro-magnetic forces "F11" and "F21" when an electric current is supplied to the shake correction coils 73 and 74 are roughly coincided with directions which generate swing forces for making the movable module 62 swing with the swing center 69 as a center. Accordingly, in this embodiment, a drive force of the swing drive mechanism 56 is enhanced by effectively utilizing the magnetic flux generated by the shake correction magnets 71 and 72. As a result, in this embodiment, even when the optical unit 51 with shake correcting function is made smaller and thinner, a sufficient drive force can be obtained for swinging the lens drive module 203.

Especially, in this embodiment, the long side part 73*a* is disposed in the first region 80 and the long side part 74*a* is disposed in the first region 85. Therefore, the electro-magnetic forces "F11" and "F21" whose directions are roughly coincided with directions which generate swing forces for making the movable module 62 swing with the swing center 69 as a center can be generated in the long side parts 73*a* and 74*a*. Accordingly, in this embodiment, a drive force of the swing drive mechanism 56 can be enhanced efficiently.

In this embodiment, the center "CL13" of the shake correction coil 73 is disposed at a position far away from the swing center 69 in the optical axis direction relative to the abutting face 77 of the shake correction magnet 71. Therefore, in a comparison with a case that the abutting face 77 and the center "CL13" of the shake correction coil 73 are disposed at equal positions from the swing center 69 in the optical axis direction, a distance from the swing center 69 to the shake correction coil 73 is made longer. Similarly, the center "CL23" of the shake correction coil 74 is disposed at a position far away from the swing center 69 in the optical axis direction relative to the abutting face 78 of the shake correction magnet 72. Therefore, in a comparison with a case that the abutting face 78 and the center "CL23" of the shake correction coil 74 are disposed at equal positions from the swing center 69 in the optical axis direction, a distance from the swing center 69 to the shake correction coil 74 is made longer. Accordingly, a torque for swinging the movable module 62 is increased and thus a drive force of the swing drive mechanism 56 is enhanced.

In this embodiment, the long side part 73*a* is disposed in the first region 80 and the long side part 74*a* is disposed in the first region 85. Therefore, in comparison with a case that the short side parts 73*c*, 73*d*, 74*c* and 74*d* are disposed in the first regions 80 and 85, a drive force of the swing drive mechanism 56 is further enhanced. Further, in comparison with a case that shake correction coil 73, 74 are formed in a substantially square wound shape, in this embodiment, the size in the upper and lower direction of the optical unit 51 with shake correcting function is reduced while a drive force of the swing drive mechanism 56 is enhanced. In addition, lengths of the short side parts 73*c*, 73*d*, 74*c* and 74*d* which hardly contribute to the drive force of the swing drive mechanism 56 may be made shorter and thus electrical resistance values of the shake correction coils 73 and 74 can be reduced and power consumption of the shake correction coils 73 and 74 are reduced.

Although the present invention has been shown and described with reference to specific embodiments, various changes and modifications will be apparent to those skilled in the art from the teachings herein.

In the embodiment described above, the shake correction magnet 21 is attached to the cover member 9 and the shake correction coil 23 is attached to the case body 116. However, the present invention is not limited to this embodiment. For example, the shake correction magnet 21 may be attached to the case body 116 and the shake correction coil 23 is attached to the cover member 9. In this case, the center "CL3" of the shake correction coil 23 is disposed on a lower side relative to the abutting face 27 of the shake correction magnet 21. In other words, the center "CL3" of the shake correction coil 23 is located at a nearer position to the supporting point part 119 in the optical axis direction than the magnetic center of the shake correction magnet 21.

Specifically, the center "CL4" of the long side part 23*a* is disposed on a lower side relative to the center "CL1" of the first magnet piece 21*a* and on an upper side relative the abutting face 27 and, in addition, the center "CL5" of the long side part 23*b* is disposed on a lower side relative to the center "CL2" of the second magnet piece 21*b*. In other words, in this case, the long side part 23*a* is disposed on a lower side relative to the center "CL1" of the first magnet piece 21*a* and in a region which is formed on an inner side of an opposite face of the first magnet piece 21*a* to the shake correction coil 23 in the front and rear direction (or right and left direction) and in a region where the magnetic lines of force are directed in directions generally going away from the supporting point part 119. Further, the long side part 23*b* is disposed on a lower side relative to the center "CL2" of the second magnet piece 21*b* in a region formed on an inner side of an opposite face of the second magnet piece 21*b* to the shake correction coil 23 in the front and rear direction (or right and left direction) and in a region where magnetic lines of force are directed in directions generally going nearer to the supporting point part 119.

Similarly, in the embodiment described above, the shake correction magnets 71 and 72 are attached to the cover member 59 and the shake correction coils 73 and 74 are attached to the coil holding member 64, 65. However, it may be structured that the shake correction magnets 71 and 72 are attached to the case body 66 and the shake correction coils 73 and 74 are attached to the cover member 59.

In the embodiment described above, the shake correction magnets 21, 71 and 72 are structured of two magnet pieces, i.e., the first magnet pieces 21*a*, 71*a* and 72*a* and the second magnet pieces 21*b*, 71*b* and 72*b*. However, the present invention is not limited to this embodiment. For example, the shake correction magnets 21, 71 and 72 may be structured of one piece of magnet. In this case, one piece of magnet is magnetized so that each of both faces of the shake correction magnets 21, 71 and 72 is formed with two magnetic poles which are superposed on each other in the optical axis direction.

In the embodiment described above, the opposite face of the shake correction magnet 21 to the shake correction coil 23 is formed with two magnetic poles which are superposed on each other in the optical axis direction. However, the present invention is not limited to this embodiment. For example, only one magnetic pole may be formed on an opposite face of the shake correction magnet 21 to the shake correction coil 23 and alternatively, three or more magnetic poles may be formed. In accordance with an embodiment of the present invention, when only one magnetic pole may be formed on an opposite face of the shake correction magnet 21 to the shake correction coil 23, only one of the long side part 23a and the long side part 23b of the shake correction coil 23 is disposed in a region where the magnetic lines of force generated from the shake correction magnet 21 are directed in directions generally going away from the supporting point part 119 or in a region where the magnetic lines of force are directed in directions generally going nearer to the supporting point part 119.

Similarly, in the embodiment described above, two magnetic poles superposed on each other in the optical axis direction are formed on the opposite faces of the shake correction magnets 71 and 72 to the shake correction coils 73 and 74. However, only one magnetic pole or three or more magnetic poles may be formed on the opposite faces of the shake correction magnets 71 and 72 to the shake correction coils 73 and 74.

In the embodiment described above, the supporting point protruded part 115b is formed in the base body 115 and the abutting face 111a abutting with the supporting point protruded part 115b is formed in the sensor cover member 111. However, the present invention is not limited to this embodiment. For example, a supporting point protruded part may be formed in the sensor cover member 111 and an abutting face abutting with the supporting point protruded part may be formed in the base body 115. Alternatively, the supporting point protruded part 115b is formed in the base body 115 and a recessed part engaging with the supporting point protruded part 115b may be formed in the sensor cover member 111, or a supporting point protruded part is formed in the sensor cover member 111 and a recessed part engaging with the supporting point protruded part may be formed in the base body 115.

In the embodiment described above, the optical unit 100 with shake correcting function is provided on the lower side of the movable module 202 with the supporting point part 119 as a swing center of the movable module 202. However, the optical unit 100 with shake correcting function may be provided with no supporting point part 119. In this case, a swing center of the movable module 12 is located on a lower side relative to the flat spring 117 along the optical axis "L". Further, in the embodiment described above, the supporting point part 119 is disposed at a position on the optical axis "L" but the supporting point part 119 may be disposed at a position displaced from the optical axis "L".

In the embodiment described above, the sensors 171 and 172 are disposed on lower sides of the lens drive modules 201 and 203. In other words, the lens drive modules 201 and 203 and the sensors 171 and 172 are disposed so that the lens drive modules 201 and 203 and the sensors 171 and 172 are superposed on each other in the optical axis direction. However, the present invention is not limited to this embodiment. For example, the lens drive modules 201 and 203 and the sensors 171 and 172 may be disposed so that the lens drive modules 201 and 203 and the sensors 171 and 172 are not superposed on each other in the optical axis direction, in other words, may be disposed in the lateral direction.

In the embodiment described above, the shake correction coil 23 is an air-core coil but may be a coil with a bobbin.

In the embodiment described above, the optical units 100 and 51 with shake correcting function are mounted on a portable apparatus such as a cellular phone. However, the present invention is not limited to this embodiment. For example, the optical units 100 and 51 with shake correcting function may be mounted on a drive recorder for recording drive conditions of a car. In this case, when a variation of inclination of the lens drive module 201 caused by vibration of a car during traveling is detected by the sensor 171, in other words, when a shake (vibration) of the lens drive module 201 is detected, an electric current is supplied to the shake correction coil 23 on the basis of the detection result with the sensor 171 and the movable module 202 is swung with the supporting point part 119 as a swing center to correct the shake. Alternatively, when a variation of inclination of the lens drive module 203 is detected by the sensor 172, an electric current is supplied to the shake correction coils 73 and 74 on the basis of the detection result with the sensor 172 and the movable module 62 is swung with the swing center 69 as a center to correct the shake. Further, the optical unit 100 and 51 with shake correcting function may be mounted on other apparatuses such as a monitor camera.

For example, as shown in FIG. 28, when the optical unit 100 with shake correcting function is used in a state where the optical axis direction of the lens drive module 201 is horizontal, the movable module 202 may be easily inclined to a lower direction due to gravity. In a case that the center of gravity of the movable module 202 is located at a position far from the supporting point part 119, when the optical axis "L" is inclined with respect to the vertical direction, a swing moment of the movable module 202 with the supporting point part 119 as a center becomes larger and a quantity of inclination may be increased.

However, in the embodiment described above, in order to surely generate pressurization for abutting the abutting face 111a of the sensor cover member 111 with the supporting point protruded part 115b of the base body 115, the flat spring 117 is fixed to the case body 116 in a resiliently bent state. Therefore, the optical unit 100 with shake correcting function is capable of restraining the inclination. Further, in the embodiment described above, the shake correction magnet 21 and the shake correction coil 23 are oppositely disposed to each other so that the center position of the shake correction coil 23 in the upper and lower direction is disposed on the upper side relative to the abutting face of first magnet piece 21a with the second magnet piece 21b and thus the shake correction magnet 21 whose weight is larger is disposed on a closer side to the supporting point part 119. Therefore, the center of gravity of the movable module 202 itself can be brought close to the supporting point part 119 and thus rotation moment of the movable module 202 is made smaller when the optical axis "L" is set to be horizontal and a quantity of inclination of the movable module 202 can be suppressed.

However, when the weight of the movable module 202 becomes larger, the spring force of the flat spring 117 is required to be increased and thus the flat spring 117 may be required to be thicker and larger. Therefore, as shown in FIG. 28, weights 40 may be fixed to the movable module 202 so that the center of gravity of the movable module 202 is located nearer to the supporting point part 119. In other words, the weight 40 may be fixed near the supporting point part 119 or a lower side (left side in FIG. 9) relative to the supporting point part 119 in the movable module 202. For example, as shown in FIG. 16, the bottom part of the sensor cover member 111 is formed with the ring-shaped recessed part 111c so as to surround the abutting face 111a and recess toward the lower direction and thus the weight 40 may be disposed on the recessed part 111c. In addition, the weight 40 may be fixed to the movable module 202 at a position between the gravity center of the movable module 202 and the supporting point part 119. Further, the weight of the sensor cover member 111 may be made heavier to provide a function of the weight 40 in the sensor cover member 111.

According to this structure, while the flat spring 117 is made thinner and smaller, an inclination quantity of the movable module 202 can be reduced when the optical axis "L" of the lens drive module 201 is inclined with respect to the vertical direction. Further, requirement is reduced in which the flat spring 117 is designed in consideration of a dispersion of an inclination quantity of the movable module 202 due to difference in attitude of the optical unit 100 with shake correcting function and thus degree of freedom for design of the flat spring 117 is increased. In accordance with an embodiment of the present invention, when the weight 40 is disposed in the recessed part 111*c* of the cover member 111, the weight 40 is preferably formed in a ring-like shape so as to fit into the ring-shaped recessed part 111*c*. In a case that the weight 40 is formed in a ring-like shape, even when the movable module 202 is inclined in any direction, swing moment of the movable module 202 can be made smaller to reduce its inclination quantity.

Next, another embodiment of the second present invention which is capable of being made smaller and thinner will be described below.

Figure 29:
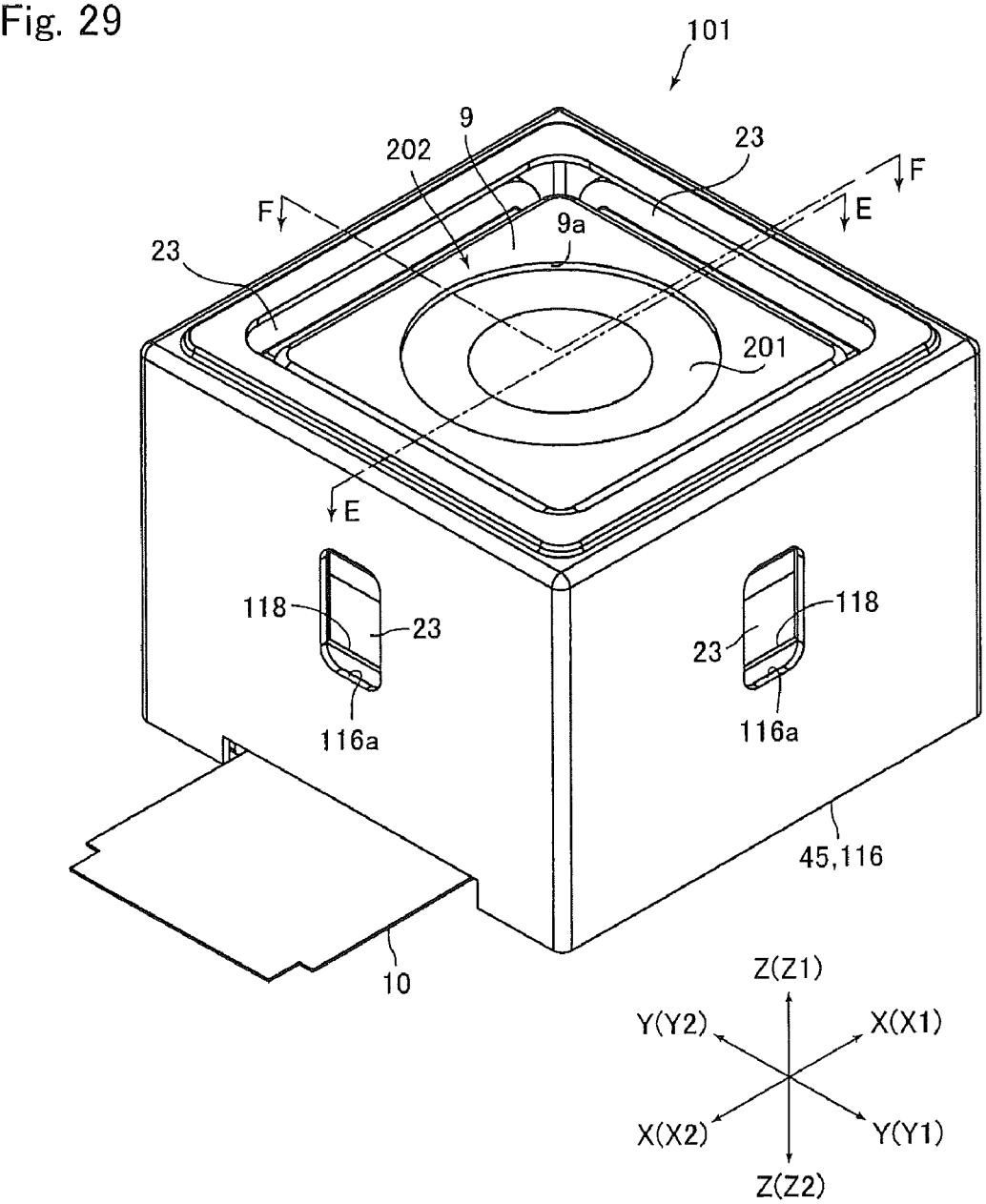
FIG. 29 is a perspective view showing an optical unit with shake correcting function in accordance with another embodiment of the present invention.
Figure 30:
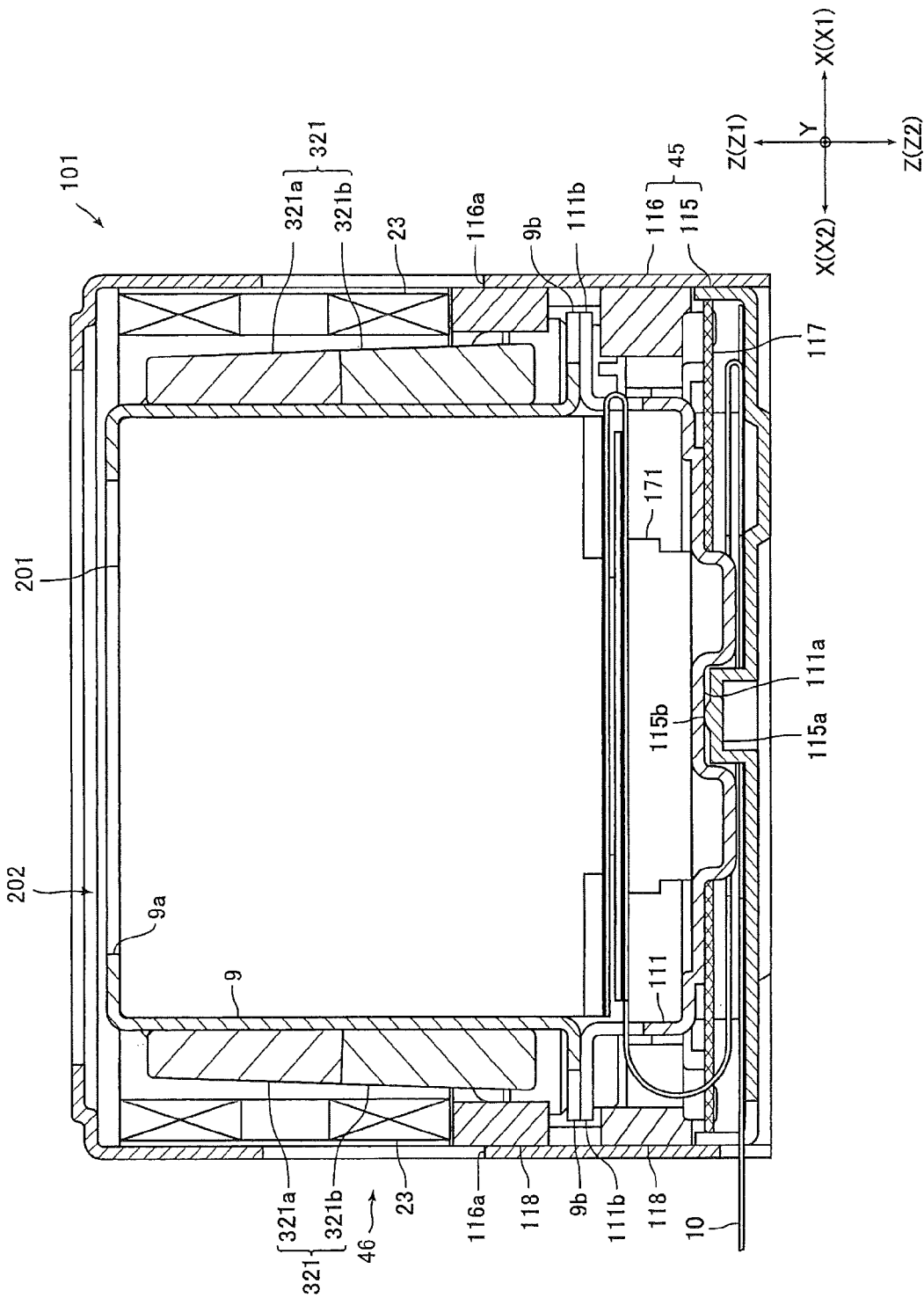
FIG. 30 is a cross sectional view showing the optical unit with shake correcting function which is cut by the "E-E" line in FIG. 29.
Figure 31:
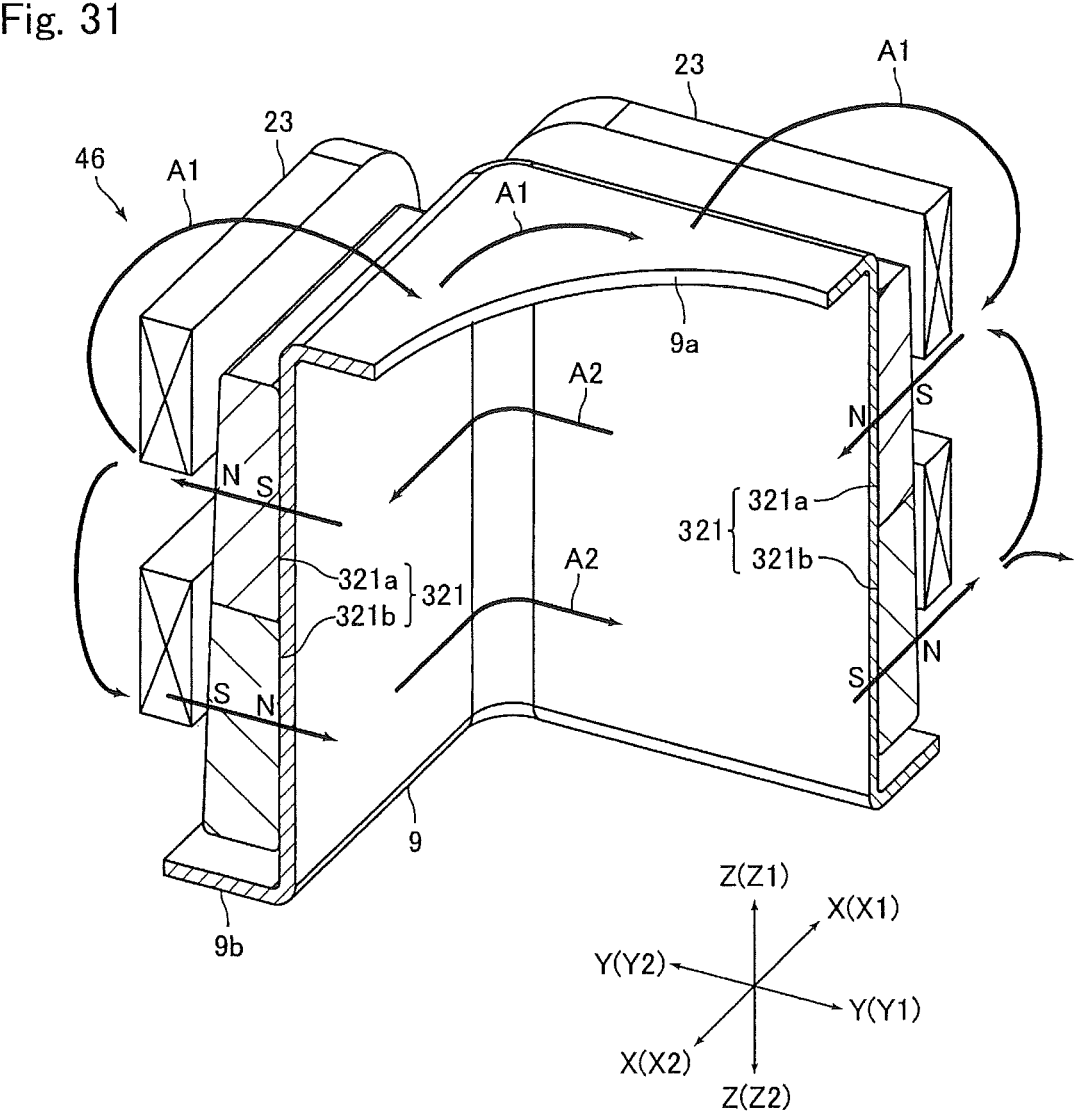
FIG. 31 is a perspective view showing a part of structural elements which is cut by the "F-F" line in FIG. 29.

FIG. 29 is a perspective view showing an optical unit 101 with shake correcting function in accordance with an embodiment of the present invention. FIG. 30 is a sectional view showing the optical unit 101 which is cut by the "E-E" line in FIG. 29. FIG. 31 is a perspective view showing a part of structural elements which is cut by the "F-F" line in FIG. 29. The structure of this embodiment is basically the same as the structure shown in FIGS. 15 through 19 described above and thus different structures will be mainly described in detail.

As shown in FIG. 31, a rear side face and a right side face of the cover member 9 in this embodiment is connected with each other in the circumferential direction of the cover member 9. Specifically, the rear side face and the right side face of the cover member 9 is connected with each other in the circumferential direction over the entire region in the upper and lower direction. Similarly, the rear side face and a left side face of the cover member 9 is connected with each other in the circumferential direction over the entire region in the upper and lower direction, a front side face and the right side face of the cover member 9 is connected with each other in the circumferential direction over the entire region in the upper and lower direction, and the front side face and the left side face of the cover member 9 is connected with each other in the circumferential direction over the entire region in the upper and lower direction.

In other words, in this embodiment, the side faces next to each other in the circumferential direction of the cover member 9 are connected with each other in the circumferential direction over the entire region in the upper and lower direction. Further, all side faces of the cover member 9 are connected with each other in the circumferential direction. In other words, the cover member 9 in this embodiment is formed in a substantially rectangular tube shape whose all side faces are connected with each other in the circumferential direction over the entire region in the upper and lower direction. In this embodiment, as shown in FIG. 31, a curved face part ("Round" part) is formed at a connected portion of the side faces adjacent to each other in the circumferential direction of the cover member 9. However, end parts of the side faces may be connected with each other in a perpendicular manner.

In this embodiment, the swing drive mechanism 46 includes shake correction magnets 321 and shake correction coils 23 which are oppositely disposed to the shake correction magnets 321. The swing drive mechanism 46 in this embodiment includes four shake correction magnets 321 and four shake correction coils 23.

The shake correction magnet 321 is formed in a substantially rectangular plate shape. Further, the shake correction magnet 321 is structured of two magnet pieces, i.e., a first magnet piece 321*a* and a second magnet piece 321*b*. Specifically, the first magnet piece 321*a* and the second magnet piece 321*b* are adhesively fixed to each other in a state that an under face of the first magnet piece 321*a* and an upper face of the second magnet piece 321*b* are abutted with each other to structure the shake correction magnet 321. A width of the first magnet piece 321*a* is formed to be equal to a width of the second magnet piece 321*b*. In this embodiment, a thickness of the first magnet piece 321*a* and a thickness of the second magnet piece 321*b* are different from each other as described below.

Two magnetic poles are formed on each of both faces of the shake correction magnet 321 so as to be superposed in the upper and lower direction (in other words, in the axial direction of the cover member 9). Further, in this embodiment, the shake correction magnets 21 are fixed to respective side faces of the cover member 9 so that magnetic poles of the shake correction magnets 321 adjacent to each other in the circumferential direction of the cover member 9 are different from each other. In other words, the shake correction magnets 321 are fixed to the respective side faces of the cover member 9 so that the magnetic poles of the first magnet pieces 321*a* adjacent to each other in the circumferential direction of the cover member 9 are different from each other and the magnetic poles of the second magnet pieces 321*b* adjacent to each other in the circumferential direction are different from each other.

Specifically, in this embodiment, as shown in FIG. 31, the right side face (opposite face to the shake correction coil 23) of the first magnet piece 321*a* of the shake correction magnet 321 which is fixed to the right side face of the cover member 9 is magnetized in an "S"-pole and its left side face is magnetized in an "N"-pole, and the right side face (opposite face to the shake correction coil 23) of the second magnet piece 321*b* of this shake correction magnet 321 is magnetized in an "N"-pole and its left side face is magnetized in an "S"-pole. Similarly, the left side face (opposite face to the shake correction coil 23) of the first magnet piece 321*a* of the shake correction magnet 321 which is fixed to the left side face of the cover member 9, which faces the right side face of the cover member 9, is magnetized in an "S"-pole and its right side face is magnetized in an "N"-pole, and the left side face (opposite face to the shake correction coil 23) of the second magnet piece 321*b* of this shake correction magnet 321 is magnetized in an "N"-pole and its right side face is magnetized in an "S"-pole.

Further, in this embodiment, as shown in FIG. 31, the rear side face (opposite face to the shake correction coil 23) of the first magnet piece 321*a* of the shake correction magnet 321 which is fixed to the rear side face of the cover member 9 is magnetized in an "N"-pole and its front side face is magnetized in an "S"-pole, and the rear side face (opposite face to the shake correction coil 23) of the second magnet piece 321*b* of this shake correction magnet 321 is magnetized in an "S"-pole and its front side face is magnetized in an "N"-pole. Similarly, the front side face (opposite face to the shake correction coil 23) of the first magnet piece 321*a* of the shake correction magnet 321 which is fixed to the front side face of the cover member 9, which faces the rear side face of the cover member 9, is magnetized in an "N"-pole and its rear side face is magnetized in an "S"-pole, and the front side face (opposite face to the shake correction coil 23) of the second magnet piece 321b of this shake correction magnet 321 is magnetized in an "S"-pole and its rear side face is magnetized in an "N"-pole.

Further, outer side faces of the shake correction magnets 321 which are fixed on the right and left side faces of the cover member 9 are inclined so as to gradually widen on outer sides in the lateral direction toward the lower direction and thus the shake correction magnet 321 is formed in a substantially trapezoid shape when viewed in the front and rear direction. Similarly, outer side faces of the shake correction magnets 321 which are fixed on the front and rear side faces of the cover member 9 are inclined so as to gradually widen on outer sides in the front and rear direction toward the lower direction and thus the shake correction magnet 321 is formed in a substantially trapezoid shape when viewed in the right and left direction. Therefore, the first magnet piece 321a and the second magnet piece 321b are formed so that their widths are substantially the same as each other but the thickness of the first magnet piece 321a is different from that of the second magnet piece 321b.

As described above, the outer side faces of the shake correction magnets 321 fixed on the right and left side faces of the cover member 9 are inclined so as to gradually widen on outer sides in the lateral direction toward the lower direction, and the outer side faces of the shake correction magnets 321 fixed on the front and rear side faces of the cover member 9 are inclined so as to gradually widen on outer sides in the front and rear direction toward the lower direction. Therefore, gap spaces between the shake correction magnets 321 and the shake correction coils 23 become narrower toward the lower direction.

Further, in this embodiment, as shown in FIG. 30, the shake correction magnet 321 and the shake correction coil 23 are disposed so that the center position of the shake correction coil 23 in the upper and lower direction is located on the upper side relative to the abutting face of the first magnet piece 321a with the second magnet piece 321b.

As discussed above, in this embodiment, two magnetic poles, i.e., an "N"-pole and an "S"-pole are formed on the side face of the shake correction magnet 321 which faces the shake correction coil 23. Therefore, the shake correction coil 23 is utilized effectively in comparison with a case that one magnetic pole of either an "N"-pole or an "S"-pole is formed on the side face of the shake correction magnet 321 which faces the shake correction coil 23. In other words, a drive force of the swing drive mechanism 46 is generated by utilizing two long side portions which structure the upper and lower ends of the shake correction coil 23 which is wound around in a substantially rectangular shape. Therefore, in this embodiment, a drive force of the swing drive mechanism 46 is improved and, even when the optical unit 100 with shake correcting function is made smaller and thinner, a sufficient drive force for swinging the lens drive module 201 can be obtained.

Further, in this embodiment, two magnetic poles are formed on the side face of the shake correction magnet 321 which faces the shake correction coil 23. Therefore, one piece of the shake correction coil 23 is faced to the one piece of the shake correction magnet 321 and thus the shake correction coil 23 is utilized effectively and, in addition, a drive force of the swing drive mechanism 46 is improved. Therefore, structure of the optical unit 100 can be simplified.

Figure 32:
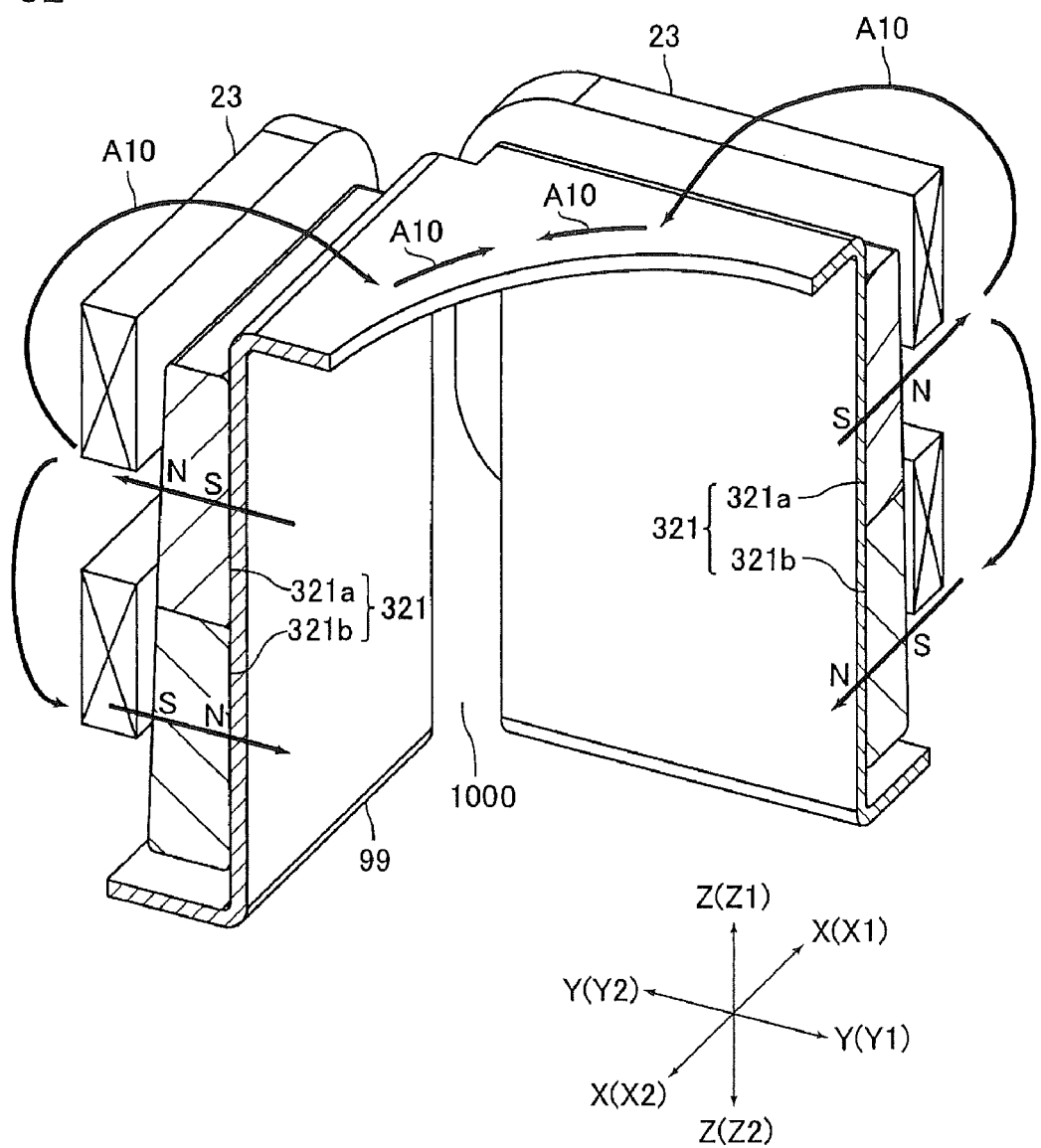
FIG. 32 is an explanatory view showing an effect of the optical unit with shake correcting function shown in FIG. 29.

In this embodiment, the shake correction magnets 321 are fixed to the side faces of the cover member 9 so that the magnetic poles of the shake correction magnets 321 adjacent to each other in the circumferential direction of the cover member 9 are different from each other. Therefore, as shown by the arrow "A1" in FIG. 31, magnetic paths are easily formed between the shake correction magnets 321 adjacent to each other in the circumferential direction. In other words, like a comparison example shown in FIG. 32, when the shake correction magnets 321 are fixed to side faces of a cover member 99 so that magnetic poles of the shake correction magnets 321 adjacent to each other in the circumferential direction of the cover member 99 are the same as each other, as shown by the arrows "A10", magnetic lines of force generated from one of the shake correction magnets 321 are interfered with magnetic lines of force generated from the other of the shake correction magnets 321 and thus magnetic paths are not easily formed between the shake correction magnets 321 adjacent to each other in the circumferential direction. However, in this embodiment, as shown in FIG. 31, magnetic paths between the shake correction magnets 321 adjacent to each other in the circumferential direction are easily formed. Therefore, a drive force of the swing drive mechanism 46 can be improved effectively.

In this embodiment, side faces adjacent to each other in the circumferential direction of the cover member 9 are connected with each other in the circumferential direction over the entire region in the upper and lower direction. Therefore, as shown by the arrow "A2" in FIG. 31, magnetic paths are easily formed between the shake correction magnets 321 adjacent to each other in the circumferential direction. In other words, like a comparison example shown in FIG. 32, when a slit 1000 is formed between the side faces of the cover member 99 adjacent to each other in the circumferential direction, magnetic paths are not easily formed between the shake correction magnets 321 adjacent to each other in the circumferential direction. However, in this embodiment, as shown in FIG. 31, magnetic paths are easily formed between the shake correction magnets 321 adjacent to each other in the circumferential direction. Therefore, a drive force of the swing drive mechanism 46 can be improved effectively.

According to examinations of the present inventors, in comparison with a case that one magnetic pole is formed on the side face of the shake correction magnet 321 which faces the shake correction coil 23, when two magnetic poles are formed on the side face of the shake correction magnet 321 facing the shake correction coil 23, a drive force of the swing drive mechanism 46 is improved by 144%.

Further, according to examinations of the present inventors, in comparison with a case that the shake correction magnets 321 are fixed to side faces of the cover member 9 so that magnetic poles of the shake correction magnets 321 adjacent to each other in the circumferential direction of the cover member 9 are the same as each other, when the shake correction magnets 321 are fixed to the side faces of the cover member 9 so that the magnetic poles of the shake correction magnets 321 adjacent to each other in the circumferential direction of the cover member 9 are different from each other, a drive force of the swing drive mechanism 46 is improved by 7%.

In addition, according to examinations of the present inventors, in comparison with a case that the slit 1000 is formed between the side faces of the cover member 99 adjacent to each other in the circumferential direction, the side faces adjacent to each other in the circumferential direction of the cover member 9 are connected with each other in the circumferential direction over the entire region in the upper and lower direction, a drive force of the swing drive mechanism 46 is improved by 3%.

Although the present invention has been shown and described with reference to specific embodiments, various changes and modifications will be apparent to those skilled in the art from the teachings herein.

In the embodiment described above, the shake correction magnet 321 is structured of two magnet pieces which are the first magnet piece 321*a* and the second magnet piece 321*b*. However, the present invention is not limited to this embodiment. For example, the shake correction magnet 321 may be structured of one piece of magnet. In this case, one piece of magnet is magnetized so that two magnetic poles superposed on each other in the upper and lower direction are formed on both faces of the shake correction magnet 321.

In the embodiment described above, two magnetic poles are formed on both faces of the shake correction magnet 321 so as to superpose in the upper and lower direction. However, the present invention is not limited to this embodiment. For example, three or more magnetic poles may be formed on both faces of the shake correction magnet 321.

In the embodiment described above, the shake correction magnet 321 is attached to the cover member 9 and the shake correction coil 23 is attached to the case body 116. However, the present invention is not limited to this embodiment. For example, the shake correction magnet 321 may be attached to the case body 116 through a yoke and the shake correction coil 23 is attached to the cover member 9. In accordance with an embodiment of the present invention, when the case body 116 is formed of magnetic material, the shake correction magnet 321 may be attached to the case body 116 directly.

In the embodiment described above, the side faces adjacent to each other in the circumferential direction of the cover member 9 are connected with each other in the circumferential direction over the entire region in the upper and lower direction. However, the present invention is not limited to this embodiment. For example, side faces adjacent to each other in the circumferential direction of the cover member 9 may be connected with each other in the circumferential direction through a part (not entire region) in the upper and lower direction. Further, in the embodiment described above, all side faces of the cover member 9 are connected with each other in the circumferential direction. However, only two or three side faces selected arbitrarily may be connected with each other in the circumferential direction.

In the embodiment described above, the shake correction magnets 321 are fixed to the side faces of the cover member 9 so that the magnetic poles of the shake correction magnets 321 adjacent to each other in the circumferential direction of the cover member 9 are different from each other. However, the shake correction magnets 321 may be fixed to the side faces of the cover member 9 so that the magnetic poles of the shake correction magnets 321 adjacent to each other in the circumferential direction of the cover member 9 are the same as each other. Further, in the embodiment described above, the cover member 9 is formed in a substantially rectangular tube shape but may be formed in a multi-angular tube shape other than a rectangular tube shaped. Further, the cover member 9 may be formed in a cylindrical shape.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correcting function comprising:
    a lens drive module which is mounted with a lens, an imaging element and a lens drive mechanism for driving the lens;
    a sensor for detecting a variation of inclination of the lens drive module; and
    a shake correction mechanism which swings the lens drive module on a basis of a detection result by the sensor to correct shake;
    wherein the shake correction mechanism comprises:
        a swing drive mechanism which swings the lens drive module; and
        a supporting point part which serves as a swing center of the lens drive module;
    wherein the swing drive mechanism comprises a shake correction coil and a shake correction magnet which are disposed to face each other; and
    wherein the shake correction coil is disposed in at least one of a first region, where magnetic lines of force generated by the shake correction magnet are directed in directions generally going away from the supporting point part, and a second region where magnetic lines of force generated by the shake correction magnet are directed in directions generally going toward the supporting point part.

2. The optical unit with shake correcting function according to claim 1, wherein
    the shake correction coil is formed in a substantially rectangular wound shape so as to be provided with a first side part and a second side part which are parallel to each other,
    an opposite face of the shake correction magnet to the shake correction coil is formed with two magnetic poles which are superposed on each other in a direction substantially perpendicular to a longitudinal direction of the first side part and a longitudinal direction of the second side part, and
    when the first side part is set to be a far side part from the supporting point part, the first side part is disposed in the first region and the second side part is disposed in the second region.

3. The optical unit with shake correcting function according to claim 2, further comprising a case body which supports the lens drive module and which is formed in a substantially rectangular tube shape,
    wherein the lens drive module is disposed within a cover member which is formed in a substantially rectangular tube shape, and
    wherein the shake correction magnet is fixed to an outer side face of the cover member and the shake correction coil is fixed to an inner side face of the case body.

4. The optical unit with shake correcting function according to claim 3, further comprising a base body which is fixed to the case body on a lower end side of the optical unit to structure a support body for supporting the lens drive module,
    wherein the sensor is disposed on a lower end part of the lens drive module and the supporting point part is formed between the lower end part of the lens drive module and the base body, and
    wherein the shake correction coil is disposed so that a center of the shake correction coil in the optical axis direction is located on an upper side in the optical axis direction relative to magnetic center of the shake correction magnet in the optical axis direction.

5. The optical unit with shake correcting function according to claim 2, wherein the shake correction coil is formed in a substantially rectangular shape which is provided with two long side parts parallel to each other and two short side parts parallel to each other which are formed shorter than the long side part, and the first side part and the second side part are the long side part.

6. An optical unit with shake correcting function comprising:
    a lens drive module which is mounted with a lens, an imaging element and a lens drive mechanism for driving the lens;
    a sensor for detecting a variation of inclination of the lens drive module; and
    a shake correction mechanism which swings the lens drive module on a basis of a detection result by the sensor to correct shake;
    wherein the shake correction mechanism comprises a swing drive mechanism which swings the lens drive module;
    wherein the swing drive mechanism comprises a shake correction coil and a shake correction magnet which are disposed to face each other; and
    wherein the shake correction coil is disposed in at least one of a first region, where magnetic lines of force generated by the shake correction magnet are directed in directions generally going away from a swing center of the lens drive module, and a second region where magnetic lines of force generated by the shake correction magnet are directed in directions generally going toward the swing center.

7. The optical unit with shake correcting function according to claim 6, wherein
    the shake correction coil is formed in a substantially rectangular wound shape so as to be provided with a first side part and a second side part which are parallel to each other,
    an opposite face of the shake correction magnet to the shake correction coil is formed with two magnetic poles which are superposed on each other in a direction substantially perpendicular to a longitudinal direction of the first side part and a longitudinal direction of the second side part, and
    when the first side part is set to be a far side part from the swing center, the first side part is disposed in the first region and the second side part is disposed in the second region.

8. The optical unit with shake correcting function according to claim 7, further comprising a case body which supports the lens drive module and which is formed in a substantially rectangular tube shape,
    wherein the lens drive module is disposed within a cover member which is formed in a substantially rectangular tube shape, and
    wherein the shake correction magnet is fixed to an outer side face of the cover member on both sides in an optical axis direction of the lens with respect to the swing center, and the shake correction coil facing the shake correction magnet is fixed to an inner side face of the case body on both sides in the optical axis direction with respect to the swing center.

9. The optical unit with shake correcting function according to claim 8, wherein
    the lens drive module is supported by the case body through a flat spring so as to be capable of swinging, and the flat spring is connected between a portion between two shake correction magnets fixed to the outer side face of the cover member and a portion between two shake correction coils fixed to the inner side face of the case body.

10. The optical unit with shake correcting function according to claim 7, wherein the shake correction coil is formed in a substantially rectangular shape which is provided with two long side parts parallel to each other and two short side parts parallel to each other which are formed shorter than the long side part, and the first side part and the second side part are the long side part.

11. An optical unit with shake correcting function comprising:
    a lens drive module which is mounted with a lens, an imaging element and a lens drive mechanism for driving the lens;
    a support body which supports the lens drive module;
    a sensor for detecting a variation of inclination of the lens drive module; and
    a shake correction mechanism which swings the lens drive module on a basis of a detection result by the sensor to correct shake;
    wherein the shake correction mechanism comprises:
        a swing drive mechanism which swings the lens drive module; and
        a supporting point part which serves as a swing center of the lens drive module;
        wherein the swing drive mechanism comprises a shake correction coil and a shake correction magnet which are oppositely disposed to each other;
        wherein the supporting point part is disposed at a position shifted from a facing position of the shake correction coil to the shake correction magnet in an optical axis direction of the lens drive module, and
        wherein the shake correction coil and the shake correction magnet are disposed so that a center in the optical axis direction of the shake correction coil and a magnetic center in the optical axis direction of the shake correction magnet are shifted from each other in the optical axis direction.

12. The optical unit with shake correcting function according to claim 11, wherein
    the shake correction magnet is fixed to a magnet holding member which is swung together with the lens drive module and the shake correction coil is fixed to the support body, and
    the center in the optical axis direction of the shake correction coil is disposed at a position far away from the swing center in the optical axis direction relative to the magnetic center in the optical axis direction of the shake correction magnet.

13. The optical unit with shake correcting function according to claim 12, wherein
    the shake correction coil is formed in a substantially rectangular wound shape so as to be provided with a first side part and a second side part which are parallel to each other,
    an opposite face of the shake correction magnet to the shake correction coil is formed with two magnetic poles which are superposed on each other in the optical direction, and
    a center in the optical axis direction of the first side part is disposed at a position far away from the swing center in the optical axis direction relative to one of magnetic centers of the two magnetic poles.

14. The optical unit with shake correcting function according to claim 13, wherein
- a center in the optical axis direction of the second side part is located at a position nearer to the swing center in the optical axis direction relative to a boundary of two magnetic poles which is a magnetic center in the optical axis direction of the shake correction magnet, and
- the center in the optical axis direction of the second side part is located at a position far away from the swing center in the optical axis direction relative to an other of the magnetic centers of the two magnetic poles.

15. The optical unit with shake correcting function according to claim 13, wherein the shake correction coil is formed in a substantially rectangular shape which is provided with two long side parts parallel to each other and two short side parts parallel to each other which are formed shorter than the long side part, and the first side part and the second side part are the long side part.

16. An optical unit with shake correcting function comprising:
- a lens drive module which is mounted with a lens, an imaging element and a lens drive mechanism for driving the lens;
- a support body which supports the lens drive module;
- a sensor for detecting a variation of inclination of the lens drive module; and
- a shake correction mechanism which swings the lens drive module on a basis of a detection result by the sensor to correct shake;
- wherein the shake correction mechanism comprises a swing drive mechanism which swings the lens drive module;
- wherein the swing drive mechanism comprises a shake correction coil and a shake correction magnet which are oppositely disposed to each other;
- wherein a swing center of the lens drive module is disposed at a position shifted from a facing position of the shake correction coil to the shake correction magnet in an optical axis direction of the lens drive module, and
- wherein the shake correction coil and the shake correction magnet are disposed so that a center in the optical axis direction of the shake correction coil and a magnetic center in the optical axis direction of the shake correction magnet are shifted from each other in the optical axis direction.

17. The optical unit with shake correcting function according to claim 16, wherein
- the shake correction magnet is fixed to a magnet holding member which is swung together with the lens drive module and the shake correction coil is fixed to the support body, and
- the center in the optical axis direction of the shake correction coil is disposed at a position far away from the swing center in the optical axis direction relative to the magnetic center in the optical axis direction of the shake correction magnet.

18. The optical unit with shake correcting function according to claim 17, wherein
- the shake correction coil is formed in a substantially rectangular wound shape so as to be provided with a first side part and a second side part which are parallel to each other,
- an opposite face of the shake correction magnet to the shake correction coil is formed with two magnetic poles which are superposed on each other in the optical direction, and
- a center in the optical axis direction of the first side part is disposed at a position far away from the swing center in the optical axis direction relative to one of magnetic centers of the two magnetic poles.

19. The optical unit with shake correcting function according to claim 18, wherein
- a center in the optical axis direction of the second side part is located at a position nearer to the swing center in the optical axis direction relative to a boundary of two magnetic poles which is a magnetic center in the optical axis direction of the shake correction magnet, and
- the center in the optical axis direction of the second side part is located at a position far away from the swing center in the optical axis direction relative to an other of the magnetic centers of the two magnetic poles.

20. The optical unit with shake correcting function according to claim 18, wherein the shake correction coil is formed in a substantially rectangular shape which is provided with two long side parts parallel to each other and two short side parts parallel to each other which are formed shorter than the long side part, and the first side part and the second side part are the long side part.

* * * * *